US012360657B2

(12) United States Patent
Hendrix et al.

(10) Patent No.: US 12,360,657 B2
(45) Date of Patent: Jul. 15, 2025

(54) SYSTEMS AND VISUALIZATION INTERFACES FOR ORBITAL PATHS AND PATH PARAMETERS OF SPACE OBJECTS

(71) Applicant: ExoAnalytic Solutions, Inc., Foothill Ranch, CA (US)

(72) Inventors: Douglas Lee Hendrix, Ladera Ranch, CA (US); William Alexander Therien, Upland, CA (US)

(73) Assignee: ExoAnalytic Solutions, Inc., Foothill Ranch, CA (US)

( * ) Notice: Subject to any disclaimer, the term of this patent is extended or adjusted under 35 U.S.C. 154(b) by 290 days.

(21) Appl. No.: 17/877,186

(22) Filed: Jul. 29, 2022

(65) Prior Publication Data

US 2022/0369308 A1    Nov. 17, 2022

Related U.S. Application Data

(60) Division of application No. 17/220,817, filed on Apr. 1, 2021, now Pat. No. 11,402,986, which is a division
(Continued)

(51) Int. Cl.
*B64G 3/00* (2006.01)
*G05D 1/00* (2006.01)
(Continued)

(52) U.S. Cl.
CPC ........... *G06F 3/04847* (2013.01); *B64G 3/00* (2013.01); *G05D 1/10* (2013.01); *G06F 3/04842* (2013.01);
(Continued)

(58) Field of Classification Search
None
See application file for complete search history.

(56) References Cited

U.S. PATENT DOCUMENTS

| 3,303,582 A | 2/1967 | Farquhar |
| 3,624,650 A | 11/1971 | Paine |

(Continued)

FOREIGN PATENT DOCUMENTS

| EP | 0886392 A2 | 12/1998 |
| EP | 3002552 A1 | 4/2016 |

(Continued)

OTHER PUBLICATIONS

Cunio, P. M., et al., 'Photometric and Other Analyses of Energetic Events Related to 2017 GEO RSO Anomalies', in Proceedings of the Advanced Maui Optical and Space Surveillance (AMOS) Technologies Conference, Sep. 19-22, 2017 [Retrieved from the internet on Oct. 13, 2020]; <URL: https://amostech.com/TechnicalPapers/2017/Poster/Conio.pdf> in 15 pages.

(Continued)

*Primary Examiner* — Rinna Yi
(74) *Attorney, Agent, or Firm* — Knobbe Martens Olson & Bear LLP

(57) ABSTRACT

A display system can be configured to receive, via a user interface, a first identifier associated with a first space object and determine a first maneuver of the first space object. The first maneuver can include a perturbation of the path of the first space object. Based on the first identifier and the first maneuver, the display system can identify one or more path parameters associated with a path of the first space object and generate a display interface. The display interface can include a longitude-time graph having a longitude axis spanning from a lower-longitude limit to an upper-longitude limit and a time axis spanning from the lower-time limit to the upper-time limit and an indication of the one or more path parameters.

11 Claims, 29 Drawing Sheets

Related U.S. Application Data of application No. 17/014,804, filed on Sep. 8, 2020, now Pat. No. 10,976,911, which is a continuation of application No. PCT/US2020/043506, filed on Jul. 24, 2020.

(60) Provisional application No. 63/022,236, filed on May 8, 2020, provisional application No. 62/878,687, filed on Jul. 25, 2019.

(51) Int. Cl.
*G06F 3/04842* (2022.01)
*G06F 3/04845* (2022.01)
*G06F 3/04847* (2022.01)
*G06T 7/254* (2017.01)
*G06T 11/20* (2006.01)

(52) U.S. Cl.
CPC .......... *G06F 3/04845* (2013.01); *G06T 7/254* (2017.01); *G06T 11/206* (2013.01); *G06T 2200/24* (2013.01); *G06T 2207/10032* (2013.01); *G06T 2207/30241* (2013.01)

(56) References Cited

U.S. PATENT DOCUMENTS

| | | |
|---|---|---|
| 3,676,581 A | 7/1972 | Swet |
| 4,355,311 A | 10/1982 | Frosch et al. |
| 4,602,257 A | 7/1986 | Grisham |
| 4,617,634 A | 10/1986 | Izumida et al. |
| 4,727,373 A | 2/1988 | Hoover |
| 4,746,976 A | 5/1988 | Kamel et al. |
| 4,943,808 A | 7/1990 | Dulck et al. |
| 5,051,749 A | 9/1991 | Stoyle |
| 5,133,050 A | 7/1992 | George et al. |
| 5,436,632 A | 7/1995 | Sheynblat |
| 5,512,743 A | 4/1996 | Shaffer et al. |
| 5,557,524 A | 9/1996 | Maki |
| 5,570,096 A | 10/1996 | Knight et al. |
| 5,574,465 A | 11/1996 | Okada |
| 5,677,693 A | 10/1997 | Frankot et al. |
| 5,678,175 A | 10/1997 | Stuart et al. |
| 5,701,678 A | 12/1997 | Wang |
| 5,812,932 A | 9/1998 | Wiedeman et al. |
| 5,935,195 A | 8/1999 | Quine |
| 5,979,832 A | 11/1999 | Draim |
| 6,172,747 B1 | 1/2001 | Houlberg |
| 6,182,114 B1 | 1/2001 | Yap et al. |
| 6,304,212 B1 | 10/2001 | Aoki et al. |
| 6,330,988 B1 | 12/2001 | Liu et al. |
| 6,353,794 B1 | 3/2002 | Davis et al. |
| 6,452,532 B1 | 9/2002 | Grisham |
| 6,538,674 B1 | 3/2003 | Shibata et al. |
| 6,690,934 B1 | 2/2004 | Conrad et al. |
| 6,868,316 B1 | 3/2005 | Stevens |
| 7,369,809 B1 | 5/2008 | Wang |
| 7,477,991 B2 | 1/2009 | Cross et al. |
| 7,777,666 B2 | 8/2010 | Gregory et al. |
| 7,953,553 B2 | 5/2011 | Choi |
| 8,160,400 B2 | 4/2012 | Snavely et al. |
| 8,218,013 B1 | 7/2012 | Ellis et al. |
| 8,275,883 B2 | 9/2012 | Snoddy et al. |
| 8,340,423 B1 | 12/2012 | Zelinka et al. |
| 8,401,276 B1 | 3/2013 | Choe et al. |
| 8,401,307 B1 | 3/2013 | Rowe et al. |
| 8,447,071 B2 | 4/2013 | Ohta |
| 8,463,071 B2 | 6/2013 | Snavely et al. |
| 8,498,481 B2 | 7/2013 | Blake et al. |
| 8,645,429 B1 | 2/2014 | Bik et al. |
| 8,718,373 B2 | 5/2014 | Mendis |
| 8,744,214 B2 | 6/2014 | Snavely et al. |
| 8,886,446 B1 | 11/2014 | Baiada et al. |
| 8,942,483 B2 | 1/2015 | Janky et al. |
| 8,989,434 B1 | 3/2015 | Reinhardt et al. |
| 8,989,502 B2 | 3/2015 | Janky et al. |
| 9,025,810 B1 | 5/2015 | Reinhardt et al. |
| 9,042,657 B2 | 5/2015 | Janky et al. |
| 9,324,003 B2 | 4/2016 | France et al. |
| 9,344,182 B2 | 5/2016 | Bigras et al. |
| 9,471,986 B2 | 10/2016 | Janky et al. |
| 9,547,935 B2 | 1/2017 | Haglund et al. |
| 9,569,667 B1 | 2/2017 | Forkert |
| 9,658,073 B2 | 5/2017 | Hindman |
| 9,667,948 B2 | 5/2017 | Wang et al. |
| 9,727,976 B1 | 8/2017 | Perkins et al. |
| 9,819,410 B1 | 11/2017 | Azevedo et al. |
| 9,842,256 B2 | 12/2017 | Krauss |
| 9,857,960 B1 | 1/2018 | Dennis et al. |
| 9,927,513 B2 | 3/2018 | Benninghofen et al. |
| 9,934,453 B2 | 4/2018 | Hammoud et al. |
| 9,990,750 B1 | 5/2018 | Reinhardt et al. |
| 10,115,186 B2 | 10/2018 | Komatsu |
| 10,242,578 B2 | 3/2019 | Mellema et al. |
| 10,402,672 B1 | 9/2019 | Hendrix et al. |
| 10,407,191 B1 | 9/2019 | Hendrix et al. |
| 10,416,862 B1 | 9/2019 | Hendrix et al. |
| 10,452,223 B2 | 10/2019 | Keondjian et al. |
| 10,467,783 B2 | 11/2019 | Hendrix et al. |
| 10,647,453 B2 | 5/2020 | Hendrix et al. |
| 10,657,738 B2 | 5/2020 | Bauchot et al. |
| 10,661,920 B2 | 5/2020 | Hendrix et al. |
| 10,740,609 B1 | 8/2020 | Shaddix et al. |
| 10,835,803 B2 | 11/2020 | Okur et al. |
| 10,976,911 B2 | 4/2021 | Hendrix et al. |
| 11,280,194 B2 | 3/2022 | Sercel |
| 11,402,986 B2 | 8/2022 | Hendrix et al. |
| 11,506,773 B1 | 11/2022 | Everett et al. |
| 11,643,930 B2 | 5/2023 | Sercel |
| 11,748,897 B1 | 9/2023 | Burgoyne et al. |
| 11,987,397 B2 | 5/2024 | Hendrix et al. |
| 12,060,172 B2 | 8/2024 | Hendrix et al. |
| 2001/0036293 A1 | 11/2001 | Laumeyer et al. |
| 2002/0047798 A1 | 4/2002 | Platt |
| 2004/0152471 A1 | 8/2004 | MacDonald et al. |
| 2005/0053309 A1 | 3/2005 | Szczuka et al. |
| 2006/0143142 A1 | 6/2006 | Vasilescu et al. |
| 2006/0251292 A1 | 11/2006 | Gokturk et al. |
| 2007/0110338 A1 | 5/2007 | Snavely et al. |
| 2007/0154067 A1 | 7/2007 | Laumeyer et al. |
| 2007/0292046 A1 | 12/2007 | Johnson |
| 2008/0007451 A1 | 1/2008 | De Maagt et al. |
| 2008/0033648 A1 | 2/2008 | Kelly et al. |
| 2008/0052638 A1 | 2/2008 | Frank et al. |
| 2008/0056538 A1 | 3/2008 | Frank |
| 2008/0059452 A1 | 3/2008 | Frank |
| 2008/0198221 A1 | 8/2008 | Liou |
| 2008/0229248 A1 | 9/2008 | Fagans et al. |
| 2009/0125221 A1 | 5/2009 | Estkowski et al. |
| 2009/0157730 A1 | 6/2009 | Huang |
| 2009/0225155 A1 | 9/2009 | Hirotani |
| 2009/0303110 A1 | 12/2009 | Gregory et al. |
| 2010/0118053 A1 | 5/2010 | Karp et al. |
| 2010/0245571 A1 | 9/2010 | De Voe |
| 2011/0064312 A1 | 3/2011 | Janky et al. |
| 2011/0196550 A1 | 8/2011 | Carrico et al. |
| 2011/0235923 A1 | 9/2011 | Weisenburger et al. |
| 2011/0246002 A1 | 10/2011 | Shavit |
| 2012/0113230 A1 | 5/2012 | Jin |
| 2012/0169734 A1 | 7/2012 | Snavely et al. |
| 2012/0169770 A1 | 7/2012 | Snavely et al. |
| 2012/0293678 A1 | 11/2012 | Amor Molares et al. |
| 2012/0301039 A1 | 11/2012 | Maunder et al. |
| 2013/0159263 A1 | 6/2013 | Paffenroth et al. |
| 2013/0195362 A1 | 8/2013 | Janky et al. |
| 2013/0195363 A1 | 8/2013 | Janky et al. |
| 2013/0235071 A1 | 9/2013 | Ubillos et al. |
| 2013/0235074 A1 | 9/2013 | Cherna et al. |
| 2013/0238724 A1 | 9/2013 | Cunningham |
| 2013/0243250 A1 | 9/2013 | France et al. |
| 2013/0254666 A1 | 9/2013 | Snavely et al. |
| 2014/0072233 A1 | 3/2014 | Horwood |
| 2014/0074766 A1 | 3/2014 | Aristoff |
| 2014/0074767 A1 | 3/2014 | Horwood |

(56) References Cited

U.S. PATENT DOCUMENTS

| | | |
|---|---|---|
| 2014/0074768 A1 | 3/2014 | Horwood |
| 2014/0156411 A1 | 6/2014 | Murgai |
| 2015/0103078 A1 | 4/2015 | Dykes et al. |
| 2015/0170368 A1 | 6/2015 | Janky et al. |
| 2015/0260849 A1 | 9/2015 | Eastman |
| 2015/0266591 A1 | 9/2015 | Petillon |
| 2015/0269860 A1 | 9/2015 | Shaw et al. |
| 2015/0310627 A1 | 10/2015 | Moraites et al. |
| 2015/0348420 A1* | 12/2015 | Kneuper ............ G06F 3/04847 345/629 |
| 2015/0353208 A1 | 12/2015 | Turner |
| 2016/0005154 A1 | 1/2016 | Meyers et al. |
| 2016/0061598 A1 | 3/2016 | NcNair et al. |
| 2016/0188176 A1 | 6/2016 | Runnels |
| 2017/0046962 A1 | 2/2017 | Shipley et al. |
| 2017/0098181 A1 | 4/2017 | Herman et al. |
| 2017/0150060 A1 | 5/2017 | Herz |
| 2017/0192095 A1 | 7/2017 | Jobanputra et al. |
| 2017/0206643 A1 | 7/2017 | Weiss et al. |
| 2017/0278180 A1 | 9/2017 | Landry |
| 2017/0283094 A1 | 10/2017 | Ho |
| 2017/0287196 A1 | 10/2017 | Raeburn et al. |
| 2017/0365064 A1 | 12/2017 | Van 't Woud et al. |
| 2018/0011183 A1 | 1/2018 | Tuxen |
| 2018/0024250 A1 | 1/2018 | Nishi et al. |
| 2018/0041032 A1 | 2/2018 | Kumar et al. |
| 2018/0051914 A1 | 2/2018 | Sercel |
| 2018/0089506 A1 | 3/2018 | Taite et al. |
| 2018/0162558 A1 | 6/2018 | Chao et al. |
| 2018/0220107 A1 | 8/2018 | Williams |
| 2018/0232097 A1 | 8/2018 | Kneuper et al. |
| 2018/0268605 A1 | 9/2018 | Jia et al. |
| 2019/0050136 A1 | 2/2019 | Alfano et al. |
| 2019/0056856 A1 | 2/2019 | Simmons et al. |
| 2019/0210746 A1 | 7/2019 | Feconda et al. |
| 2019/0219026 A1 | 7/2019 | Sheldon-Coulson et al. |
| 2019/0263543 A1 | 8/2019 | Hendrix et al. |
| 2019/0265872 A1 | 8/2019 | Hendrix et al. |
| 2019/0266744 A1 | 8/2019 | Hendrix et al. |
| 2019/0266763 A1 | 8/2019 | Hendrix et al. |
| 2019/0266764 A1 | 8/2019 | Hendrix et al. |
| 2019/0266770 A1 | 8/2019 | Hendrix et al. |
| 2019/0304147 A1 | 10/2019 | Hendrix et al. |
| 2019/0315497 A1 | 10/2019 | Blomquiest |
| 2019/0325652 A1 | 10/2019 | Di et al. |
| 2019/0389602 A1* | 12/2019 | Schilling ................. B64G 1/26 |
| 2020/0018844 A1 | 1/2020 | Fridman et al. |
| 2020/0202732 A1* | 6/2020 | Mecklem ............... G08G 5/045 |
| 2020/0240267 A1 | 7/2020 | Sercel et al. |
| 2020/0312159 A1* | 10/2020 | Hegranes ........... H04B 7/18506 |
| 2020/0312170 A1* | 10/2020 | Sherback ............ G07C 5/0808 |
| 2021/0026524 A1 | 1/2021 | Hendrix et al. |
| 2021/0033309 A1 | 2/2021 | Sercel |
| 2021/0333019 A1 | 10/2021 | Sercel et al. |
| 2021/0404419 A1 | 12/2021 | Sercel et al. |
| 2021/0405187 A1 | 12/2021 | Rosner et al. |
| 2021/0407060 A1 | 12/2021 | Dugan |
| 2022/0024611 A1 | 1/2022 | Hendrix et al. |
| 2022/0024612 A1 | 1/2022 | Sercel et al. |
| 2022/0082019 A1 | 3/2022 | Sercel et al. |
| 2022/0089302 A1 | 3/2022 | Sercel et al. |
| 2022/0090500 A1 | 3/2022 | Sercel |
| 2022/0161944 A1 | 5/2022 | Rhoads et al. |
| 2022/0268524 A1 | 8/2022 | Small et al. |
| 2022/0274721 A1 | 9/2022 | Sercel et al. |
| 2024/0359834 A1 | 10/2024 | Hendrix et al. |

FOREIGN PATENT DOCUMENTS

| | | |
|---|---|---|
| WO | WO 2008/112708 A2 | 9/2008 |
| WO | WO 2010/061448 A1 | 6/2010 |
| WO | WO 2021/041918 A1 | 3/2021 |
| WO | WO 2021/252087 A2 | 12/2021 |

OTHER PUBLICATIONS

Cunio, P. M., et al., 'Advanced Debris Analysis Techniques Enabled by Rich Persistent Datasets', Jan. 16, 2018, Space Traffic Management Conference [Retrieved from internet on Jun. 11, 2019] <URL: https://commons.erau.edu/stm/2018/presentations/16>, in 18 pages.

Ivezic et al., SDSS Standard Star Catalog for Stripe 82: the Dawn of Industrial 1% Optical Photometry. Publisher and location unknown; Mar. 7, 2007, 63 pages.

Keeptrack.space by ThKruz, Javascript application to view data about satellites and the sensors that track them, 2016 [ Viewed on internet on Jun. 11, 2019 ]< URL: https://keeptrack.space > and source code available at <URL: https://github.com/thkruz/keeptrack.space >; downloaded Jul. 15, 2019 in 3 pages.

Rabotin C., NYX-SPACE 0.0.5: A high-fidelity space mission toolkit, with orbit propagation, estimation and some systems engineering Apache-2.0; 2018; downloaded from URL: <https://docs.rs/nyx-space/0.0.5/nyx_space/>; in 2 pages.

Slatton et al., Methods of Processing Geosynchronous Breakups. Advanced Maui Optical and Space Surveillance Technologies Conference (AMOS), May 31, 2018 in 9 pages.

Stuffin.space by jeyoder, Javascript application: A real-time interactive WebGL visualisation of objectsin Earth orbit, 2015 [ Viewed on internet on Jun. 11, 2019 ]< URL: http://stuffin.space > and source code available at <URL: https://github.com/jeyoder/ThingsInSpace >; downloaded Jul. 15, 2019 in 13 pages.

Woffinden, D.C., et al., "Navigating the Road to Autonomous Orbit Rendezvous", J Spacecraft Rockets. (2007) 44(4): 898-909.

Co-Pending Applications of Assignee—Statement dated May 21, 2019 regarding commonly owned applications of Applicant, in 1 page.

International Search Report and Written Opinion dated Jun. 11, 2019 for corresponding PCT/US2019/019026, filed Feb. 21, 2019.

International Search Report and Written Opinion dated Oct. 21, 2020 for corresponding PCT/US2020/043506, filed Jul. 24, 2020.

Ackermann et al., "A systematic examination of ground-based and space-based approaches to optical detection and tracking of satellites", Sandia National Lab. (SNL-NM), Albuquerque, NM; May 1, 2015: 46 pages.

ASTROROMP.com, "Comparison between LX90GPS and LX200GPS", Observationis and use; Undated, 3 pages.

BISQUE.com, "The SkyX Professional Edition—Software", (Jun. 2019), 2 pages.

Celestron Engineering Team, "The Celestron@ EdgeHD™—A Flexible Imaging Platform", (Apr. 2013); 6 pages.

Clark R.N., "Spectroscopy of Rocks and Minerals, and Principles of Spectroscopy". In Manual of Remote Sensing, vol. 3, Remote Sensing for the Earth Sciences, [Rencz A.N. Ed.], John Wiley & Sons, NY, (1999), pp. 3-58.

Diffraction Limited, "MaxIm DL Astronomical Imaging Software by Cyanogen Imaging®", Product Advertisement/Specification; 3 pages.

Elenin et al., "Remote Observatory ISON-NM. Survey of Minor Solar System Bodies", Asteroids, Comets, Meteors 2012. May 2012;1667: 6016.

European Space Agency, "ESA—Scanning and Observing", downloaded Aug. 11, 2023 in 6 pages.

European Space Agency, "ESA—Scanning and Observing—Continuation", Space Safety, downloaded Aug. 11, 2023 in 5 pages.

Faccenda W.J., "GEODSS: Past and Future Improvements", The Mitre Corporation (2000), 7 pages.

Faccenda et al., "Deep Stare Technical Advancements and Status", The Mitre Corporation (2003), 7 pages.

Flury et al., "Searching for Small Debris in the Geostationary Ring", ESA Bulletin. Nov. 2000;104(November): 92-100.

Fors et al., "Telescope Fabra ROA Montsec: A new robotic wide-field Baker-Nunn facility", Pub Astonomical Society of the Pacific. May 14, 2013;125(927): 522 in 34 pages.

Green, Daniel W.E., Central Bureau for Astronomical Telegrams No. 2880; Oct. 31, 2011; downloaded from cbat.eps.harvard.edu/002800/CBET002880.txt; 1 page.

(56) References Cited

OTHER PUBLICATIONS

Hendrix D., "Multi-Spectral Countermeasure and Debris Identification and Mitigation Algorithm Suite", Phase 1 Final Report; (Aug. 2012), 2 pages.
Hendrix D., "Multi-Spectral Countermeasure and Debris Identification and Mitigation Algorithm Suite", Phase 2 Final Report; (Mar. 2015), 2 pages.
IEEE Transactions on Electron Devices, (Fay, P. Ed.), Listing of Conference Papers (Jan. 2003) Part 1; vol. 50, No. 1, 8 pages.
IEEE Transactions on Electron Devices, (Fay, P. Ed.), Listing of Conference Papers (Jan. 2003) Part 2; vol. 50, No. 1, 5 pages.
Johnson et al., "Fundamental stellar photometry for standards of spectral type on the revised system of the Yerkes Spectral Atlas", Astrophysical J. May 1953; 117: 313-352.
MEADE Catalog, company7.com, "Meade® 16" LX200GPS Schmidt-Cassegrain Telescope, Specification and Features; Undated: pp. 44-49.
National Renewable Energy Laboratory [NREL], "Solar Spectra: Standard Air Mass Zero—2000 ASTM Standard Extraterrestrial Spectrum Reference E-490-00", (Nov. 2003); 2 pages.
QSI Imaging.com, "Model 660 Camera Specification Sheet—Overview", (2023); 8 pages.
Russian Academy of Sciences (Keldysh Instiute of Applied Mathematics), "ISON activitis on highly eliptical orbit (HEO), geosynchronous orbit (GEO) and near-earth objects (NEO) observation and analysis in 2013", 51st Session of STSC Copuos, Vienna, Austria Feb. 10-21, 2014, presentation in 23 pages.
Schildknecht et al., "Challenges Related to Discovery, Follow-up, and Study of Small High Area-to-Mass Ratio Objects at Geo", Proceedings AMOS, (2007); 6 pages.
Sibert et al., "Collaborative Commercial Space Situational Awareness with ESpOC-Empowered Telescopes", Proceedings AMOS. Sep. 2013: 9 pages.
Simbad Astronomical Database—CDS (Strasbourg, France) Product Information Sheet; downloaded Aug. 11, 2023; [Wenger et al., 2000]; 2 pages.
STARIZONA (Adventure in Astronomy & Nature), "HyperStar Specifications", Mar. 2017, 2 pages.
U.S. Air Force, "Ground-Based Electro-Optical Deep Space Surveillance", A GEODSS Sourcebook, Oct. 19, 2008 version; 117 pages.
U.S. Naval Observatory, Astrometry Department, Star Catalogs, Apr. 25, 2017, 1 page.
Wenger et al., "The SIMBAD astronomical database—The CDS reference database for astronomical objects", Astronomy and Astrophysics Supplement Series. Apr. 1, 2000;143(1): 9-22.
Zemax—An Ansys Company, "Products made with Zemax define our world", Product Website downloaded Aug. 11, 2023; 9 pages.
Abbot et al., "Decision support in space situational awareness", Lincoln Lab J. Nov. 2, 2007;16(2): 297 in 40 pages.
European Space Policy Institute [ESPI], Towards a European Approach to Space Traffic Management—Full Report, ESPI Vienna, Austria; Jan. 2020, pp. 1-81.
Exoanalytic Solutions, Demonstrates Value-added Service to Provide Direct Support to First Successful On-Orbit Servicing in Geosynchronous Orbit, Press Release Apr. 4, 2022; pp. 1-4.
Flewelling et al., Formation Flying as Formalism for Space Traffic Management, AIAA SciTech Forum, Jan. 6-10, 2020, Orlando, FL. Pgs. 1-17.
Ianni et al., "Overview of human-centric space situational awareness science and technology". In Proceedings of the Advanced Maui Optical and Space Surveillance Technologies Conference, Maui, Hi, USA Sep. 1, 2012; pp. 11-14.
Lal et al., Global trends in space situational awareness (SSA) and space traffic management (STM), IDA Science & Technology Policy Institute Document #D-9074, Apr. 2018; 153 pages.
Vallado D.A., Fundamentals of Astrodynamics and Applications, 4th Edition, Space Technology Library, Microcosm Press, Hawthorne, CA; 2013; Cover and Table of Contents, pp. 1-21.

\* cited by examiner

SYSTEMS AND VISUALIZATION INTERFACES FOR ORBITAL PATHS AND PATH PARAMETERS OF SPACE OBJECTS

INCORPORATION BY REFERENCE OF RELATED APPLICATIONS

This application is a division of U.S. patent application Ser. No. 17/220,817, filed Apr. 1, 2021, which is a division of U.S. patent application Ser. No. 17/014,804, filed Sep. 8, 2020, which claims the benefit of priority under 35 U.S.C. § 111(a) to International Application No. PCT/US2020/043506, filed on Jul. 24, 2020, which claims the benefit under 35 U.S.C. § 119(e) of U.S. Provisional Patent Application Nos. 62/878,687, filed Jul. 25, 2019, and 63/022,236, filed May 8, 2020. The entire contents of these applications are incorporated by reference and made a part of this specification.

BACKGROUND

Field

This disclosure relates generally to tracking space objects such as satellites and visual interfaces and computer configurations used in such tracking.

Description of Related Art

Visualization interfaces can be used to allow a user to view, manipulate, and adjust data representing tracked orbital objects (e.g., satellites). Tracking orbital objects involves taking in an amount of data and incorporating that data into a workable and usable interface.

Tracking orbital objects may be done using photographs of objects in space and tracking their positions using a plurality of photographs. Visualization systems have been developed in various fields that provide some functionality with regard to portraying various information. However, many features are lacking and many problems exist in the art for which this application provides solutions.

SUMMARY

Example embodiments described herein have innovative features, no single one of which is indispensable or solely responsible for their desirable attributes. Without limiting the scope of the claims, some of the advantageous features will now be summarized.

In some embodiments, a system for determining and displaying path parameters can include a display interface. The display interface can be configured to receive, via a user interface, a first identifier associated with a first space object and determine a first maneuver of the first space object. The first maneuver can include a perturbation of the path of the first space object. Based on the first identifier and the first maneuver, the display system can identify one or more path parameters associated with a path of the first space object and generate a display interface. The display interface can include a longitude-time graph having a longitude axis spanning from a lower-longitude limit to an upper-longitude limit and a time axis spanning from the lower-time limit to the upper-time limit and an indication of the one or more path parameters.

BRIEF DESCRIPTION OF THE DRAWINGS

The following drawings and the associated descriptions are provided to illustrate embodiments of the present disclosure and do not limit the scope of the claims.

FIG. 7 shows the same view as FIG. 6 after the first longitude axis and the synchronized second longitude axis have been zoomed in.

FIG. 8 shows the same view as FIG. 7 after the first time axis and the synchronized second time axis have been zoomed in.

Figure 1A:
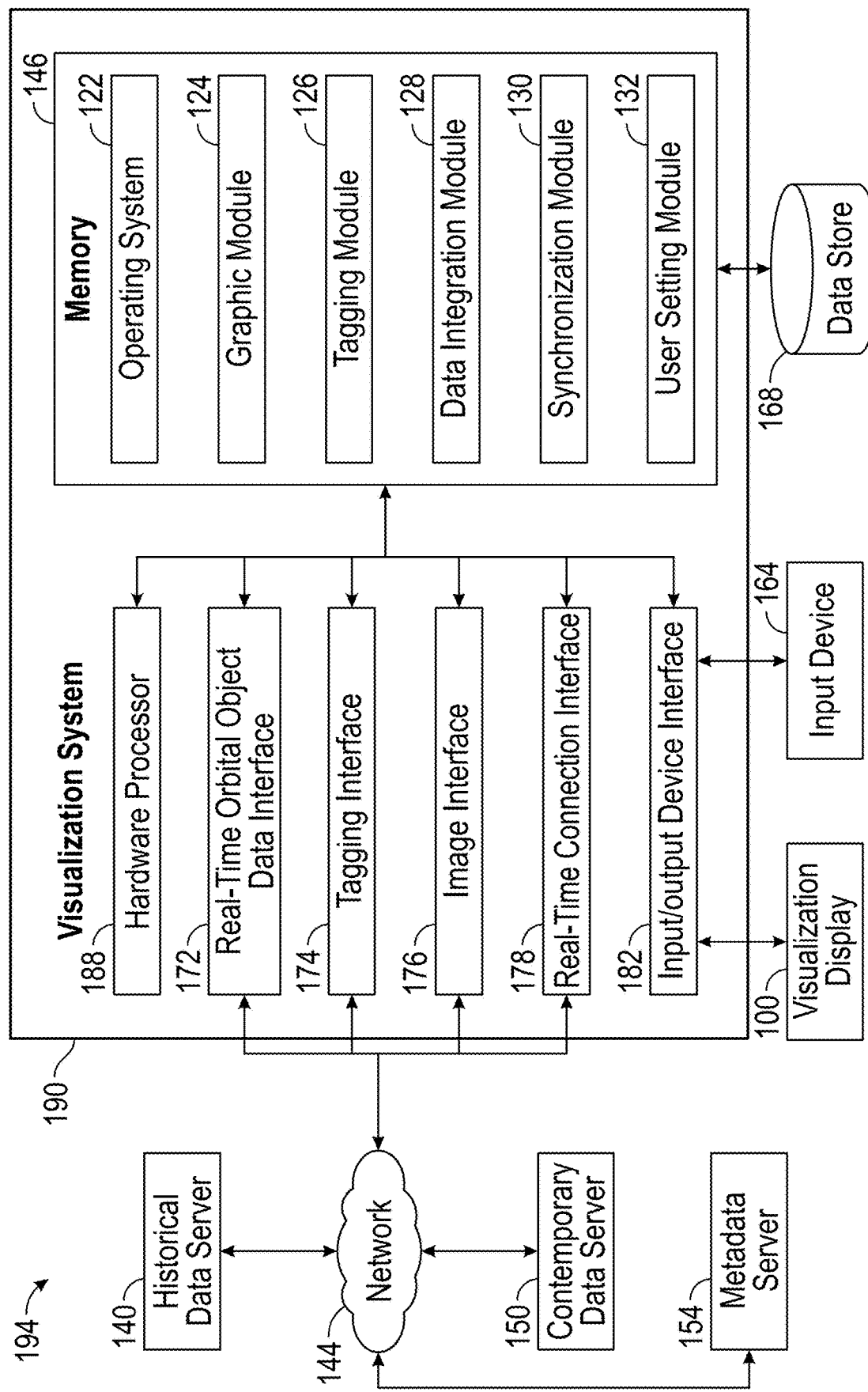
FIG. 1A schematically shows a network configuration that allows for the passing of data to a visualization system.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Described herein are methodologies and related systems for visualizing data (e.g., tracks, orbits, photographs, measurements, maneuvers, transfer actions, etc.) from tracked satellites and other space objects. It will be understood that although the description herein is in the context of satellites, one or more features of the present disclosure can also be implemented in tracking objects other than satellites like, for example, aircraft, watercraft, projectiles, and other objects. Some embodiments of the methodologies and related systems disclosed herein can be used with various tracking systems, including, for example, those based on government databases.

Unless explicitly indicated otherwise, terms as used herein will be understood to imply their customary and ordinary meaning.

Disclosed herein are methods and systems relating generally to the tracking of objects in orbit (e.g., satellites), other space objects, and related systems and methods of providing an interactive user interface to interact with data related to the tracking of these objects. The information therein can be stored in one or more databases.

Tracking objects in orbit and other space objects can include receiving image data (e.g., photographs) of portions of the sky from one or more telescopes positioned at various positions across the globe. The photograph data can be used to map out the entirety or near entirety of the sky. Various altitudes above sea level may be tracked. The data can be tracked and processed in real-time. For example, a contemporary database may be configured to receive real-time image data. A historical database may be configured to store data received before a threshold time. The threshold time may be a specified amount of time (e.g., years, months, days, etc.). Alternatively, the threshold time may refer to a time based on a user action. For example, the historical database may be configured to store data received before a user causes the system to display the user interface. Using an algorithm, the received data may be consolidated and categorized. For example, the algorithm may be configured to determine whether objects that appear in a plurality of photographs correspond to the same object over time and space.

FIG. 1A is an example network configuration 194 for a visualization system 190. The architecture of the visualization system 190 can include an arrangement of computer hardware and software components used to implement aspects of the present disclosure. The visualization system 190 may include more or fewer elements than those shown in FIG. 1A. It is not necessary, however, that all of these elements be shown in order to provide an enabling disclosure. In some embodiments, the visualization system 190 is an example of what may be referred to under different names.

As illustrated, the visualization system 190 can include a hardware processor 188, a memory 146, a real-time orbital object data interface 172, a tagging interface 174, a image interface 176, a real-time connection interface 178, and/or an real-time connection interface 178, each of which can communicate with one another by way of a communication bus 142 or any other data communication technique. The hardware processor 188 can read and write to the memory 146 and can provide output information for the visualization display 100. The real-time orbital object data interface 172, tagging interface 174, image interface 176, and/or real-time connection interface 178 can be configured to accept input from an input device 164, such as a keyboard, mouse, digital pen, microphone, touch screen, gesture recognition system, voice recognition system, and/or another input device capable of receiving user input. In some embodiments, the visualization display 100 and the input device 164 can have the same form factor and share some resources, such as in a touch screen-enabled display.

In some embodiments, the real-time orbital object data interface 172, the tagging interface 174, the image interface 176, and/or the real-time connection interface 178 can be connected to a historical data server 140, a contemporary data server 150, and/or a metadata server 154 via one or more networks 144 (such as the Internet, 3G/Wi-Fi/LTE/5G networks, satellite networks, etc.). The real-time orbital object data interface 172 can receive graphical data information related to orbital objects via the network 144 (the network 144 can provide one-way communication or two-way communication). In some embodiments, the real-time orbital object data interface 172 may receive, where applicable, object data information or information that can be used for location determination (such as a cellular and/or Wi-Fi signal that can be used to triangulate a location) and determine the position of one or more objects.

The tagging interface 174 can receive tagging data from a user via the input/output device interface 182. The metadata server 154 can provide an application programming interface (API) that the tagging interface 174 can access via the network 144 (such as, for example, a 3G, Wi-Fi, LTE, or similar cellular network). The metadata server 154 may comprise data from one or more third-party providers. For example, the metadata server 154 may comprise government information (e.g., received from a United States Air Force satellite database). The image interface 176 may receive track information (such as, for example, an ordered list of known location coordinates) from a historical data server 140, contemporary data server 150, and/or metadata server 154 via the network 144. The track information can also include track-related information, such as photos, videos, or other data related to orbiting objects. In some embodiments, instead of receiving the track information over a network 144 from a historical data server 140, the system can receive such track information from a user via a computer-readable storage device, such as, for example, a USB thumb drive. The image interface 176 can also receive images (e.g., photographs, video) from a contemporary data server 150. In some embodiments, the map data can provide longitude, latitude, altitude information, and any other information related to orbiting objects.

The memory 146 can contain computer program instructions (grouped as modules or components in some embodiments) that the hardware processor 188 can execute in order to implement one or more embodiments described herein. The memory 146 can generally include RAM, ROM and/or other persistent, auxiliary or non-transitory computer-readable media. The memory 146 can store an operating system 122 that provides computer program instructions for use by the hardware processor 188 in the general administration and operation of the visualization system 190.

The memory 146 can include computer program instructions and other information for implementing aspects of the present disclosure including a graphic module 124, a tagging module 126, a data integration module 128, a synchronization module 130, a user settings module 132, other modules, and/or any combination of modules.

In some embodiment, the memory 146 may include the graphic module 124 that generates a track from the received ordered list of known locations using algorithms, such as interpolation or extrapolation algorithms. Additionally, the graphic module 124 may, in response to a user determination, alter the format (e.g., axes, labels, values) of the graphical display. Examples of functionality implemented by the graphic module 124 are more fully described, for example, with reference to FIGS. 1A-5.

In some embodiments, the memory 146 includes a tagging module 126 that the hardware processor 188 executes in order update, in response to a user action, aspects (e.g., metadata, values) of the underlying data. Accordingly, the tagging module 126 can provide data (e.g., updates) to the synchronization module 130. Examples of functionality implemented by the tagging module 126 are more fully described, for example, with reference to FIGS. 10A-10D. The data integration module 128 can correlate various data automatically or in response to a user input. For example, the data integration module 128 can combine data from the one or more servers (e.g., the historical data server 140, the contemporary data server 150, and the metadata server 154) that may be used for displaying on the visualization display 100. Examples of functionality implemented by the data integration module 128 are more fully described, for example, with reference to FIGS. 2-9.

In some embodiments, the memory 146 includes a synchronization module 130 that can be configured to correlate various aspects of data from the one or more servers. For example, the synchronization module 130 can be configured to synchronize the display of a data set on multiple graphs or to synchronize elements (e.g., axes, labels, dimensions, alignments, etc.) of one or more graphs of the visualization display 100. The synchronization module 130 can update data based on inputs from the tagging module 126 (such as stitched objects or elements), guidance parameters from the user settings module 132, and/or inputs from the data integration module 128. Examples of functionality implemented by the synchronization module 130 are more fully described, for example, with reference to FIGS. 2-9.

In some embodiments, the memory 146 includes a user settings module 132. The user settings module 132 can provide access to various user settings related to user preferences, including graph parameters, graph configurations (e.g., layout, orientation, formatting, etc.) and modes (e.g., display mode, tag mode, etc.). For example, the threshold values used for determination of the direction guidance mode may be accessed through the user settings module 132. In some instances, the user settings module 132 may provide connectivity to a data store 168 and access user settings from or store user settings to the data store 168. Examples of functionality implemented by the user settings module 132 are more fully described, for example, with reference to FIGS. 2-10D. In some embodiments, other interfaces and modules, such as the real-time orbital object data interface 172, the tagging interface 174, the image interface 176, real-time connection interface 178, and/or input/output device interface 182 may have access to the data store 168.

The historical data server 140 may communicate via the network 144 with a historical data interface. The historical data interface may include one or more of the real-time orbital object data interface 172, the tagging interface 174, the image interface 176, and the real-time connection interface 178. The historical data interface may be configured to receive historical data of objects in orbit around a planet from a historical data set. The historical data may comprise a time, a latitude, a longitude, a scalar, and/or an object identifier (e.g., name) for each object. The historical data can comprise data collected over a period of time greater than a threshold time (e.g., a year).

The amount of historical data can be unusually immense. For example, the amount of historical data may include billions of data identifiers derived from petabytes or even exabytes of photographic data. The historical data obtained may be increasing over time. Such an immense amount of data can cause serious challenges related to, for example, maintaining, sorting, extracting, transmitting, and/or displaying that data, particularly in a timely and organized fashion. This data may be supplemented from other databases (e.g., the metadata server 154), such as third-party databases. Such third-party databases may include government organizations, such as military groups (e.g., the United States Air Force), but may include private (e.g., commercial) sources additionally or alternatively.

The contemporary data server 150 may communicate via the network 144 with a real-time (e.g., contemporary) data interface configured to receive contemporary data of objects in orbit around a planet from a contemporary data set. The contemporary data may comprise a time, a latitude, a longitude, an object identifier, and/or a scalar for each object. The contemporary data may comprise data collected after the historical data available from the historical data set. The contemporary data may include data received within a few minutes or even seconds of a current time. The contemporary data may be data stored after a user has initiated a particular action, such as causing the system to generate a visualization display 100. In such a case, the system can be configured to update the visualization display 100 with pixels associated with the data collected after the generation of the visualization display 100.

Figure 1B:
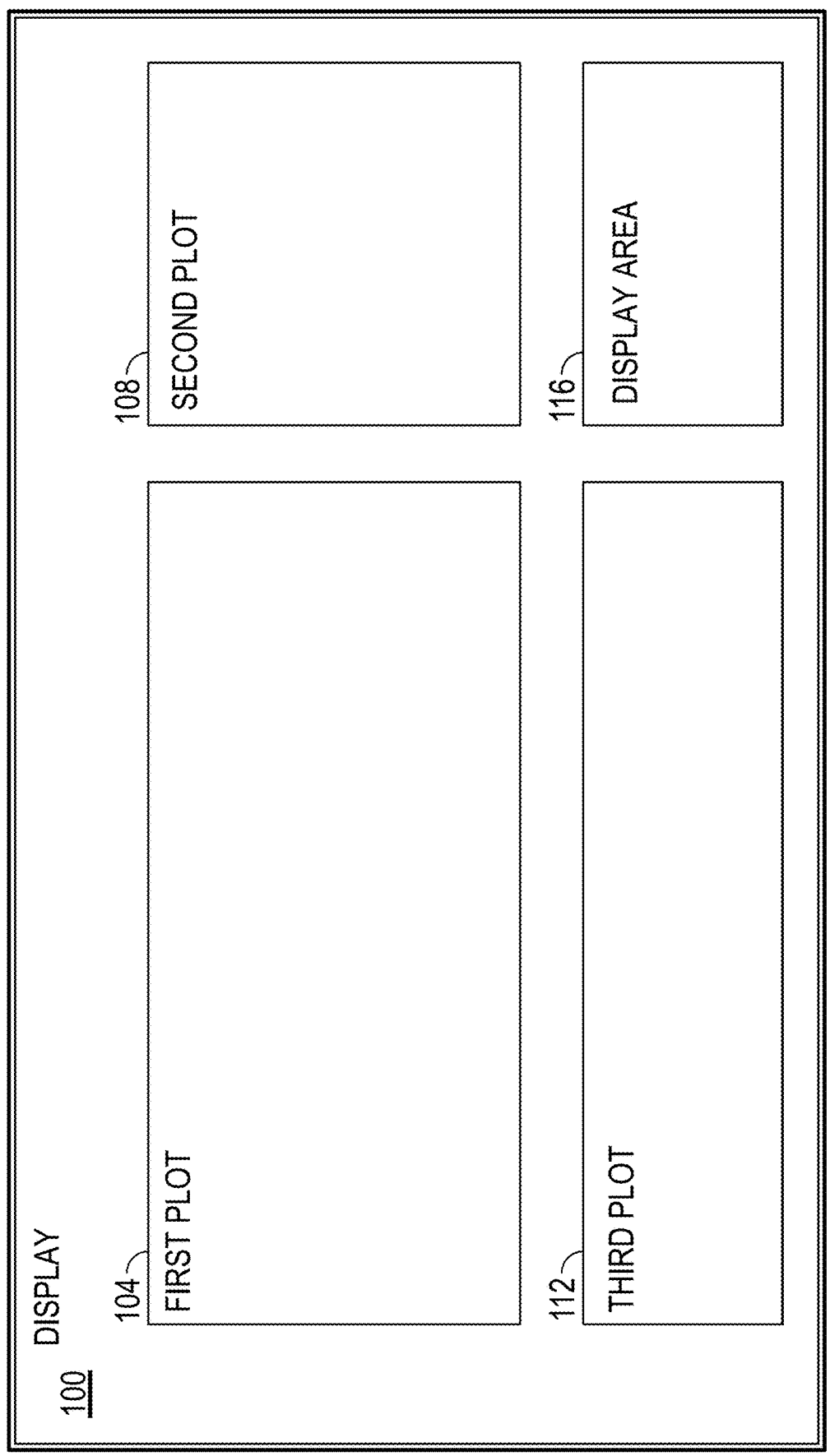
FIG. 1B shows a schematic of an example visualization display.

FIG. 1B shows a schematic of an example visualization display 100. Such a visualization display 100 may operate within the network configuration 194 of FIG. 1A, for example. The visualization display 100 may be displayed on any type of digital display device, such as a desktop computer, a laptop computer, a projection-style device, a smartphone, a tablet, a wearable device, or any other display device. The visualization display 100 may include a first plot 104, a second plot 108, a third plot 112, and/or a display area 116.

The first plot 104 and second plot 108 may be displayed with similar (e.g., within a few pixels) vertical dimensions and/or similar vertical alignment. For example, the first plot 104 may be disposed directly left of the second plot 108. The third plot 112 may have similar vertical dimensions and/or similar vertical alignment as the display area 116. The first plot 104 may have similar horizontal dimensions and/or similar horizontal alignment as the third plot 112. In some embodiments, the second plot 108 may have similar horizontal dimensions and/or similar horizontal alignment as the display area 116. In some designs, the second plot 108 may include a tagging interface (e.g., a stitching and/or splicing interface).

Figure 2:
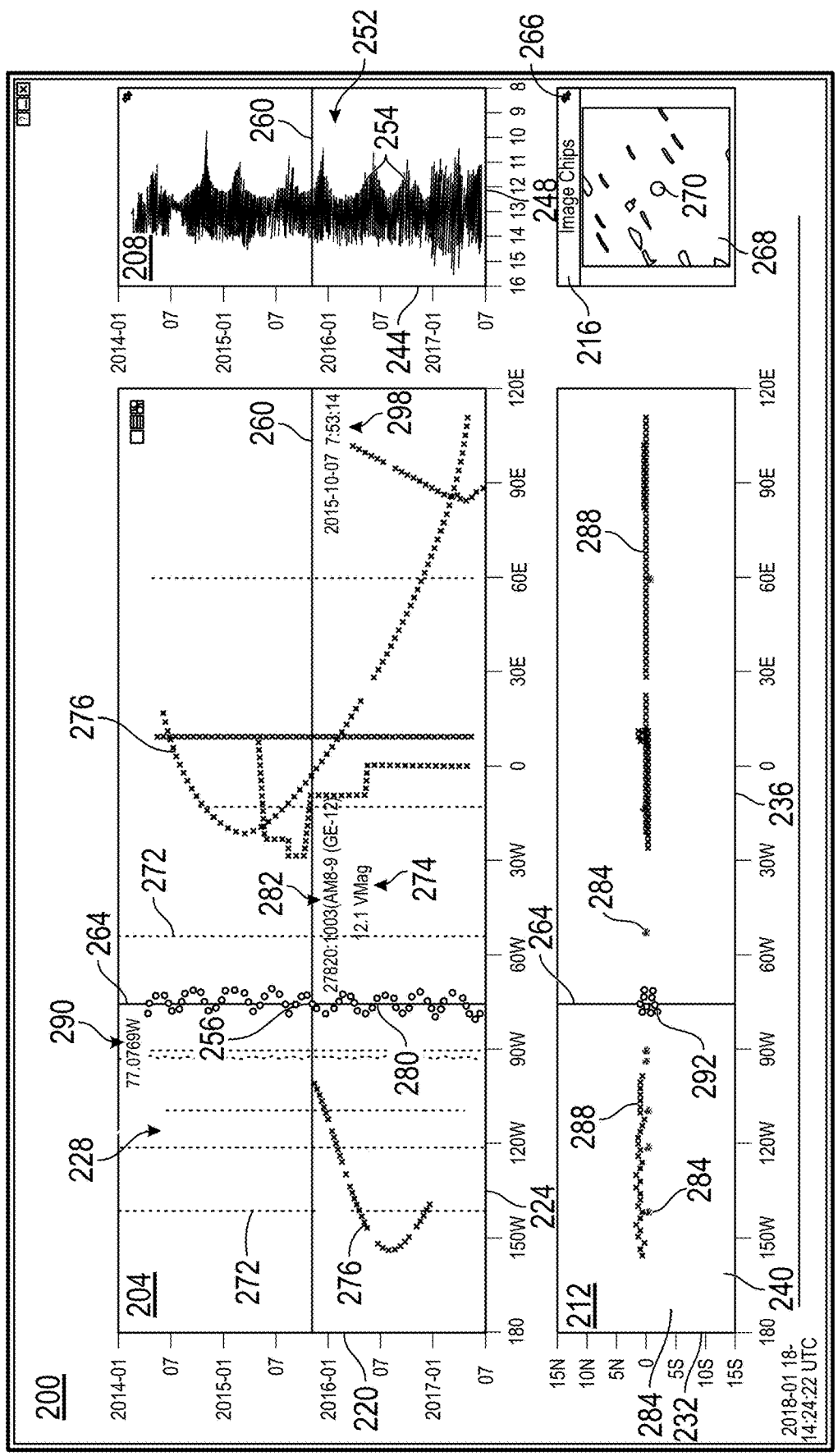
FIG. 2 shows an example visualization display with a longitude-time graph, scalar-time graph, a longitude-latitude graph, and a display area.
Figure 3:
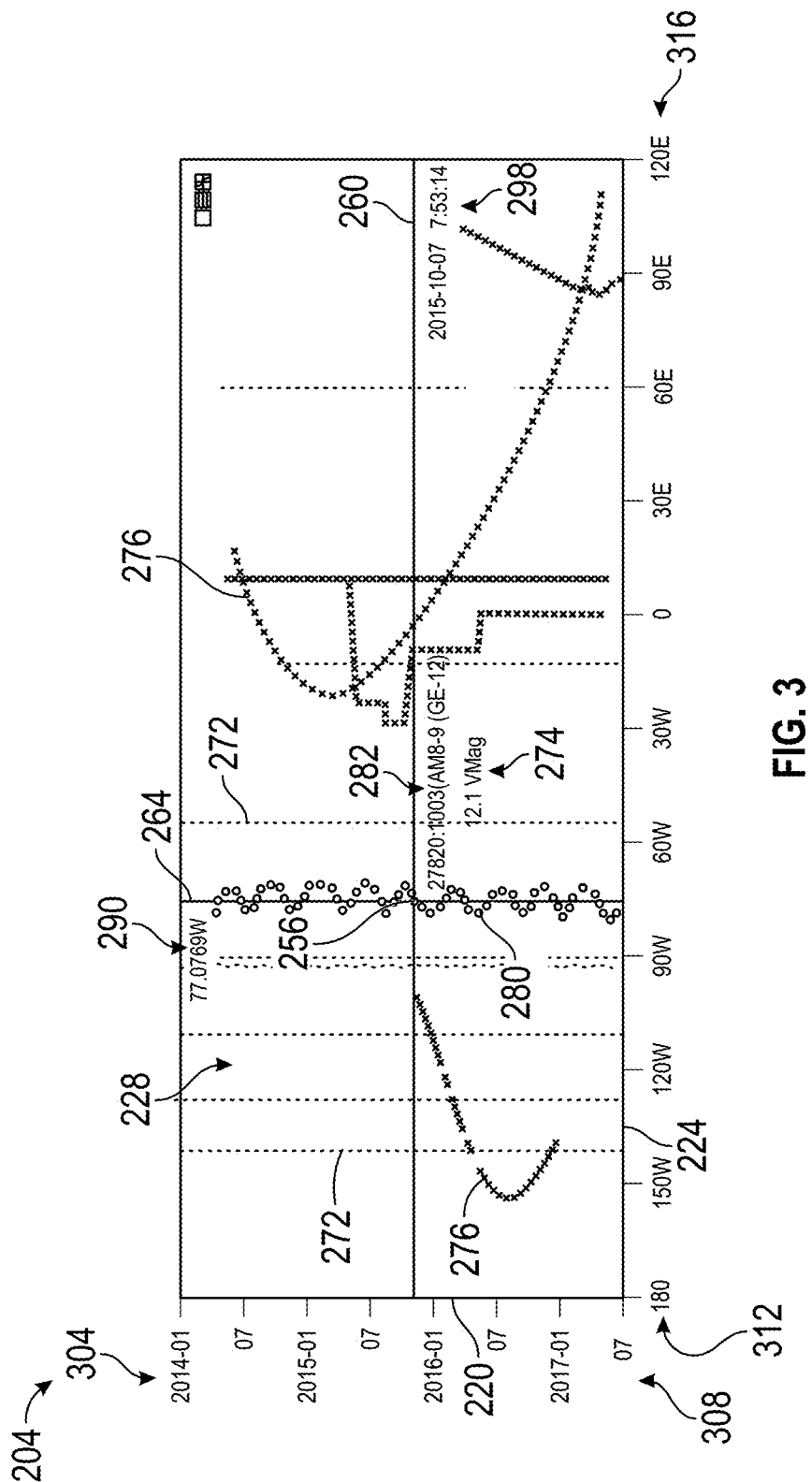
FIG. 3 shows a detail view of an example longitude-time graph that may be a part of the visualization display described in FIG. 2.
Figure 4:
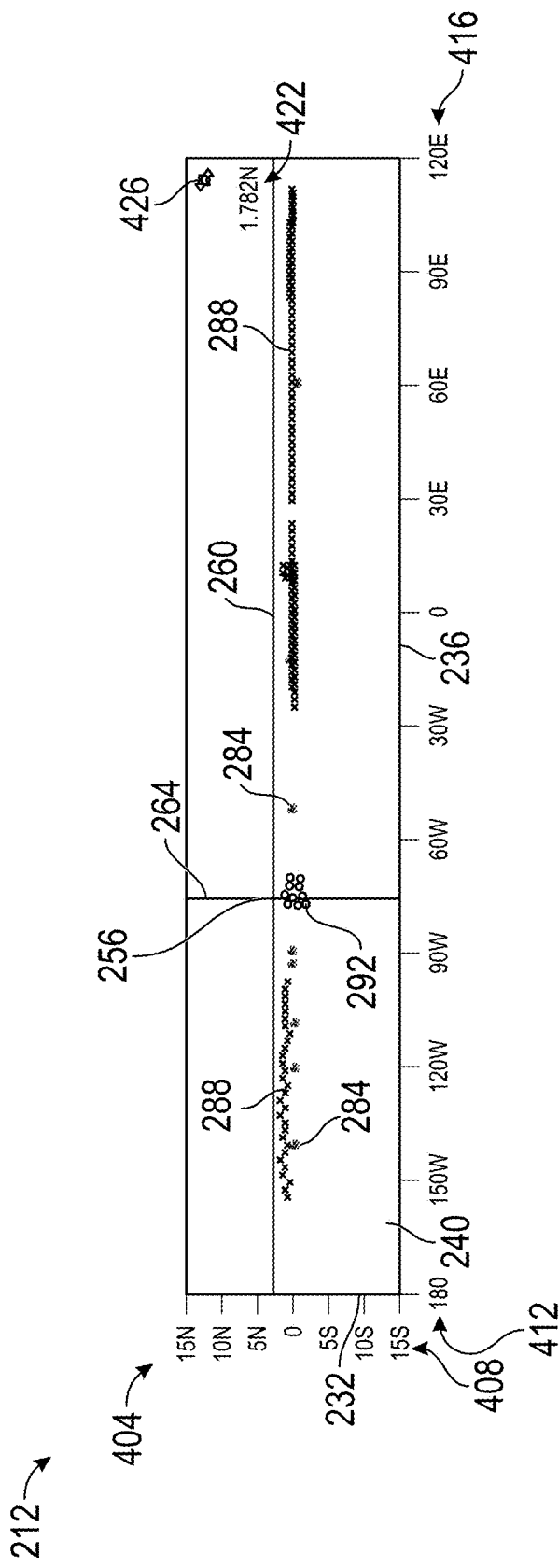
FIG. 4 shows a detail view of an example longitude-latitude graph that may be a part of the visualization display described in FIG. 2.
Figure 5:
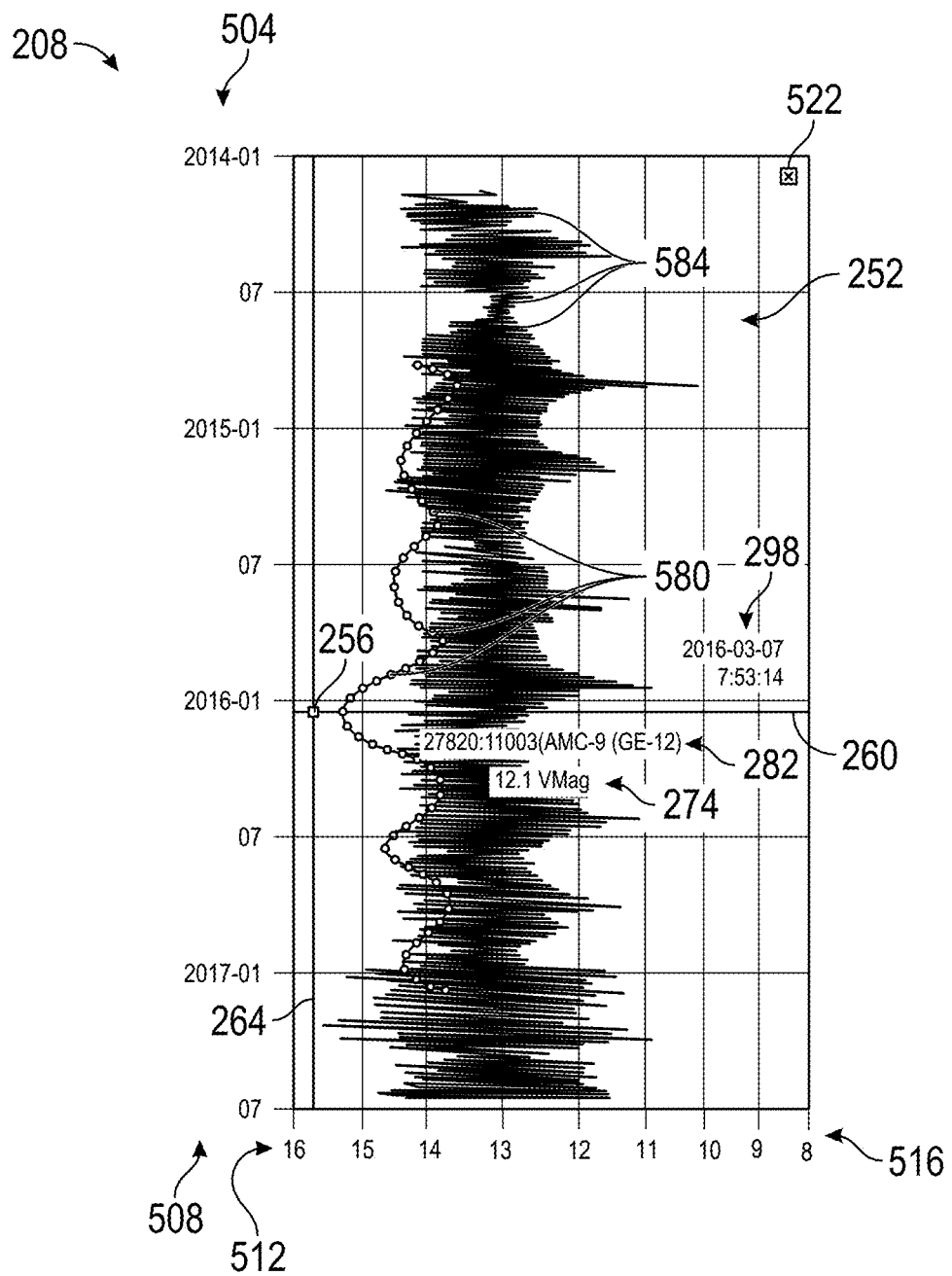
FIG. 5 shows a detail view of an example scalar-time graph that may be a part of the visualization display described in FIG. 2.

FIG. 2 shows an example visualization display 200 with a longitude-time graph 204, scalar-time graph 208, a longitude-latitude graph 212, and a display area 216. The visualization display 200 may correspond in some or all respects with the visualization display 100 of FIG. 1B. FIGS. 3-5 may provide further details related to one or more portions of FIG. 2.

The visualization display 200 can include a longitude-time graph area 228. In some embodiments, the longitude-time graph area 228 is bounded by a first longitude axis 224 and a first time axis 220. Each of the first longitude axis 224 and/or first time axis 220 can include one or more axis labels. In some designs, the axis labels of the first longitude axis 224 are not shown in relation to the longitude-time graph 204 but in relation only to, for example, the longitude-latitude graph 212 (see, e.g., FIGS. 10A-10D). The axis labels of the first longitude axis 224 and/or first time axis 220 may be equidistant from one another to portray equal intervals of the respective longitude or time. The first longitude axis 224 may span any portion of longitudes found on a planet (e.g., Earth). For Earth, the range may be from 180 W (e.g., 180° West or −180°) to 180 E (e.g., 180° East or +180°) or any range therein. For example, as shown in FIG. 2, the first longitude axis 224 spans from 180 W to 120 E. However, other ranges are possible, examples of which are described below. The first longitude axis 224 may run eastern-most to western-most from left to right (e.g., as shown in FIG. 2), but other configurations are possible.

The first time axis 220 may span any time from a historical time to nearly a current time of a user. For example, as shown by FIG. 2, the first time axis 220 may span from 2014-07 (e.g., July 2014) to 2017-07 (e.g., July 2017). The displayed time may correspond to a universal time, such as the coordinated universal time (UTC). Stored time values may similarly be in UTC. The latest time may be labeled "current time," "now," or a similar label and/or may indicate to a user that data from the most current time available are displayed. The most current time available may include time within a few seconds (e.g., 1-60 seconds) or a few minutes (e.g., 1-30 minutes) of a present time at which a viewer is observing the data. The first time axis 220 may span from a historical time from an earliest time when a database (e.g., a historical data server 140, a miscellaneous data server 154) has available data. The earliest time when the database has data may be as far back as the year 2010. In some embodiments, the historical data server 140, the contemporary data server 150, and/or the metadata server 154, may be configured to store some or all of the corresponding data in short-term memory storage (e.g., Random Access Memory (RAM)). The first time axis 220 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

Each axis label of the first longitude axis 224 and/or first time axis 220 may include gridlines. For example, the longitude-time graph 204 may include one or more horizontal gridlines 296 and/or vertical gridlines 294 (not shown in FIG. 2). The vertical gridlines 294 and horizontal gridlines 296 may aid a viewer in identifying a particular point within one or more of the graphs. To further aid a user in visualizing the orbital object information, in some embodiments, the longitude-time graph 204 may display a longitude-time map (not shown in FIG. 2). The longitude-time map may be a geographical map of a portion of the planet. For example, the longitude-time map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-time graph 204) may be superimposed over the geographic map (e.g., the longitude-time map).

The longitude-latitude graph 212 may include a longitude-latitude graph area 240 that is bounded by a second longitude axis 236 and a latitude axis 232. Each of the second longitude axis 236 and/or the latitude axis 232 can include one or more axis labels. The second longitude axis 236 and the first longitude axis 224 may be identical. For example, first longitude axis 224 may respond to a user input in the same way as the second longitude axis 236. In some embodiments, the axis labels of the second longitude axis 236 represent the values of the axis labels for the longitude-time graph 204. The axis labels of the second longitude axis 236 and/or the latitude axis 232 may be equidistant from one another to portray equal intervals of the respective longitude or latitude. Like the first longitude axis 224, the second longitude axis 236 may span any portion of longitudes found on the planet. For example, as shown in FIG. 2, the second longitude axis 236 spans from 180 W to 120 E. However, other ranges are possible. Like the first longitude axis 224, the second longitude axis 236 may run eastern-most to western-most from left to right (e.g., as shown in FIG. 2), but other configurations are possible.

The latitude axis 232 may span any latitude found on the planet. For example, the latitude axis 232 may span from 90 S (e.g., 90° South) to 90 N (e.g., 90° North) or any range therein. For example, as shown in FIG. 2, the latitude axis 232 may range from 15 S (e.g., 15° South) to 15 N (e.g., 15° North). The latitude axis 232 may include axis labels that run western-most to eastern-most from left to right (e.g., as shown in FIG. 2), but other variations are possible. Axis labels may be spaced equidistant from each other to indicate equal latitude intervals therebetween.

Each axis label of the first longitude axis 224 and/or latitude axis 232 may include gridlines. For example, the longitude-latitude graph 212 may include one or more horizontal gridlines 296 and/or vertical gridlines 294. In some designs, the vertical gridlines 294 may correspond to gridlines found in the longitude-time graph 204. If the first longitude axis 224 and the second longitude axis 236 span the same values, then the same vertical gridlines 294 may appear to run through both the longitude-time graph 204 and the longitude-latitude graph 212. In some embodiments, the longitude-latitude graph 212 may display a longitude-latitude map. In some designs, the longitude-latitude map may include a portion of the same features in the longitude-time map. The longitude-latitude map may be a geographical map of a portion of the planet. For example, the longitude-latitude map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-latitude graph 212) may be superimposed over the geographic map (e.g., the longitude-latitude map).

The scalar-time graph 208 may include a scalar-time graph area 252 that is bounded by a scalar axis 248 and a second time axis 244. Each of the scalar axis 248 and/or the second time axis 244 can include one or more axis labels. The second time axis 244 and the first time axis 220 may be identical. For example, first time axis 220 may respond to a user input in the same way as the second time axis 244. In some embodiments, the axis labels of the first time axis 220 represent the values of the axis labels for the scalar-time graph 208. The axis labels of the scalar axis 248 and/or the second time axis 244 may be equidistant from one another to portray equal intervals of the respective longitude or latitude. Like the first time axis 220, the second time axis 244 may span any time from a historical time to nearly a current time of a user. Additional details on the historical and (nearly) current times are discussed above in regard to the longitude-time graph 204.

Like the first time axis 220, the second time axis 244 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

The scalar axis 248 may span any value of scalars associated with scalars within a database. Each scalar displayed may correspond to a magnitude or other value. For example, the magnitude may represent an intensity (e.g., of light from the orbital object). However, other scalar values are also possible, such as a size, a projected area, a temperature, a mass, a radar cross section, an altitude, an inclination, a delta-V, a time until a certain event, a probability of a certain event, etc. Many variants are possible. The scalar axis 248 may include axis labels that run greatest to smallest from left to right (e.g., as shown in FIG. 2), but other variations are possible. Axis labels may be spaced equidistant from each other to indicate equal scalar intervals therebetween.

Each axis label of the scalar axis 248 and/or the second time axis 244 may include gridlines. For example, the scalar-time graph 208 may include one or more horizontal gridlines 296 and/or vertical gridlines 294. In some designs, the horizontal gridlines 296 may correspond to gridlines found in the longitude-time graph 204. If the first time axis 220 and the second time axis 244 span the same values, then the same horizontal gridlines 296 may appear to run through both the longitude-time graph 204 and the scalar-time graph 208.

The visualization display 200 may further include a display area 216. The display area 216 may be configured to display an image chip 268. This may offer a viewer an opportunity to see an underlying photograph from which image data were extracted that correspond to a set of data or identifiers that are associated with one or more points displayed by the visualization display 200. The image chip 268 may correspond to a photograph of one or more orbital objects. For example, the image chip 268 may be a representation of the photograph. In some cases, the image chip 268 may display an object image 270 that represents an orbital object. The image chip 268 may include multiple object images 270 (e.g., sequential images, summated images (see below), etc.). The display area 216 may also include an interface toggle 266, which is described in more detail below.

The visualization display 200 may further include a point marker 256. The point marker 256 may be used to identify a pixel associated with one or more points (e.g., longitude-time points) indicated by a user within the display currently. For example, the point marker 256 may comprise a highlighted pixel (or cluster of pixels around the highlighted pixel) to identify the current pixel/point. The one or more points displayed by the visualization display 200 may be received from one or more databases (e.g., the historical data server 140, the contemporary data server 150, the metadata server 154) via one or more data interfaces (e.g., the real-time orbital object data interface 172, the tagging interface 174, the image interface 176, the real-time connection interface 178). The data interfaces may be referred to as application program interfaces (e.g., APIs). The user may use an input device (e.g., a keyboard, a mouse, a digital pen, a microphone, a touch screen, etc.) to indicate the currently identified pixel. The point marker 256 may further be indicated by a horizontal tracking line 260 and/or vertical tracking line 264. As shown in FIG. 2, each of the horizontal tracking line 260 and vertical tracking line 264 may be visible in multiple graphs. For example, if the point marker 256 is displayed in the longitude-time graph 204, the horizontal tracking line 260 may be displayed in both the longitude-time graph 204 and the scalar-time graph 208. Similarly, the vertical tracking line 264 may be visible in both the longitude-time graph 204 and the longitude-latitude graph 212.

The point marker 256 may be associated with one or more point marker metadata stamps. The one or more point marker metadata stamps may display one or more data types not evident from a graph in which the point marker 256 is currently displayed. For example, in the longitude-time graph 204, a scalar stamp 274 and/or object identifier stamp 282 may be displayed. This may be because the longitude-time graph 204 is not configured to display scalar and/or object identifier information. Similarly, a time value, scalar value, and/or object identifier may be displayed for an identified pixel within the longitude-latitude graph 212. Moreover, a longitude value, latitude value, and/or object identifier may be displayed for an identified pixel within the scalar-time graph 208. As shown in FIG. 2, the scalar stamp 274 and/or object identifier stamp 282 may be displayed near (e.g., within a few pixels of) the point marker 256. The scalar stamp 274 can display a scalar value corresponding to a point associated with the identified (e.g., highlighted) pixel. As shown, the scalar value could be, for example, "12.1 VMag." Similarly, the object identifier stamp 282 may display an object identifier (e.g., object name) corresponding to the point associated with the identified pixel. As shown, the object identifier could be, for example, 27820:11003 (AMC-9 (GE-12)). In some embodiments, as noted above, a latitude stamp (not shown) can be displayed. The latitude stamp may be displayed near the point marker 256 and may display a latitude value corresponding to the point associated with the identified pixel.

One or more of the horizontal tracking line 260 and/or the vertical tracking line 264 may have corresponding tracking line metadata stamps. The one or more tracking line metadata stamps may correspond to data types displayed by the corresponding graph in which the identified pixel is displayed. For example, as shown in FIG. 2, an identified pixel within the longitude-time graph 204 may include a horizontal tracking line 260 and/or the vertical tracking line 264 that correspond, respectively, to a tracking line time stamp 298 and/or a tracking line longitude stamp 290. Similarly, an identified pixel within the longitude-latitude graph 212 may include a horizontal tracking line 260 and/or vertical tracking line stamp 290 that correspond, respectively, to a tracking line latitude stamp and/or a tracking line longitude stamp 290. Moreover, an identified pixel within the scalar-time graph 208 may correspond to a horizontal tracking line 260 and/or vertical tracking line stamp 290 that correspond, respectively, to a tracking line time stamp and/or a tracking line scalar stamp. In this way, a user can quickly identify one or more values associated with the pixel identified by the point marker 256. The horizontal tracking line stamp (e.g., tracking line time stamp 298) and/or the vertical tracking line stamp (e.g., tracking line longitude stamp 290) may be displayed near the corresponding tracking line.

As shown in FIG. 2, the longitude-time graph 204 may include one or more unhighlighted collections 272 of longitude-time points, highlighted collections 276 of longitude-time points, and/or selected collections 280 of longitude-time points. Similarly, the longitude-latitude graph 212 may include one or more unhighlighted collections 284 of longitude-latitude points, highlighted collections 288 of longitude-latitude points, and/or selected collections 292 of longitude-latitude points. Moreover, the scalar-time graph 208 may include various scalar-time points 254 within the scalar-time graph area 252. The scalar-time points 254 may include points that are highlighted, unhighlighted, and/or selected.

Object Tracking

The visualization display 200 described herein can be used to track orbital objects and present that data to a user/viewer in a meaningful way. The systems displayed herein provide a novel way of presenting high-dimensional (e.g., four-dimensional, five-dimensional, or higher dimensional) data in a way that is understandable by a human viewer.

For additional detail related to FIG. 2, reference will now include reference to FIGS. 3-5. FIG. 3 shows a detail view of an example longitude-time graph 204 that may be a part of the visualization display 200 described in FIG. 2. The first longitude axis 224 may span from a lower-longitude limit 312 to an upper-longitude limit 316. Similarly, the first time axis 220 may span from a lower-time limit 304 to an upper-time limit 308. Within the longitude-time graph area 228, the visualization display 200 may include one or more sets of longitude-time points. The one or more sets of longitude-time points may correspond to one or more pixels. Each set of longitude-time points may correspond to data on one or more orbital objects around the planet. For example, each of the one or more longitude-time points may correspond to a data set comprising historical data and/or contemporary data. Each set of longitude-time points may correspond to a set of identifiers. The set of identifiers may include a longitude value, a latitude value, a time value, a scalar value, and/or an object (e.g., name) identifier. Each set of identifiers may be obtained from one or more photographs. The photographs may contain image data from which one or more identifiers of the set of identifiers can be obtained (e.g., through algorithm).

The longitude-time points displayed within the longitude-time graph area 228 may be points that have a time value between the lower-time limit 304 and the upper-time limit 308. Additionally or alternatively, the displayed longitude-time points may have a longitude value between the lower-longitude limit 312 and the upper-longitude limit 316.

As shown in FIG. 3, the point marker 256 may comprise one or more highlighted pixels that can help a user determine which pixel is identified by a user input device. If the pixel is associated with object data, the scalar stamp 274 and/or object identifier stamp 282 may be displayed within the longitude-time graph area 228. One or both of the scalar stamp 274 and the object identifier stamp 282 may be displayed in an area easily associated with the point marker 256. If the identified pixel does not contain corresponding object data, then the respective scalar stamp 274 and/or object identifier stamp 282 may not be displayed. As shown the pixel currently identified by the point marker 256 is a pixel that includes a selected collection 280 of longitude-time points.

In order to further aid a user, an interface toggle 320 may be included in the longitude-time graph 204. The interface toggle 320 may be manipulated by a user from an input device (e.g., function keys on a keyboard, a mouse, etc.). The interface toggle 320 may communicate with the user settings module 132 (see FIG. 1A) to determine, for example, display settings for the longitude-time graph 204. A user may be able to adjust the display settings using the interface toggle 320. For example, the user may be able to click a box to switch a view type. The user may be able to filter what types of points (e.g., unhighlighted, highlighted, selected) are displayed. The interface toggle 320 may allow a user to toggle the display of the longitude-time map on and off. For example, as shown in FIG. 3, the longitude-time map is toggled off while in FIG. 2 it is toggled on.

FIG. 4 shows a detail view of an example longitude-latitude graph 212 that may be a part of the visualization display 200 described in FIG. 2. The second longitude axis 236 may span from a lower-longitude limit 412 to an upper-longitude limit 416. Similarly, the latitude axis 232 may span from a lower-latitude limit 408 to an upper-latitude limit 404. The longitude-latitude points displayed within the longitude-latitude graph area 240 may be points that have a latitude value between the lower-latitude limit 408 and the upper-latitude limit 404. Additionally or alternatively, the displayed longitude-latitude points may have a longitude value between the lower-longitude limit 412 and the upper-longitude limit 416.

The longitude-latitude graph area 240 may include various displayed longitude-latitude points. For example, the longitude-latitude graph 212 may display one or more unhighlighted collections 284 of longitude-latitude points, highlighted collections of longitude-latitude points (not shown), and/or selected collections 292 of longitude-latitude points. In some cases, the one or more selected collections 292 of longitude-latitude points may include highlighted longitude-latitude points. FIG. 4 shows the point marker 256 over a point in a selected collection 292 of longitude-latitude points.

As shown in FIG. 4, the point marker 256 may be displayed within the longitude-latitude graph 212. For example, a user may use an input device to indicate where and/or in which graph the point marker 256 is located. As noted above, if the point marker 256 is displayed within the longitude-latitude graph 212, a tracking line latitude stamp 422 may be displayed. The tracking line latitude stamp 422 displays a latitude value associated with a longitude-latitude point corresponding to the pixel identified by the point marker 256. Additionally or alternatively, a tracking line longitude stamp 290 may be displayed. One or more point marker metadata stamps (e.g., the scalar stamp 274, the object identifier stamp 282, a latitude stamp, a longitude stamp, a time stamp) may be displayed, as described above.

An interface toggle 426 may be included to aid a user in interacting with the longitude-latitude graph 212. For example, the interface toggle 426 may allow a user to toggle a view of the longitude-latitude map on or off. The interface toggle 426 may be manipulated by a user from an input device (e.g., function keys on a keyboard, a mouse, etc.). As shown in FIG. 4, the longitude-latitude map is toggled on. Other functionality is also possible.

FIG. 5 shows a detail view of an example scalar-time graph 208 that may be a part of the visualization display 200 described in FIG. 2. The scalar-time graph 208 may show one of a number of possible scalar values. For example, the scalar may refer to a magnitude, such as an intensity of reflected light. However, a number of other scalar values are possible, such as a size, a projected area, a temperature, a mass, a radar cross section, an altitude, an inclination, a delta-V, a time until a certain event, a probability of a certain event, etc.

The scalar axis 248 may span from a lower-scalar limit 512 to an upper-scalar limit 516. Similarly, the second time axis 244 may span from a lower-time limit 504 to an upper-time limit 508. The scalar-time points displayed within the scalar-time graph area 252 may be points that have a scalar value between the lower-scalar limit 512 and the upper-scalar limit 516. Additionally or alternatively, the displayed scalar-time points may have a time value between the lower-time limit 504 and the upper-time limit 508.

As shown in FIG. 5, the point marker 256 may be displayed within the scalar-time graph 208. As noted above, if the point marker 256 is displayed within the scalar-time graph 208, one or more metadata stamps may be displayed. For example, the tracking line time stamp 298 may indicate a time value of a scalar-time point corresponding to the pixel identified by the point marker 256. Similarly, a tracking line scalar stamp (not shown) may indicate a scalar value of a scalar-time point corresponding to the pixel identified by the point marker 256 Additionally or alternatively, one or more point marker metadata stamps (e.g., the scalar stamp 274, the object identifier stamp 282, a latitude stamp, a longitude stamp, a time stamp) may be displayed, as described above.

The scalar-time graph 208 may display one or more unhighlighted collections 584 of scalar-time points, highlighted collections 584 of scalar-time points (not shown), and/or selected collections 580 of scalar-time points. As shown, the point marker 256 identifies a pixel associated with a point in a selected collection 580 of scalar-time points. An interface toggle 522 may be included to aid a user in interacting with the scalar-time graph 208. For example, the interface toggle 522 may allow a user to toggle which type(s) (e.g., unhighlighted, highlighted, selected) points are displayed. Additionally or alternatively, the interface toggle 522 may allow a user to toggle between a stitching panel and a graph and/or to toggle which type of scalar is displayed by the scalar-time graph 208. Other functionality is also possible.

With reference generally to FIGS. 2-5, the system may allow a user to interact with the visualization display 200 in a variety of beneficial ways. For example, a user may be able to pan and zoom within one or more graphs in the visualization display 200. Panning may be up, down, left, right, or any other direction along an axis. Zooming may include zooming in and/or out. The user may give a panning input and/or a zooming input via an input device. The panning input and/or zooming input may comprise a scrolling of a mouse wheel, a click of a mouse, a pinch motion, a flick motion, a swipe motion, a tap, and/or any other input identifying a pan or zoom action. The visualization display 200 may be configured to allow simultaneous manipulation of multiple graphs. For example, in response to a user input to pan or zoom the first time axis 220 or the second time axis 244, the system may set the lower-time limit 304 equal to the lower-time limit 504 and/or set the upper-time limit 308 equal to the upper-time limit 508. Similarly, in response to a user input to pan or zoom the first longitude axis 224 or the second longitude axis 236, the system may set the lower-longitude limit 312 equal to the lower-longitude limit 412 and set the upper-longitude limit 316 equal to the upper-longitude limit 416.

A user may be able to set the upper and/or lower limits of a given axis. Additionally or alternatively, the user may be able to set axis spacing, axis intervals, axis labels, axis formatting, axis length, and or other aspects associated with one or more axes. Once set, the system may be configured to automatically update that axis. In some embodiments, the system may be configured to automatically update a corresponding axis. For example, automatically updating a corresponding axis may include setting a common alignment for both of the two axes, setting a common length for both of them, and/or disposing them parallel to one another. The first longitude axis 224 and second longitude axis 236 may be corresponding axes. Similarly, the first time axis 220 and second time axis 244 may be corresponding axes.

Zooming may be defined as changing a total span (e.g., a difference between an upper-axis limit and a lower-axis limit) of one or more axes in the visualization display 200. A single axis may be zoomed in or out by the user. A single graph (e.g., two perpendicular axes) may be zoomed in or out. However, the system may be configured to allow a user to zoom in and/or out on multiple axes and/or graphs simultaneously. For example, zooming in on the longitude-time graph 204 may adjust not only the first time axis 220 and first longitude axis 224, but it may adjust the second time axis 244 as well.

Zooming and/or panning in one axis or one graph may affect which points are displayed in other graphs within the visualization display 200. For example, in an adjustment of the lower-time limit 304 or the upper-time limit 308, the system may be configured to update the longitude-latitude graph 212 to display pixels corresponding only to longitude-latitude points corresponding to a set of identifiers having a time identifier between the lower-time limit 304 and the upper-time limit 308.

Panning and/or zooming may be done within a graph or along an axis. For example, in response to a user input to pan or zoom along a length of first time axis 220, the system may be configured to simultaneously modify one or more of the lower-time limit 304 and/or the upper-time limit 308. In response to a user input to pan or zoom along a length of second time axis 244, the system may be configured to simultaneously modify one or more of the lower-time limit 504 and/or the upper-time limit 508. Additionally or alternatively, in response to a user input to pan or zoom along a length of the first longitude axis 224, the system may be configured to simultaneously modify one or more of the lower-longitude limit 312 and/or the upper-longitude limit 316. In response to a user input to pan or zoom along a length of the second longitude axis 236, the system may be configured to simultaneously modify one or more of the lower-longitude limit 412 and/or the upper-longitude limit 416. Additionally or alternatively, in response to a user input to pan or zoom along a length of the latitude axis 232, the system may be configured to simultaneously modify one or more of the upper-latitude limit 404 and/or the lower-latitude limit 408. In response to a user input to pan or zoom along a length of the scalar axis 248, the system may be configured to simultaneously modify one or more of the lower-scalar limit 512 and the upper-scalar limit 516.

Further, in response to a user input to adjust the lower-longitude limit 312 or the upper-longitude limit 316, the system may update the scalar-time graph 208 to display pixels corresponding only to scalar-time points corresponding to a set of identifiers having a longitude identifier between the lower-longitude limit 312 limit and the upper-longitude limit 316. Similarly, in response to a user input to adjust the upper-latitude limit 404 or the lower-latitude limit 408, the system may update one or more of the longitude-time graph 204 and/or the scalar-time graph 208 to display pixels corresponding only to respective longitude-time points and/or scalar-time points corresponding to a set of identifiers having a latitude identifier between the lower-longitude limit 312 and the upper-longitude limit 316.

Moreover, in response to a user input to adjust the lower-scalar limit 512 or the upper-scalar limit 516, the system may update one or more of the longitude-time graph 204 and the longitude-latitude graph 212 graph to display pixels corresponding only to respective longitude-time points and/or longitude-latitude points corresponding to a set of identifiers having a scalar identifier between the lower-scalar limit 512 limit and the upper-scalar limit 516.

As noted above, the system may be configured to store dozens of petabytes of data. This can provide a variety of challenges. One of which is how the data are displayed in a way that is helpful to a human user. Accordingly, in certain embodiments, the visualization display 200 may be configured to divide a graph (e.g., the longitude-time graph 204) into a plurality of pixels. Each pixel may represent a corresponding bin of data. Each bin can be configured to store historical and/or contemporary data as well as metadata.

In some cases, a single pixel may correspond to a bin containing dozens, hundreds, or even thousands of data sets corresponding to orbital objects. To aid a user in digesting such a large amount of data, the visualization display 200 may be configured to display an indication of the amount of data (e.g., the number of objects, the number of sets of object identifiers) stored therein. For example, a user may use the point marker 256 to identify a pixel. The system can be configured to display a number of object identifiers (e.g., a number of unique object identifiers) between one and a total number of object identifiers associated with the bin associated with the identified pixel. An object identifier can be any type of identifier of an orbital object. The object identifier may comprise one or more letters, numbers, symbols, or any combination of these.

In some designs, the system is configured to receive a selection from a user of a target object identifier. For example, the system may sequentially cycle (e.g., automatically, manually) through a display of each object identifier associated with the identified pixel (e.g., every second, every two seconds, in response to a user input, etc.). As a different example, the system may be configured to display a list of object identifiers from which a user may select the target object identifier. The system may be configured only to display unique object identifiers since many object identifiers in a single bin may be identical. In some embodiments, the system may not display one or more of the metadata stamps (e.g., the tracking line longitude stamp 290, the horizontal tracking line 260, the object identifier stamp 282, the scalar stamp 274, etc.) until an object identifier has been selected. In certain embodiments, the system displays metadata stamps for each unique object identifier present in the bin. The visualization display 200 may implement a color scale or gray scale to provide information about the number of unique orbital object identifiers in a bin. For example, bins with more unique orbital object identifiers may correspond to lighter pixels while bins with fewer unique orbital object identifiers may be darker. Bins with no orbital object identifiers may be black. This situation may arise, for example, when viewing a small portion (e.g., zoomed in) of the data in a graph.

The system can be configured to identify one or more values (e.g., by various metadata time stamps described herein) associated with a default data set. The point marker 256 is an example of an interface element that can identify values in the default data set. The default data set may be determined based on one or more default rules. The default rule(s) may be based on a storage time (e.g., most recently stored), a view time (e.g., most recently viewed), a numerical value (e.g., smallest latitude), an object identifier (e.g., earliest object identifier by alphabetical order), or any other default measure.

As a user moves the point marker 256, the system may automatically (e.g., in real-time) update the identified values (e.g., metadata time stamps) associated with the updated pixel corresponding to an updated data set. The updated data set may be determined using the same or different rules described above. The user may move the point marker 256 over an updated pixel in a variety of ways, such as by mousing over the pixel using an input device (e.g., mouse), tapping on the pixel (e.g., using a touchscreen), typing in information associated with the updated pixel, or in any other way to identify a pixel.

It may be advantageous to allow a user to save one or more settings associated with the visualization display 200. For example, a user may wish to return at a later time to a point or set of points displayed by the visualization display 200. This may be accomplished in a number of ways. For example, a user may be configured to bookmark one or more values associated with the target point (e.g., an object identifier, a longitude value, a time value, etc.). The system may store a list of the user's bookmarks to allow for easy access at a future time. The system may be configured to store a set of points based, for example, on the points having a common object identifier. For example, multiple points may correspond to the same object as it orbits the planet. Thus, multiple points in time and space may reference the same object. The user may be able to retrieve the set of points by inputting the object identifier (e.g., selecting it from a list, typing it in).

Additionally or alternatively, the system may be able to allow a user to save a view of one or more graphs. For example, a user may be able to bookmark a particular view within the longitude-time graph 204. Accordingly, the system may associate with the bookmark stored values for a bookmark-min longitude value (e.g., the lower-longitude limit 312), a bookmark-max longitude value (e.g., the upper-longitude limit 316), a bookmark-min time value (e.g., the lower-time limit 304), and/or a bookmark-max time value (e.g., the upper-time limit 308). Similar usage may be made for other values (e.g., a scalar value, an object identifier, a latitude). Points that satisfy these bookmark-min and/or bookmark-max values could be displayed by the system in response to a user selection of the associated bookmark.

Display Synchronization

One of the benefits of various embodiments described herein is the ability of a user to quickly and easily view and digest an immense amount of data containing variables in three, four, or more dimensions. To help a user visualize data containing higher-dimension values, various graphs of the visualization display 200 may be synchronized to each other. FIGS. 6-9 illustrate various functionality associated therewith.

Figure 6:
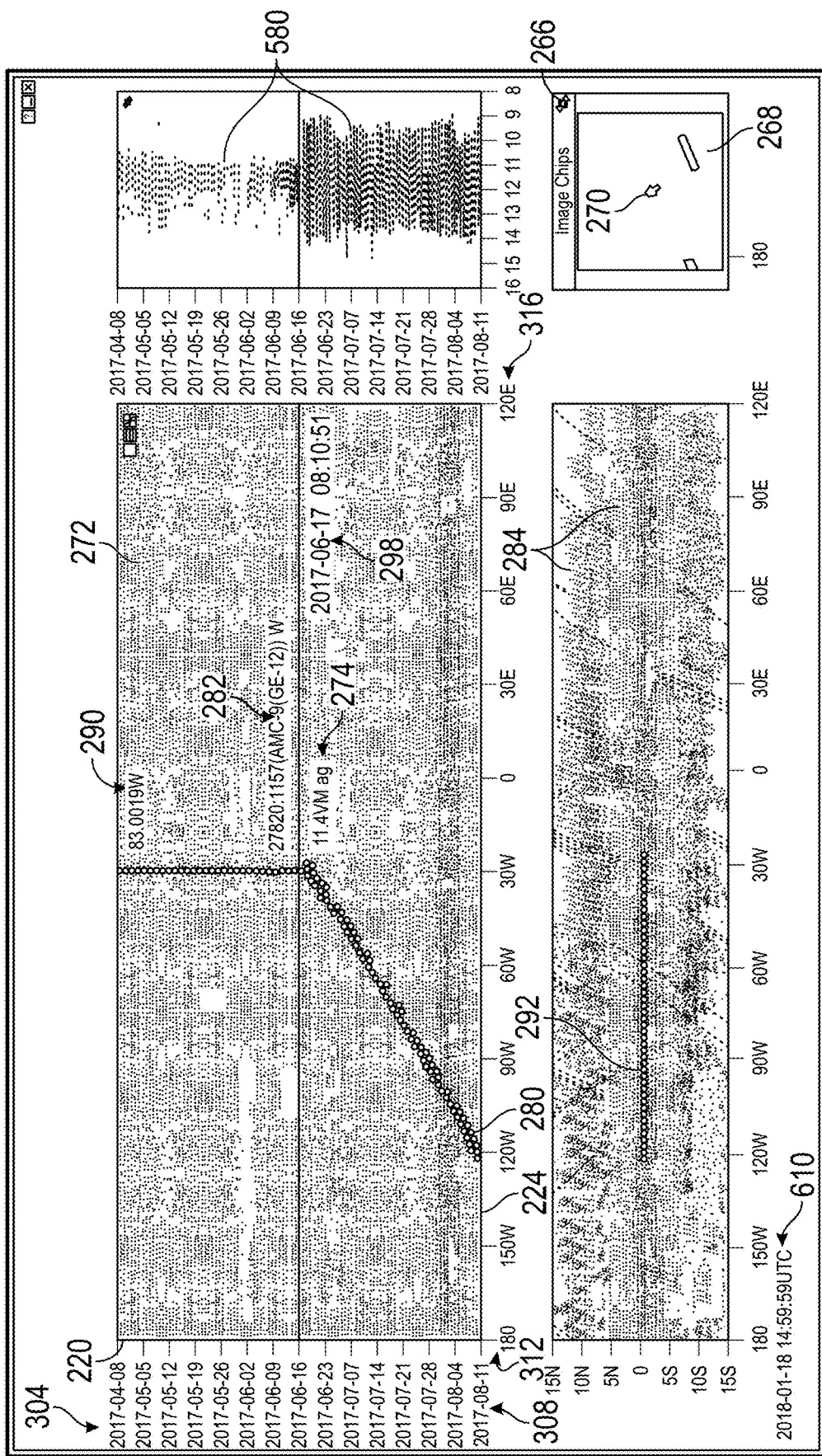
FIG. 6 shows a zoomed-in and panned view of the visualization display of FIG. 2.

FIG. 6 shows a zoomed-in and panned view of visualization display 200 of FIG. 2. As shown, the first time axis 220 spans from and updated lower-time limit 304 to an updated upper-time limit 308. The first time axis 220 spans about fifteen weeks. Similarly, the first longitude axis 224 has been updated to show a span of about 37 degrees between the lower-longitude limit 312 and the upper-longitude limit 316. The object identifier stamp 282 indicates the same object identifier shown in FIG. 2. This indicates that the point marker 256 identifies a pixel associated with the same object as is identified in FIG. 2. The tracking line longitude stamp 290 indicates a longitude of about 83.0019 W and the tracking line time stamp 298 indicates a time of 2017-06-17 08:10:51. As shown, the selected collection 280 of longitude-time points is associated with the pixel identified by the point marker 256. Other unhighlighted collections 272 of longitude-time points are also shown, which are associated with the unhighlighted collections 284 of longitude-latitude points.

The selected collection 280 of longitude-time points is similarly associated with the selected collection 292 of longitude-latitude points displayed in the longitude-latitude graph 212 as well as the selected collection 580 of scalar-time points displayed in the scalar-time graph 208.

The visualization display 200 may further include a current time stamp 610. The current time stamp 610 may indicate a current universal time, such as one tracking the coordinated universal time (UTC).

Figure 7:
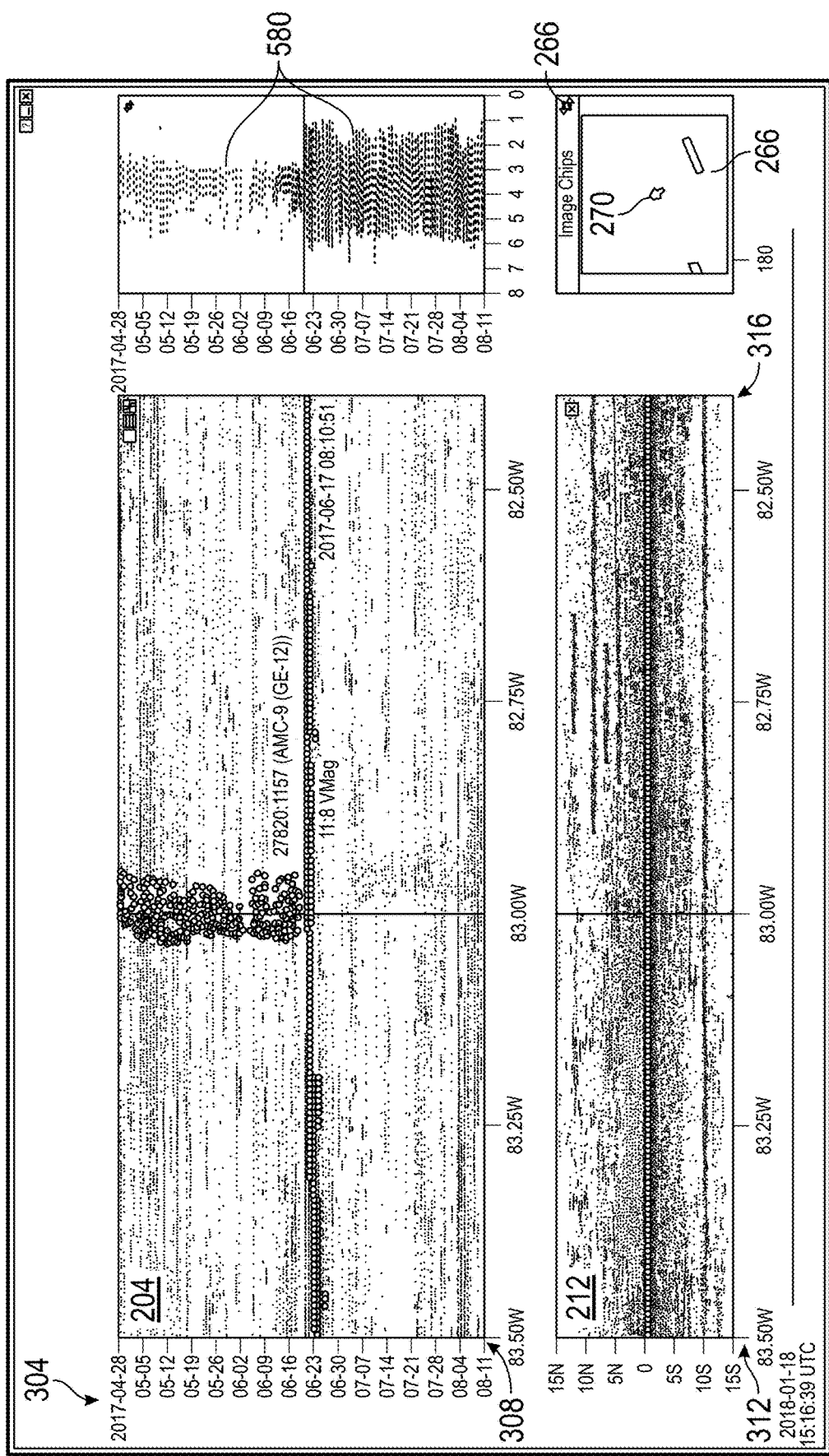

FIG. 7 shows the same view as FIG. 6 after the first longitude axis 224 and the synchronized second longitude axis 236 have been zoomed in. Note that the first longitude axis 224 and the second longitude axis 236 (as well as the first time axis 220 and the second time axis 244) are synchronized in this case, allowing for a seamless viewing experience when viewing each of the graphs. Because the first longitude axis 224 and the second longitude axis 236 are synchronized to each other, the scalar-time graph 208 has also been updated. The point marker 256 identifies a slightly different pixel as compared to FIG. 6. As shown, both longitude axes 224, 236 span a little over a single degree. Moreover, as shown, the axis labels (and/or the associated hash marks) on the first longitude axis 224 have become omitted since the two longitude axes 224, 236 are synchronized. Similarly, the two time axes 220, 244 can be synchronized, in which case the axis labels (and/or the associated hash marks) of the second time axis 244 may be omitted.

Figure 8:
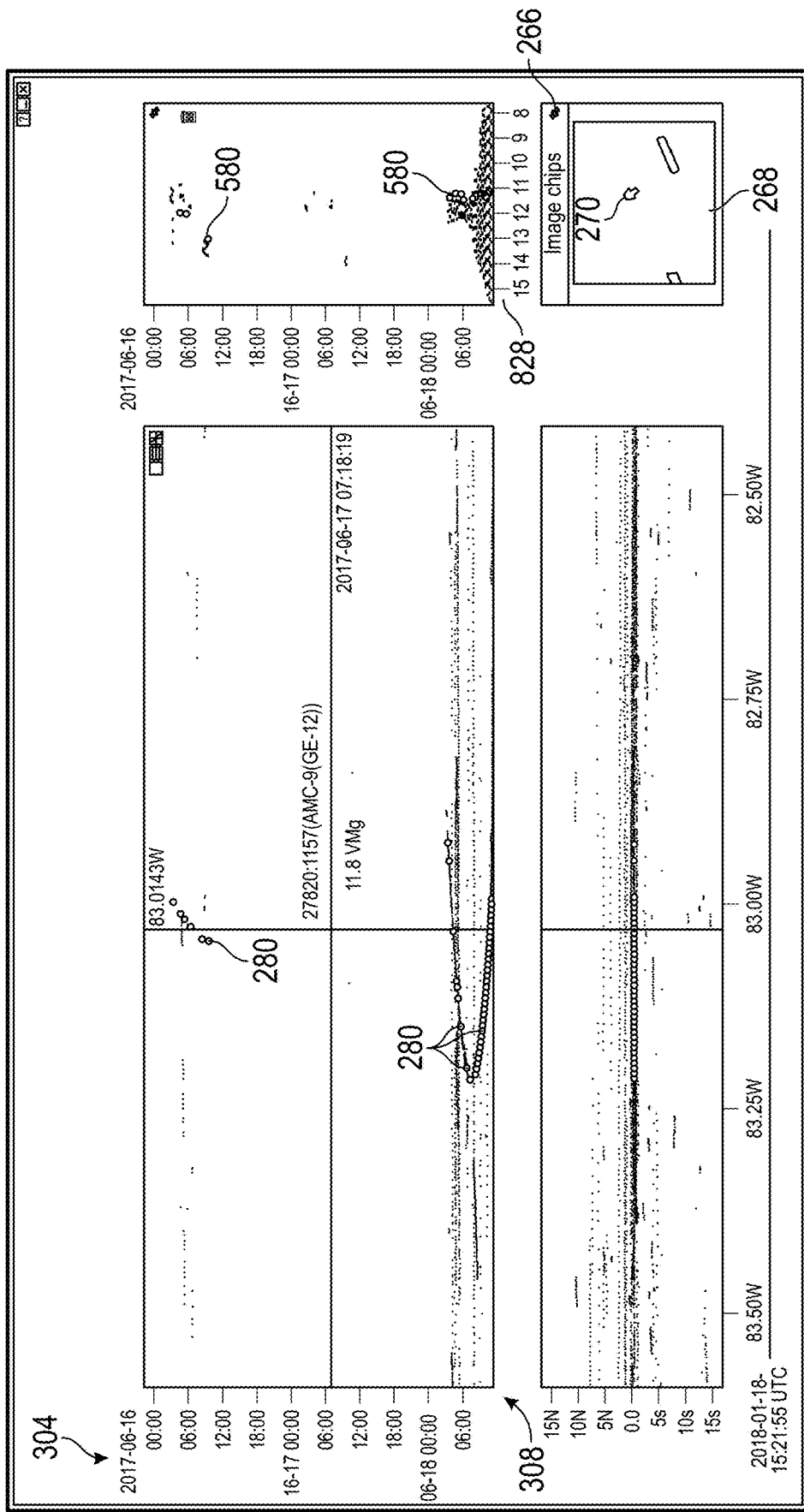

FIG. 8 shows the same view as FIG. 7 after the first time axis 220 and the synchronized second time axis 244 have been zoomed in. Because the first time axis 220 and second time axis 244 are synchronized to each other, the scalar-time graph 208 has also been updated. The point marker 256 identifies a slightly different pixel as compared to either FIG. 6 or FIG. 7.

Figure 9:
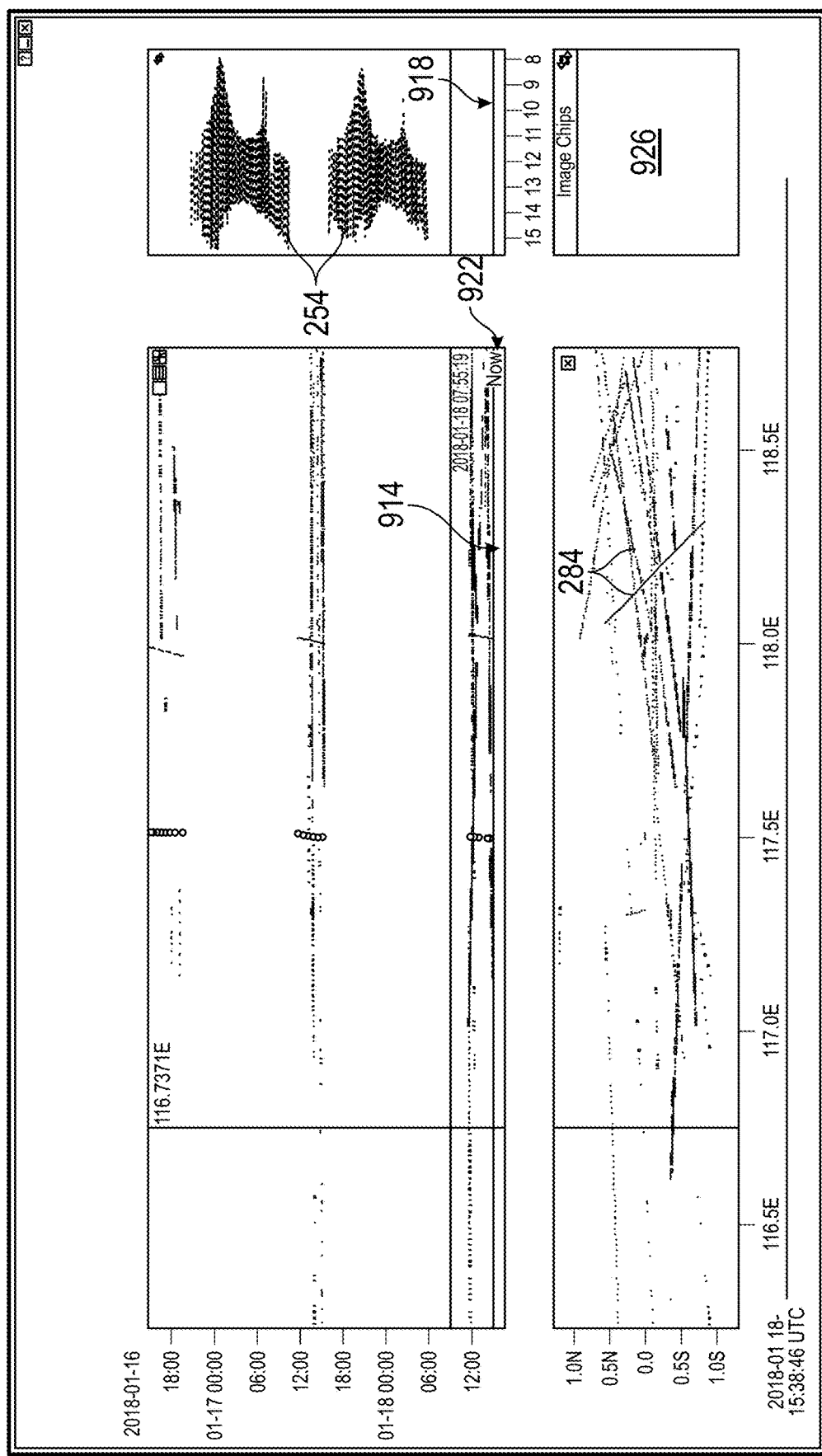
FIG. 9 shows a zoomed-in and panned view of a longitude-time graph and scalar-time graph at a current time horizon.

FIG. 9 shows a zoomed-in and panned view of a longitude-time graph 204 at a current time horizon. The current time horizon may be identified by a current time marker 922. The current time marker 922 may include a line and/or a descriptor, such as a "now" descriptor, as shown. The future longitude-time area 914 and the future scalar-time area 918 do not include any display points corresponding to object data since those times are later than the current time as indicated by the current time stamp 610. Data that has been received later than a threshold time from the current time may not be displayed yet. This delay may be due to latency in the network (e.g., the network 144) or for some other reason that delays the system from receiving the data.

The image chip 268 in FIGS. 6-8 identifies an object image 270 while the image chip 268 in FIG. 9 does not. The image chip 268 corresponds to a photograph from which object data has been obtained associated with a pixel identified by the point marker 256. The photographs shown in FIG. 6-8 may identify the object image 270 received from actual telescopic images. As noted, an image chip 268 may include a plurality of object images 270. In some embodiments, the image chip 268 identifies which of the plurality of object images 270 corresponds to the data associated with the pixel identified (e.g., by the point marker 256). For example, a marker may be displayed indicating a location of the object within the at least one photograph. The marker may comprise a circle, a box, crosshairs, a coloring, a flicker, or any other indication of an object within a photograph. The user may identify the pixel associated with the object image 270 in other ways described above.

Image chip 268 data may be received from one or more databases. For example, the system may receive the image chip 268 data from a database remote from the system. Additionally or alternatively, the data may be received from a database local to the system. The image chip 268 data may be received via one or more pointers (e.g., hyperlinks) that point to corresponding databases. For example, various image chip 268 data may be stored on databases associated with the imager (e.g., telescope) from which the data was first obtained.

The user may select one or more objects from an image chip 268 and a corresponding point or plurality of points may be indicated (e.g., highlighted, supplied with a marker) on one or more of the graphs in the visualization display 200. Additionally or alternatively, the user may be able to select a point or plurality of points on one or more of the graphs in the visualization display 200 and have one or more images (e.g., photo, video) displayed by the image chip 268 with associated marker. In some designs, the image chip 268 is configured to show a video corresponding to multiple points within a graph in the visualization display 200. The multiple points may comprise a common object identifier. In FIG. 9, because an identified pixel does not correspond to image data for a photograph, the blank image chip 926 does not display any photograph.

Tagging Interface

It may be useful to update data corresponding to the object data in the historical and/or contemporary databases. For example, it may be helpful to add or remove an object identifier (e.g., object name) to one or more points. To this end, a tagging interface can be implemented in various embodiments. FIGS. 10A-10D illustrate various aspects of embodiments of the system that include a tagging interface.

Figure 10A:
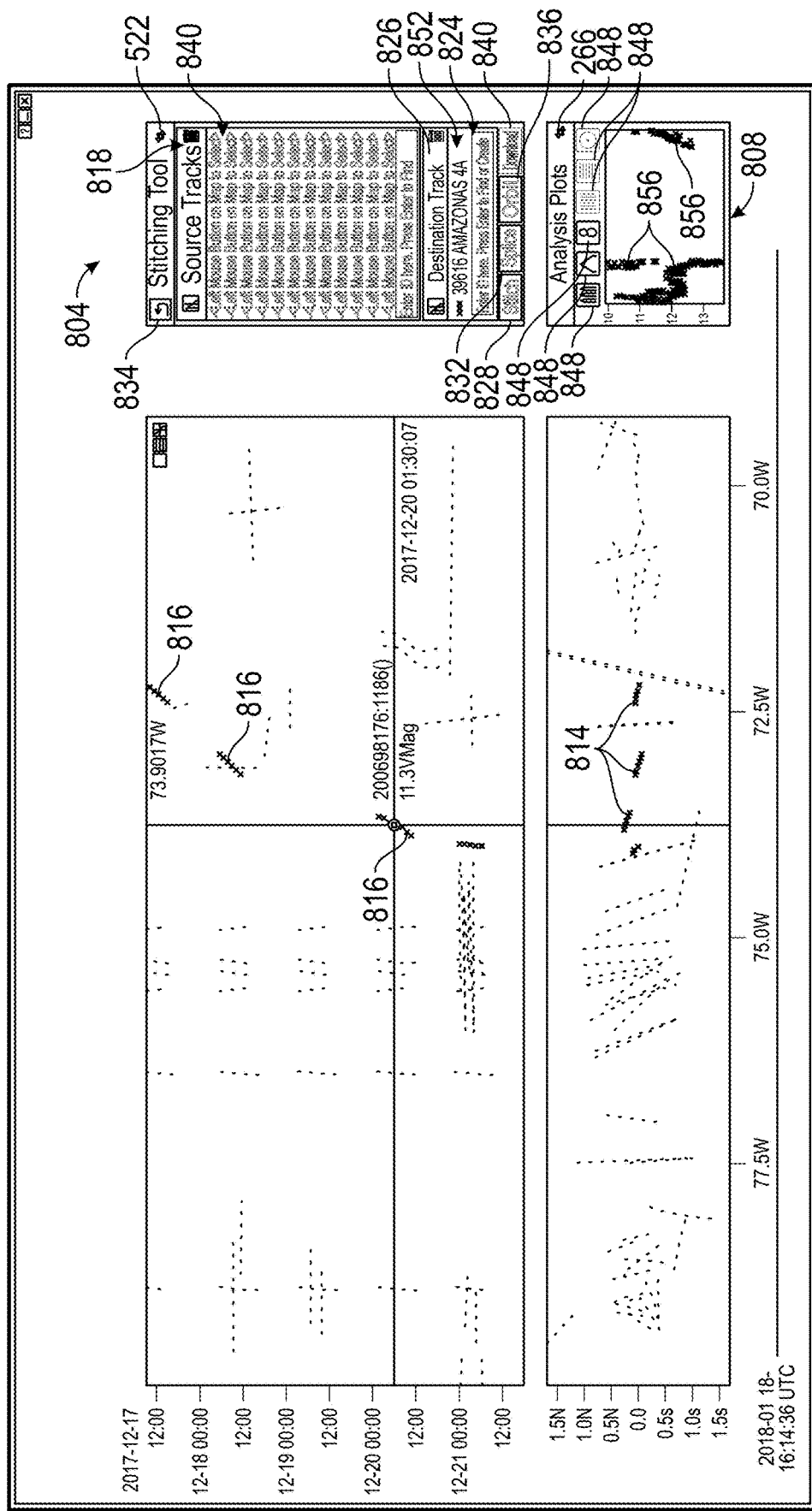
FIG. 10A shows a tagging interface comprising a stitching tool interface and an analysis plot interface.

FIG. 10A shows a tagging interface comprising a stitching tool interface 804 and an analysis plot interface 808. The tagging interface is shown along with a longitude-time graph 204 and a longitude-latitude graph 212. As shown, the stitching tool interface 804 may include a source track region designator 818 with corresponding source track region 820 and/or an destination track region designator 826 with corresponding destination track region 824. In some embodiments, the source track region designator 818 and/or destination track region designator 826 are not included. The destination track region 824 may include one or more of a stitch selector 828, a splice selector 832, an orbit selector 836, and/or a download selector 840. In response to the orbit selector 836, the system may be configured to calculate and/or display an aspect of an orbit of a selected object or plurality of objects. The stitching tool interface 804 may further include an undo selector 834. The undo selector 834 may be represented by words "undo" and/or by a symbol (e.g., an arrow symbol). In response to a selection of the undo selector 834, the system may undo a most recent user selection. In response to a sequence of selections, the system may be configured to revert back a sequence of actions in response to a sequence of previous user selections.

The analysis plot interface 808 may include one or more analysis plot input selectors 848 and/or an interface toggle 266. The interface toggle 266 may be selected by a user to toggle between a tagging interface and the scalar-time graph 208 and/or display area 216. The analysis plot interface 808 may include an analysis plot. The analysis plot may display one or analysis points within a plot area. The analysis plot may include a time axis and/or a scalar axis. The time axis may span a particular number of days (e.g., five days, seven, days, ten days, etc.). The scalar axis may be determined based on a number of selected points, such as a collection 816 of longitude-time destination points.

As shown in FIG. 10A, the collection 816 of longitude-time destination points may be selected by a user. For example, the user may highlight one or more of the collection 816 of longitude-time destination points. As used herein, highlighting may include altering one or more of a color, shading, intensity, and/or background. This may be achieved, for example, by right-clicking on a mouse one of the points in the longitude-time graph 204 and/or the longitude-latitude graph 212. The right-click (or other user input) can cause the point marker 256 to identify a pixel associated with object data. As shown in FIG. 10A, the user has identified the collection 816 of longitude-time destination points. The identified collection 816 of longitude-time destination points may be highlighted (e.g., colored). The collection 816 of longitude-time destination points corresponds to a collection 844 of longitude-latitude destination points. The destination track identifier 852 in the stitching tool interface 804 identifies the collection 816 of longitude-time destination points as a destination track. The selected points may correspond to the destination track analysis points 856 displayed within the analysis plot interface 808.

Figure 10B:
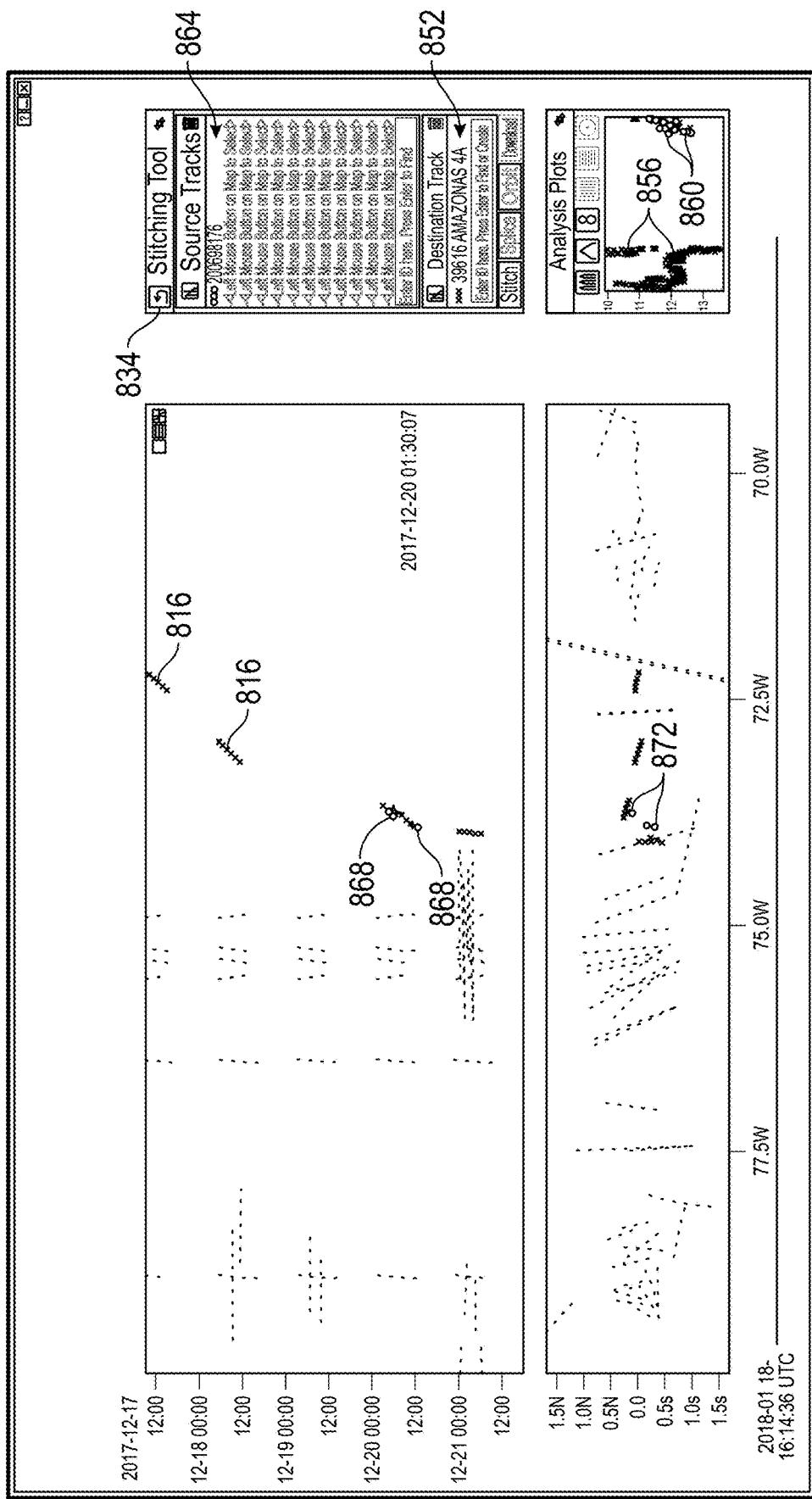
FIG. 10B shows a selection by a user of a collection of first longitude-time source points.

FIG. 10B shows a selection by a user of a collection 868 of first longitude-time source points. The collection 868 of first longitude-time source points may consist of a single point. As shown, the collection 868 of first longitude-time source points is different from the collection 816 of longitude-time destination points. The collection 868 of first longitude-time source points may be highlighted (e.g., differently from the highlighting of the collection 816 of longitude-time destination points). The source track region 820 now shows a first source track identifier 864 that has been selected. A corresponding collection 872 of first longitude-latitude source points and/or a corresponding collection 860 of first source analysis points may be plotted in their respective graph/plot.

Figure 10C:
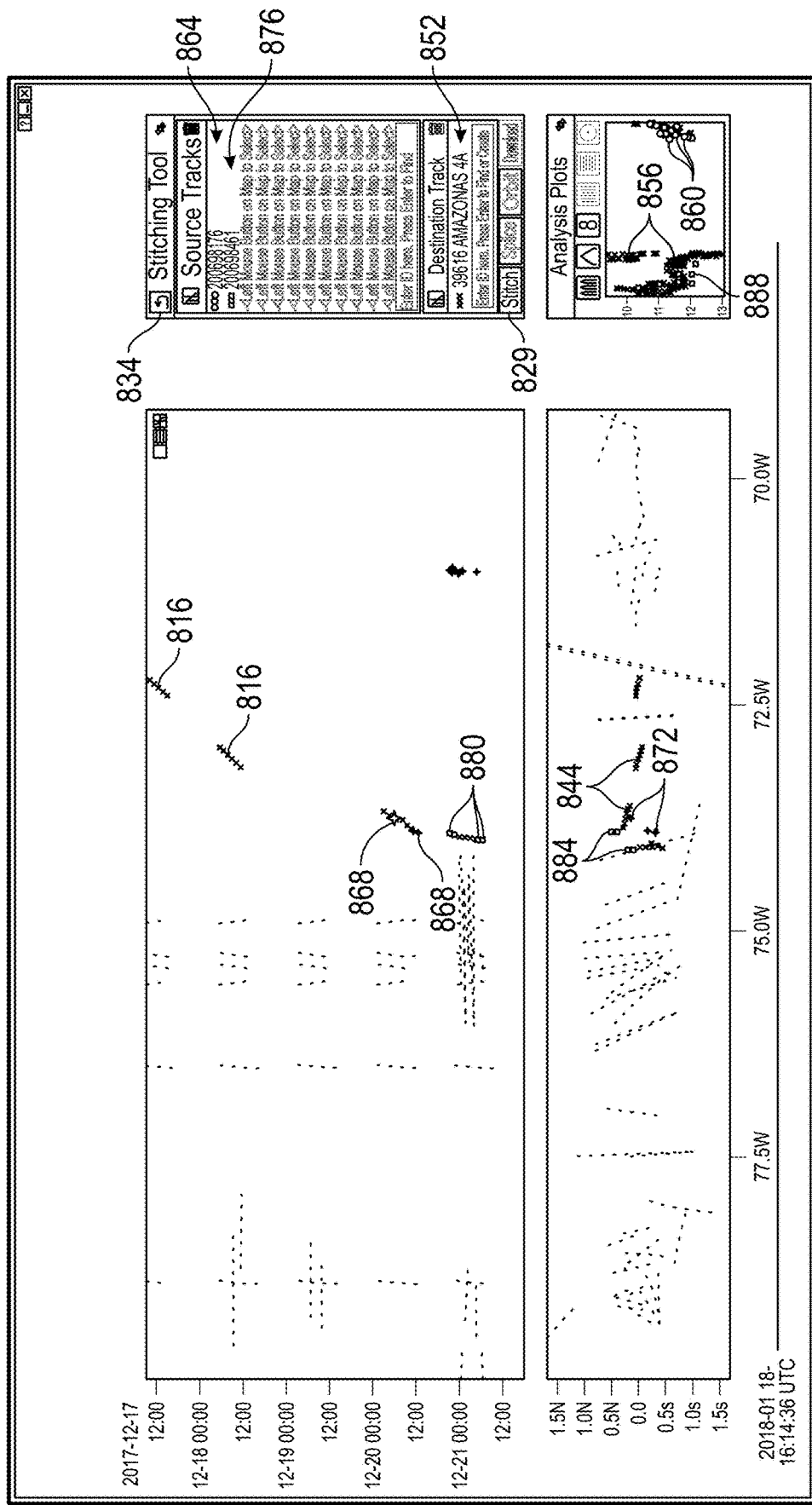
FIG. 10C shows a selection by a user of a collection of second longitude-time source points.

FIG. 10C shows a selection by a user of a collection 880 of second longitude-time source points. The collection 880 of second longitude-time source points may consist of a single point. As shown, the collection 880 of second longitude-time source points is different from either the collection 816 of longitude-time destination points or the collection 868 of first longitude-time source points. Similarly, as shown, the highlighting of the collection 880 of second longitude-time source points may be different from either the collection 816 of longitude-time destination points or the collection 868 of first longitude-time source points. The second source track identifier 876 indicates the additional selection of the collection 880 of second longitude-time source points. A corresponding collection 884 of second longitude-latitude source points and/or a corresponding collection 888 of second source analysis points may be plotted in their respective graph/plot. A highlighted stitch selector 829 may indicate that the selected collections 868, 880 are ready to be stitched. It will be noted that a single source track (as opposed to the two source tracks in the displayed example) may provide the highlighted stitch selector 829 as well.

Figure 10D:
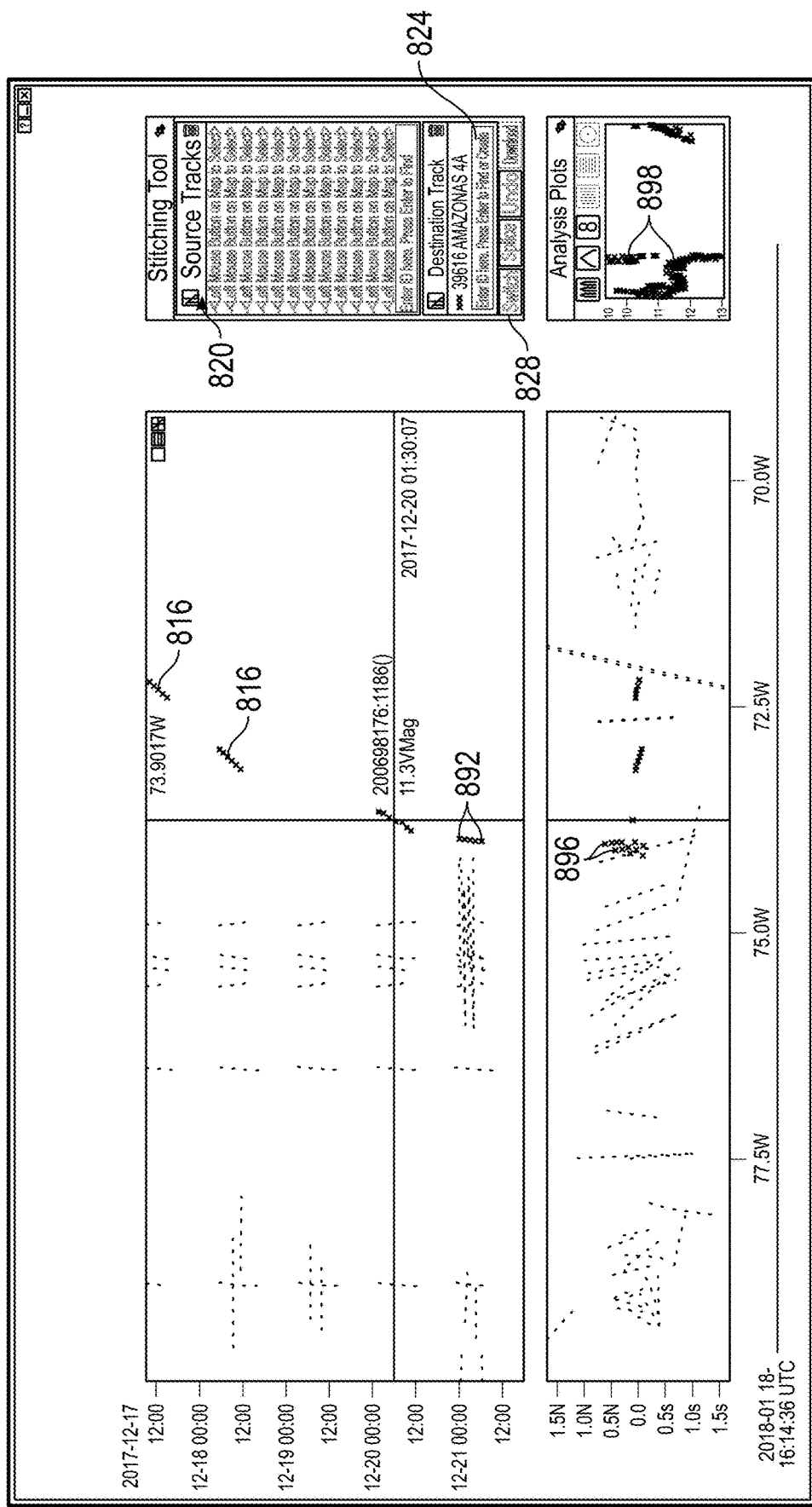
FIG. 10D shows the visualization display of FIG. 10C after a user has selected the stitch selector.

FIG. 10D shows the visualization display 200 of FIG. 10C after a user has selected the stitch selector 828. Once the stitch selector 828 has been selected by the user, the resulting new collection 892 of longitude-time destination points comprise the original destination and source track(s). A corresponding new collection 896 of longitude-latitude destination points and/or a new collection 898 of destination analysis points may also be displayed. Accordingly, it may be that no source tracks are indicated in the source track region 820. The destination track region 824 may continue to display an object identifier associated with the resulting destination track.

In this way, the tagging interface may allow a user to select a destination element comprising a first name identifier and a source element comprising at least one of the plurality of pixels corresponding to longitude-time points comprising a second name identifier. After selecting the stitching selector, the display can be configured to indicate that the source element comprises the first name identifier. In some designs, each of the destination element and source element consists of one or more points displayed by the system during the user selection of the stitching selector. In response to the user selection, the computer readable storage may be configured to associate a first data file comprising the first name identifier with a second data file comprising the second name identifier.

A reverse process may be used to splice a collection of points into separate sets of points. For example, a user may be able to select a collection of source points as well as one or more splice points from among the source points. After selecting the splice selector 832, the system may be configured to remove and/or alter an object identifier associated with the splice points relative to the source points.

For example, the system can be configured such that a user may be able to select at least one pixel corresponding to at least one longitude-time point comprising a first object identifier. The system may be configured to highlight a series of longitude-latitude points comprising an object identifier identical to the first object identifier. In response to a user selection of the splice selector, the system can be configured to distinguish a first set of one or more longitude-time points from a second set of one or more longitude-time points on the visualization display 200.

The system can be configured to highlight one or more pixels corresponding to a set of longitude-time points, for example, in response to a user input. The user input may comprise a selection of the one or more longitude-time points (e.g., via a selection of one or more pixels). The user input may include a mouse click, a double tap, a pinch motion, a two-finger tap, a grouping (e.g., circling) motion, or some other input signifying a selection of points. In some embodiments, the system may highlight a series of points based on a user selection of a first pixel. The system may be configured to highlight a series of pixels comprising the first pixel. Each of the pixels in the series can correspond to longitude-time points comprising a common object identifier. Moreover, while longitude-time points have been used as an example in FIGS. 10A-10D, other points (e.g., longitude-latitude points, analysis plot points) may be used for selecting and/or tagging (e.g., stitching, splicing).

Maneuver and Transfer Determination

Once an orbit has been determined, it can be useful to determine how that orbit relates to another space object, such as an orbit of the other space object. Space objects may from time to time change their expected trajectory. For example, an altitude, longitude, latitude, and/or velocity may be altered. This alteration may occur through short accelerations (e.g., burns) and/or sustained (e.g., continuous) accelerations. In some instances, it may be desirable to adopt the orbit of a target space object or simply some other orbit. Adopting a new orbit, such as the orbit of a target space object, is called an orbit transfer. It may additionally or alternatively be desirable to not only adopt another orbit but to do so at the same or similar position of a target object (e.g., substantially along the same path as the other space object). Joining another object in such a way is called a rendezvous transfer. An orbit transfer or a rendezvous transfer may include a Lambert transfer, which is an expenditure of a minimum or substantially minimum change in velocity (or energy) of the object to complete the transfer. The change in velocity can be denoted as a "delta V." In each of the orbit and rendezvous transfers, the object completes at least two separate maneuvers—an initial maneuver and a final maneuver.

A third type of transfer may involve a single maneuver. This type of transfer can be used to alter an orbit of an object to contact or impact another space object (e.g., substantially transverse to the path of the other space object). Such a maneuver may be used to perturb the path or orbit of the target object. This third type of transfer is called an intercept transfer. Each of these transfers, along with other details, is described in more detail below.

A user interface can be helpful in visualizing, identifying, and/or manipulating a path (e.g., orbit) of a space object. The user interface can include a display interface such as is disclosed herein (e.g., visualization display 100, 200). For example, the interface can include a longitude-time graph (e.g., having longitude and/or time axes). The interface can include a zoom control interface (e.g., a time axis zoom control interface, a longitude axis zoom control interface, etc.) and/or a pan control interface (e.g., a time axis pan control interface, a longitude axis pan control interface, etc.). The zoom control interface can allow a user to select a scale factor for one or more axes of a graph (e.g., a longitude-time graph, a longitude-latitude graph, a magnitude-time graph, etc.). Additionally or alternatively, the pan control interface can allow a user to move a lower and/or upper limit of a graph in the same direction.

The user interface can include one or more indications of orbital paths that have been stored, received, and/or determined by the system. The interface can allow a user to select an initial orbit of an orbital object and a target orbit. One or both of the initial and target orbits may be selected from stored, received, and/or determined orbits. The system may allow a user to quickly and easily toggle between which selected object corresponds to the initial orbit and which one corresponds to the target orbit, where applicable.

Using the interface, a user can select an orbit transfer window (e.g., an orbit transfer time window, an orbit transfer longitude window, etc.). The orbit transfer window can set boundary conditions for when and/or where an orbit transfer is to be initiated, at least partially take place, and/or be completed by a space object. The "now" line on the user interface may serve as a minimum boundary condition on time. The transfer window can identify how long an object has to complete a transfer, when the transfer can begin, and/or when it can end. Based on the transfer window, the system can automatically determine a transfer duration, a transfer start position, a transfer end position, and/or a total transfer distance. Automatically may mean occurring without further input from a user (e.g., execution instruction, selection, etc.). The system may allow a user to set a maximum computation time that determines how long the system can strive to best approximate the calculated value(s) within the set time. For example, a user may set a maximum computation time of about 0.01 s, 0.1 s, 0.5 s, 1 s, 2 s, 5 s, 10 s, 25 s, 30 s, 45 s, 60 s, or any value therein or a range of values having any endpoints therein. The transfer window can determine in part an efficiency of an energy expenditure by the selected object. For example, a larger time window may improve an efficiency of an energy expenditure of a selected object. A user can select a transfer action for the orbital object (e.g., an orbit transfer, a rendezvous transfer, an intercept transfer, etc.). As disclosed herein, the transfer action may include one, two, or more individual maneuvers. In some designs, details of each maneuver may be selected by the user. For example, one or more of the following parameters (e.g., maximum, minimum, target, etc.) of the space object may be selectable by a user: an energy change, a velocity change, a path angle change, an altitude change, a latitude and/or longitude change, a threshold distance from another object (e.g., another space object), a closing velocity, a solar phase angle (e.g., an angle between the vector toward the sun and the line of sight from one target to the other), etc. Other details of the space object may, if known, be identified by the user (e.g., mass of the object, name of the object, relationship of object to other space objects, etc.), such as those described herein.

The system can calculate or otherwise determine one or more details of an orbital object and/or of an orbit of the orbital object, such as is described above. Some details may apply to a change in a path of the orbital object, such as a transfer action. Many of these details include, for example, one or more of the following: a trajectory of the transfer path, a duration of one or more maneuvers, a total duration of a transfer action, a curvature of a path during one or more maneuvers and/or transfer actions, a velocity (e.g., speed and/or direction) of the object during one or more maneuvers and/or transfer action, a time of initiating and/or concluding one or more maneuvers and/or transfer actions, a contact time when an object encounters another object, a location of said encounter, an altitude during one or more maneuvers and/or transfer actions, a mass of the object, another scalar value (e.g., brightness, diameter, etc.) of the object, a closing velocity, a solar phase angle (e.g., an angle between the vector toward the sun and the line of sight from one target to the other), and/or any other detail of a space object.

For example, the system can determine a velocity change of the orbital object capable of causing the orbital object to move from the initial orbit to the target orbit within the transfer window (e.g., starting and/or ending the transfer within the transfer window). The system may additionally or alternatively calculate a transfer path of the orbital object corresponding to a path between the initial orbit and the target orbit. The path may begin and/or end within the transfer window, which may include a transfer time window. The system can modify the longitude-time graph to include an indication of the calculated transfer path.

In some designs, the system determines the initial orbit of the orbital object by using observations of the orbital object collected over a time period having an endpoint no later than a first maneuver timepoint (e.g., when the first maneuver is to begin). The calculated velocity change may be a minimum velocity change (e.g., in a Lambert transfer) needed to perform the maneuver and/or the full transfer action.

For certain transfer actions (e.g., the orbit transfer), the system may be configured to calculate, based on the orbit transfer window, a velocity change associated with a maneuver of the transfer action. The orbit transfer window can include a completion timepoint by which the orbit transfer is to be completed. The calculated second velocity change may be capable of causing the orbital object to move (e.g., after a first maneuver) into the target orbit within the orbit transfer time (e.g., based on the orbit transfer time window). The system can display an indication of the target orbit relative to the transfer path, such as described below. The indication of the calculated transfer path can include indications of timepoints corresponding to respective initiations of one or more maneuvers of the transfer action.

In some implementations, the system can determine a total velocity change. The total velocity change can include a summation of one or more velocity changes associated, for example, with corresponding one or more maneuvers of a transfer action.

As noted above, the transfer action can be an orbit transfer for adopting a target orbit. The transfer action can be a rendezvous transfer for joining a position and adopting an orbital path of a target orbital object.

The transfer action can additionally or alternatively include an intercept transfer for causing the orbital object to contact a target orbital object. The user may be allowed to select a minimum intercept velocity or other parameter (e.g., minimum energy, maximum intercept velocity, target path direction, etc.) associated with the orbital object as it contacts the target orbital object. As noted, a user can identify and/or select an orbit transfer window (e.g., time window) and/or one or more targetable objects from a subset of one or more potential objects (e.g., within a graph of the user interface).

The system can determine whether the transfer action (e.g., intercept transfer) is possible within the orbit transfer window. In some cases, for example, a particular transfer action may not be possible within a certain time frame. In some implementations, a maximum velocity change may be set by the system. For example, a maximum velocity change may be about 10 m/s, about 12 m/s, about 15 m/s, about 20 m/s about 25 m/s, or fall within any range having endpoints therein or having a value therein. In some implementations, the maximum velocity change is about 15 m/s. The system may be able to calculate a time and/or may display a timepoint corresponding to that time when the orbital object is to contact the target orbital object and/or adopt its orbit and/or position. The user interface can display this timepoint within the orbit transfer window if applicable.

The system can allow a user to update the orbit transfer window. In some designs, the system may automatically update calculated output (e.g., transfer path, contact time, contact location, maneuver time, etc.) in real-time based on a change in the orbit transfer window (e.g., by panning, by zooming, by direct input via an input interface, etc.). For example, the system may be configured to automatically calculate an updated transfer path of the orbital object in response to a user-updated orbit transfer time window. The system may allow a user to lock the display so that panning and/or zooming is temporarily disabled to allow, for example, for more precise window determination and more accurate calculations. Additionally or alternatively, the lock function may allow a user to pan and/or zoom without causing the system to automatically recalculate one or more details related to a transfer.

As noted above, some of the data may be obtained from a real-time telescope data connection interface configured to receive image data from historical and contemporary data sets. These data sets can be generated by a network of telescopes photographing the orbital object. From such photographs, one or more sets of identifiers can be identified about the space object.

The system can display an indication of the current time (e.g., by a line and/or timestamp). The system may display the indication of the transfer path of the orbital object in relation to the indicator of the current time so as to indicate that at least part of the transfer action (e.g., an initiation and/or completion of the transfer action) occurs and/or spans a time later than the current time. Additionally or alternatively, the system may display the indication of the transfer path in relation to the indicator of the current time so as to indicate that at least part of the transfer action occurs and/or spans a time prior to the current time.

Figure 11:
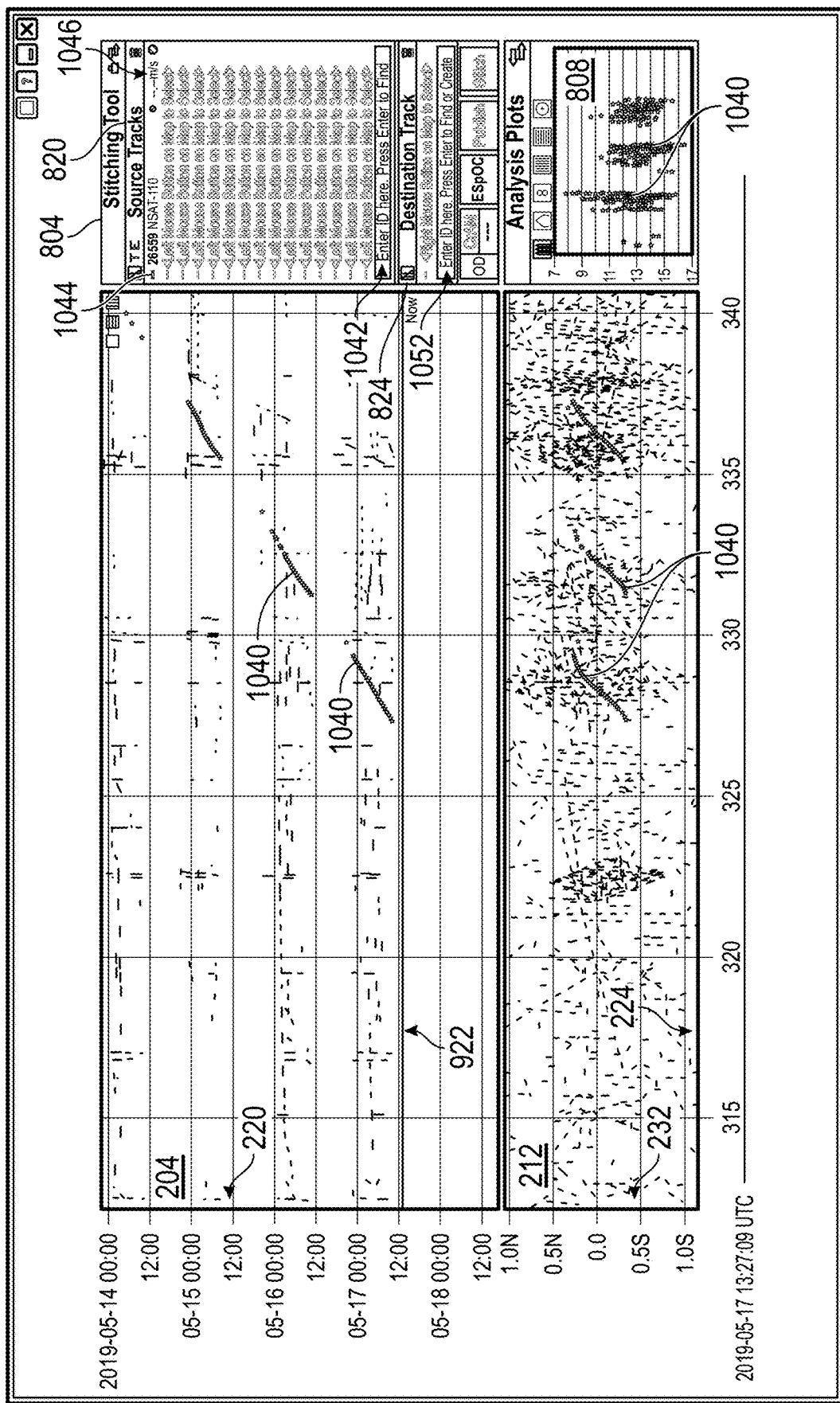
FIG. 11 shows an interface displaying an initial track.
Figure 12:
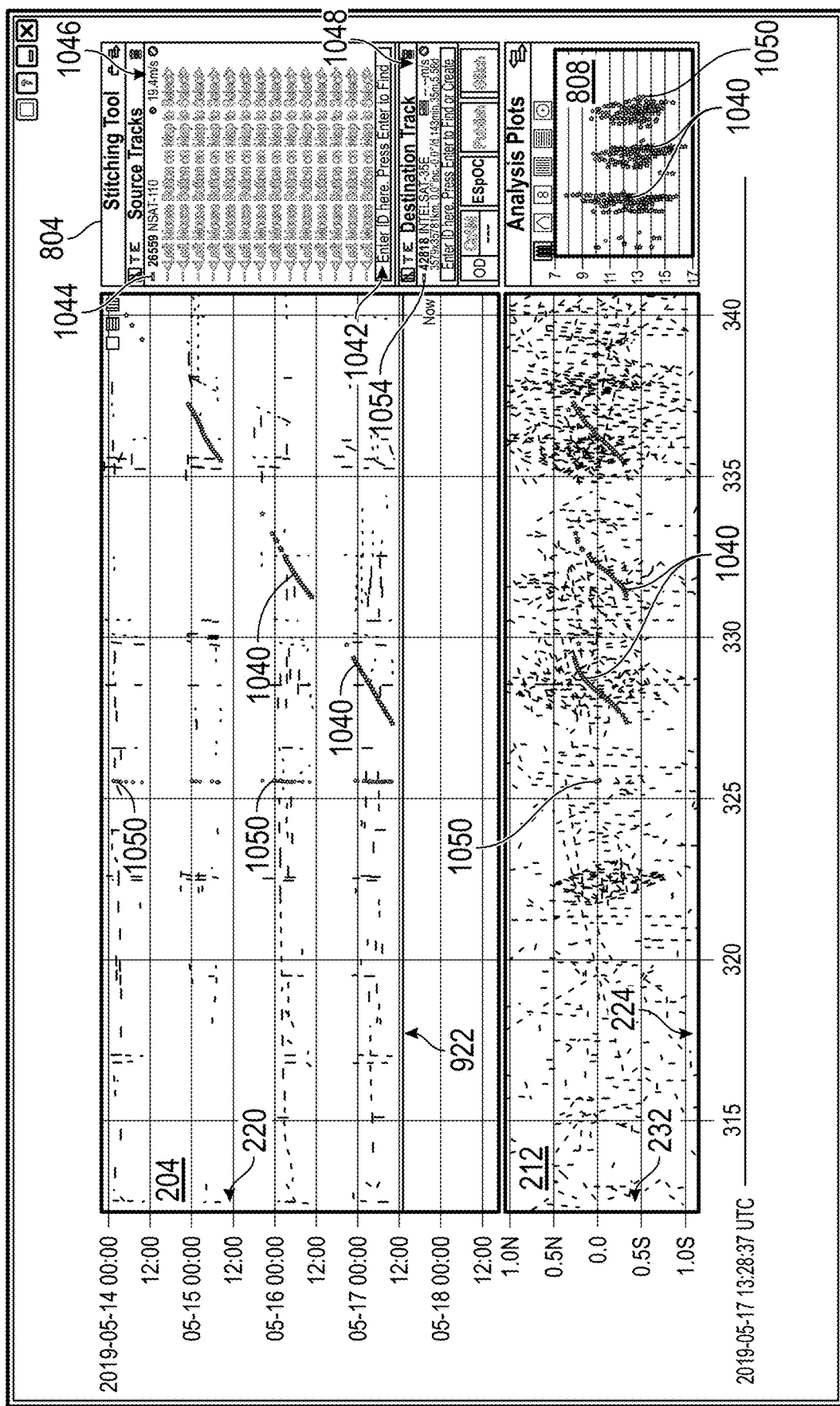
FIG. 12 shows an interface displaying an initial track and a target track.
Figure 13:
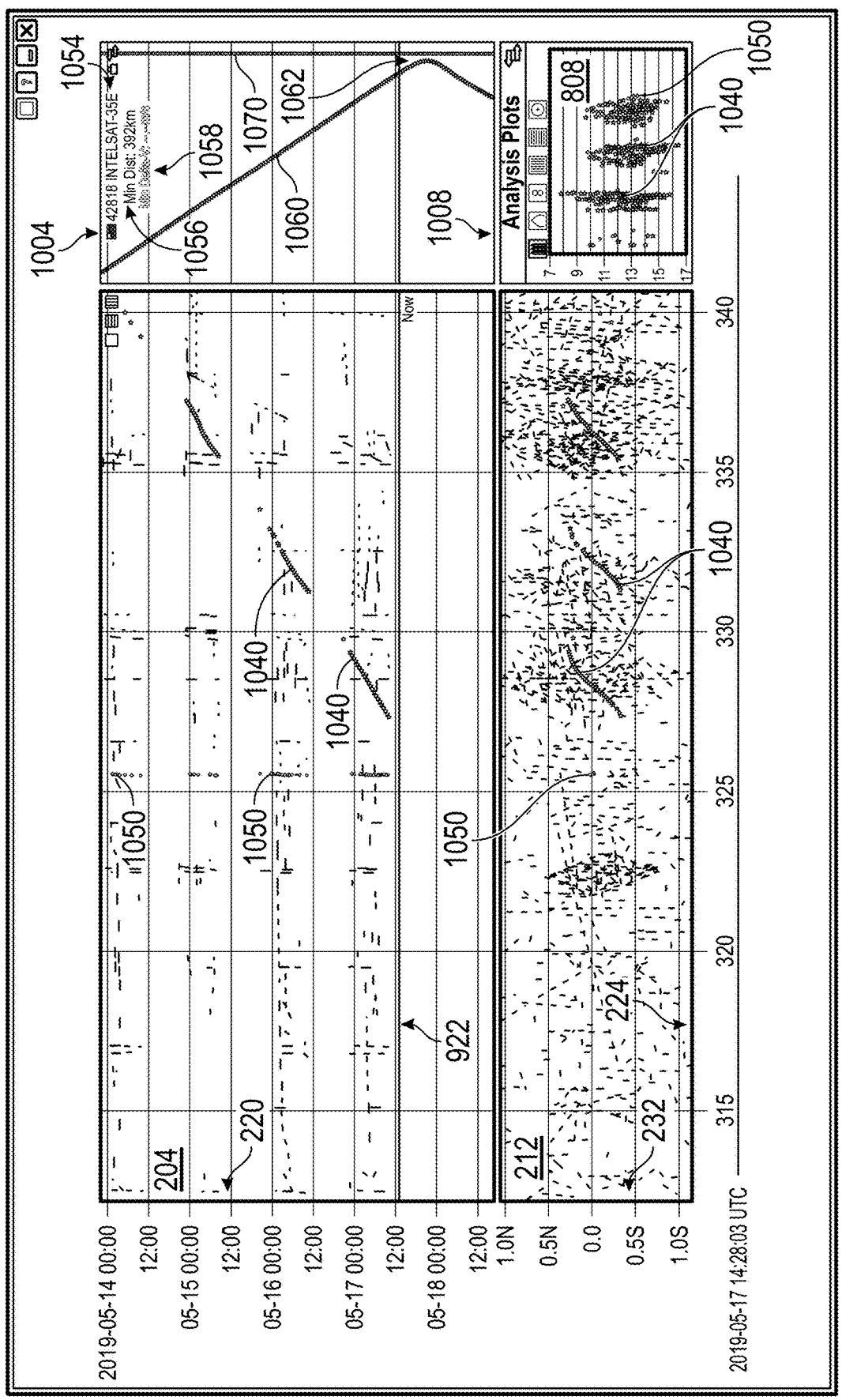
FIG. 13 shows an interface displaying an initial track, a target track, and a transfer selection interface.

Turning now to the figures, the details above will be explained in greater detail and/or additional features will be described. FIGS. 11-13 show initial orbit selection, target orbit selection, and transfer action selection. FIG. 11 shows an interface having a longitude-time graph 204, a longitude-latitude graph 212, a stitching tool interface 804, and an analysis plot interface 808. Where common numbers are used, similar or common functionality may be included.

For example, FIG. 11 and FIG. 12 show a time axis 220, a latitude axis 232, and a longitude axis 224. A first plurality of elements may form an initial track 1040 and a second plurality of elements may form a target track 1050. One or both may be additionally or alternatively represented in the longitude-latitude graph 212 and/or the analysis plot interface 808. The analysis plot interface 808 may show a magnitude value of the tracks, as described in more detail above. One or both of these can be identified, for example, in the stitching tool interface 804. For example, the initial track identifier 1044 can indicate what track the initial track 1040 is (e.g., based on a color coordination, a shape coordination, etc.). Additional information may be provided about the initial track 1040 as shown, such as an identification number, a name, an associated country (e.g., origin, owner, etc.), and/or a velocity. Other details described herein may be included additionally or alternatively. Similar information may be presented for the target track 1050 via the target track identifier 1054. The "now" or "current time" line is indicated by the current time marker 922.

FIG. 13 shows an initial orbit 1060 and target orbit 1070 corresponding to the initial track 1040 and the target track 1050, respectively. The initial orbit 1060 and the target orbit 1070 may be shown within a transfer selection interface 1004, as shown. The transfer selection interface 1004 may be included additionally with, alternatively to, or part of the stitching tool interface 804. The transfer selection interface 1004 can include a transfer relationship axis 1008. The transfer relationship axis 1008 has units associated with distance in kilometers, though other units of distance (e.g., m, miles, etc.) may also be used. The vertical axis may correspond to the time axis 220. Additionally or alternatively, a separate axis (e.g., longitude, latitude, altitude, etc.) may be used. The transfer selection interface 1004 can include details about one or more orbital objects. As shown, details of the object associated with the target orbit 1070 are indicated, such as the target track identifier 1054, the distance differential indicator 1056, and the velocity differential indicator 1058. If a user selects a different target object, target track 1050, and/or target orbit 1070, different information may be indicated.

The transfer selection interface 1004 can allow a user to select a target type of transfer action. For example, a user may select a space object (e.g., by selecting a track, by selecting an orbit, by selecting a photograph, etc.) as well as a target space object and/or orbit (e.g., by selecting a track, by selecting an orbit, by selecting a photograph, etc.). The user may select the type of transfer (e.g., orbit transfer, rendezvous transfer, intercept transfer). The user may additionally or alternatively select various parameters, such as a transfer window, as described herein. Other details may be selected by the user, such as maximum values for a velocity, energy, etc., as described herein in more detail. A target final velocity may be selected. In some embodiments, the target velocity may be 0.1 km/s, 0.5 km/s, 1 km/s, 2 km/s, 5 km/s, or any value therein or fall within any range with endpoints therein.

In some designs, the system may automatically suggest a target space object/orbit. The system may also automatically update the interface to indicate one or more details associated with the combination of the target object/orbit with the selected transfer type (e.g., a calculated velocity change, a calculated time of completion, a calculated duration of transfer, etc.). The system may take into account other factors, such as a direction and/or energy of sunlight on one or more of the initial and/or target object.

As shown the initial orbit 1060 approaches the target orbit 1070. The system indicates that an expected closest approach 1062 is to occur sometime in the future. This is because the closest approach 1062 occurs below the current time marker 922. However, the closest approach 1062 could occur in the past in a different circumstance.

Figure 14:
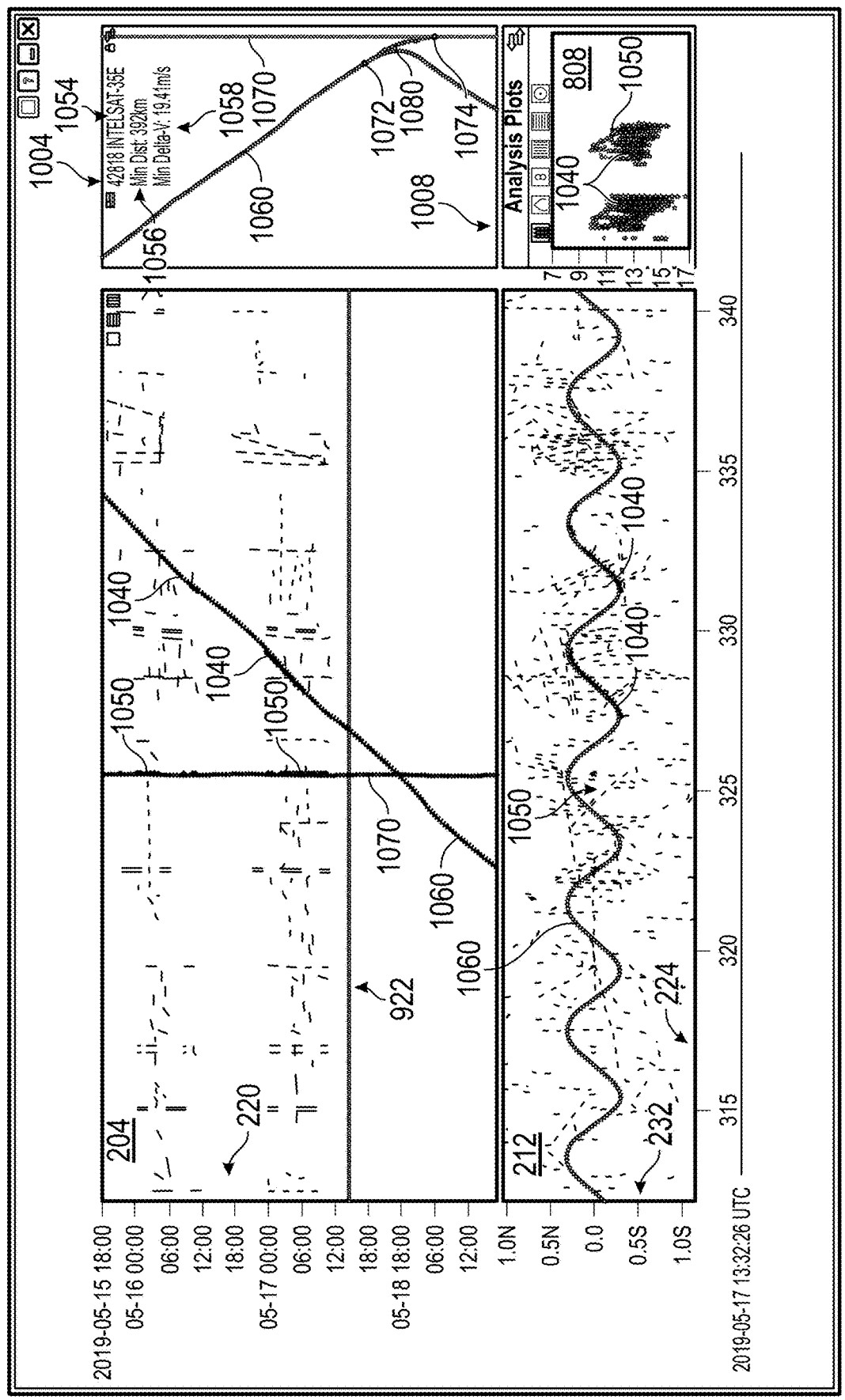
FIG. 14 shows an example intercept transfer via the user interface.

FIG. 14 shows an example intercept transfer via the user interface. As shown, the initial orbit 1060 and/or the target orbit 1070 may be indicated on one or more of the longitude-time graph 204, the longitude-latitude graph 212, and/or the analysis plot interface 808. In the transfer selection interface 1004, a transfer path 1080 is provided. The transfer path 1080 informs a user of a calculated path that a selected space object could take to complete the intercept transfer. Since the intercept transfer only requires a single maneuver, the intercept transfer has an initial maneuver point indicated by the transfer initiation indicator 1072 and an ending maneuver point indicated by the transfer completion indicator 1074. In this case, the transfer completion indicator 1074 indicates a time where the orbital object is expected to contact the target object. As shown, each of the transfer initiation indicator 1072, the transfer path 1080, and the transfer completion indicator 1074 occur below the current time marker 922, which indicates that the beginning and ending of the transfer action would occur in the future. Additionally or alternatively, the system may be able to identify such transfer actions in the past.

Figure 15:
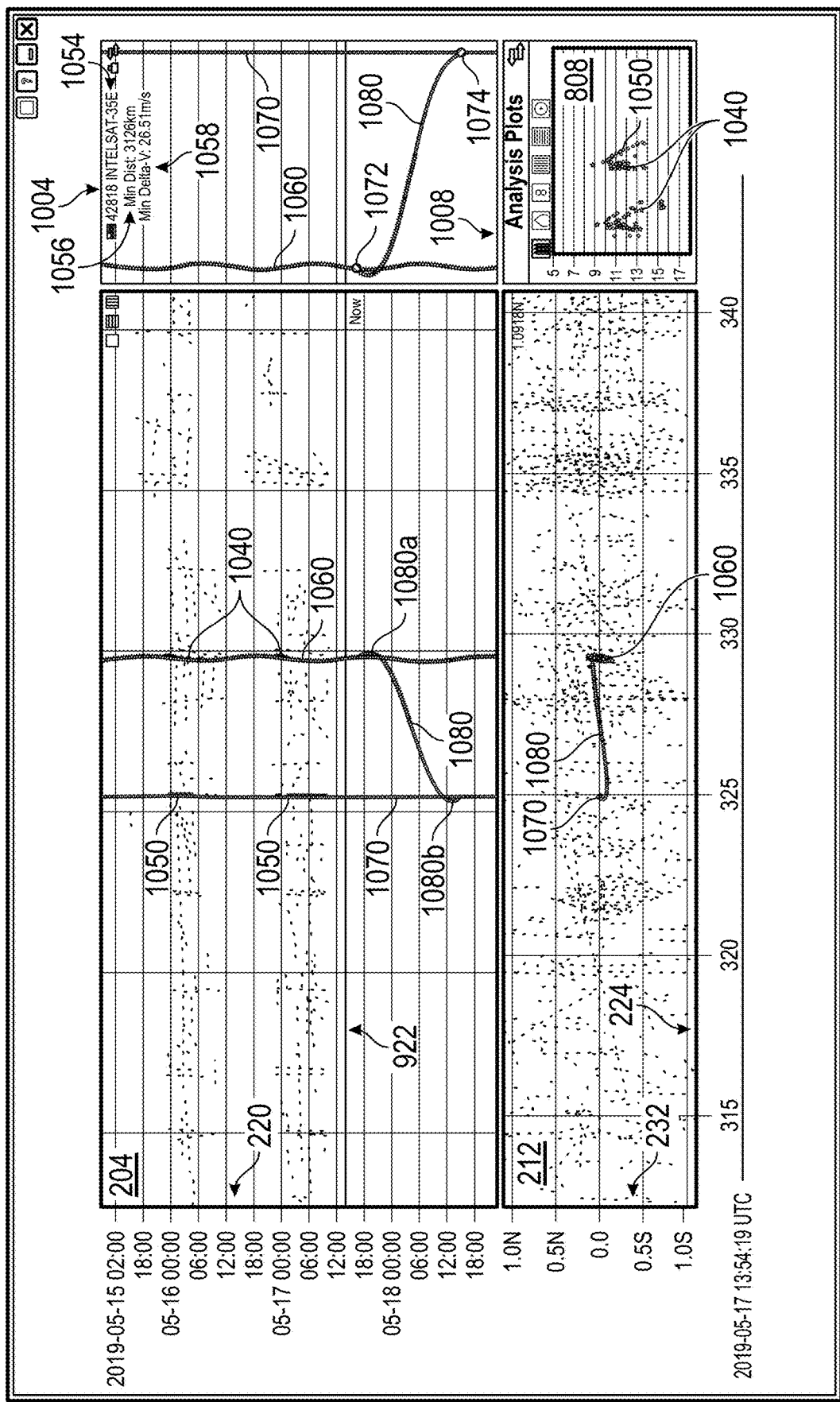
FIG. 15 shows an example rendezvous transfer via the user interface.

FIG. 15 shows an example rendezvous transfer via the user interface. As shown, the initial orbit 1060, the target orbit 1070, and/or the transfer path 1080 may be provided in one or more of the longitude-time graph 204, the longitude-latitude graph 212, and/or the transfer selection interface 1004. As shown, the initial orbit 1060 and the target orbit 1070 appear to be at a substantially constant longitude. Here, as indicated in the longitude-latitude graph 212, the initial orbit 1060 may also be a nearly substantially constant latitude. However, as shown below in FIG. 18, this appearance may be largely due to the zoom factor of the longitude-latitude graph 212. As shown in FIG. 15 (e.g., in the longitude-time graph 204), the rendezvous requires at least two maneuvers, each indicated by corresponding curves 1080*a*, 1080*b* of the "S-shape" transfer path 1080. The transfer path 1080 may indicate a visual transition between the initial track 1040 and the target track 1050. For example, a beginning of the transfer path 1080 (e.g., the first maneuver 1080*a*) may share the same or similar color as the initial orbit 1060 and/or an end of the transfer path 1080 (e.g., the second maneuver 1080*b*) may share the same or similar color as the target orbit 1070. Continuing the example, the color along the transfer path 1080 may indicate a smooth transition to suggest that the orbital object is transitioning from the initial orbit 1060 to the target orbit 1070. Additionally or alternatively, other visual indicators may be used, such as dot shapes, shadings, line dashings, number of lines, line style, highlighting, background color, and/or other indicator. Similar indicators may apply to the transfer initiation indicator 1072 and the transfer completion indicator 1074, respectively.

Figure 16:
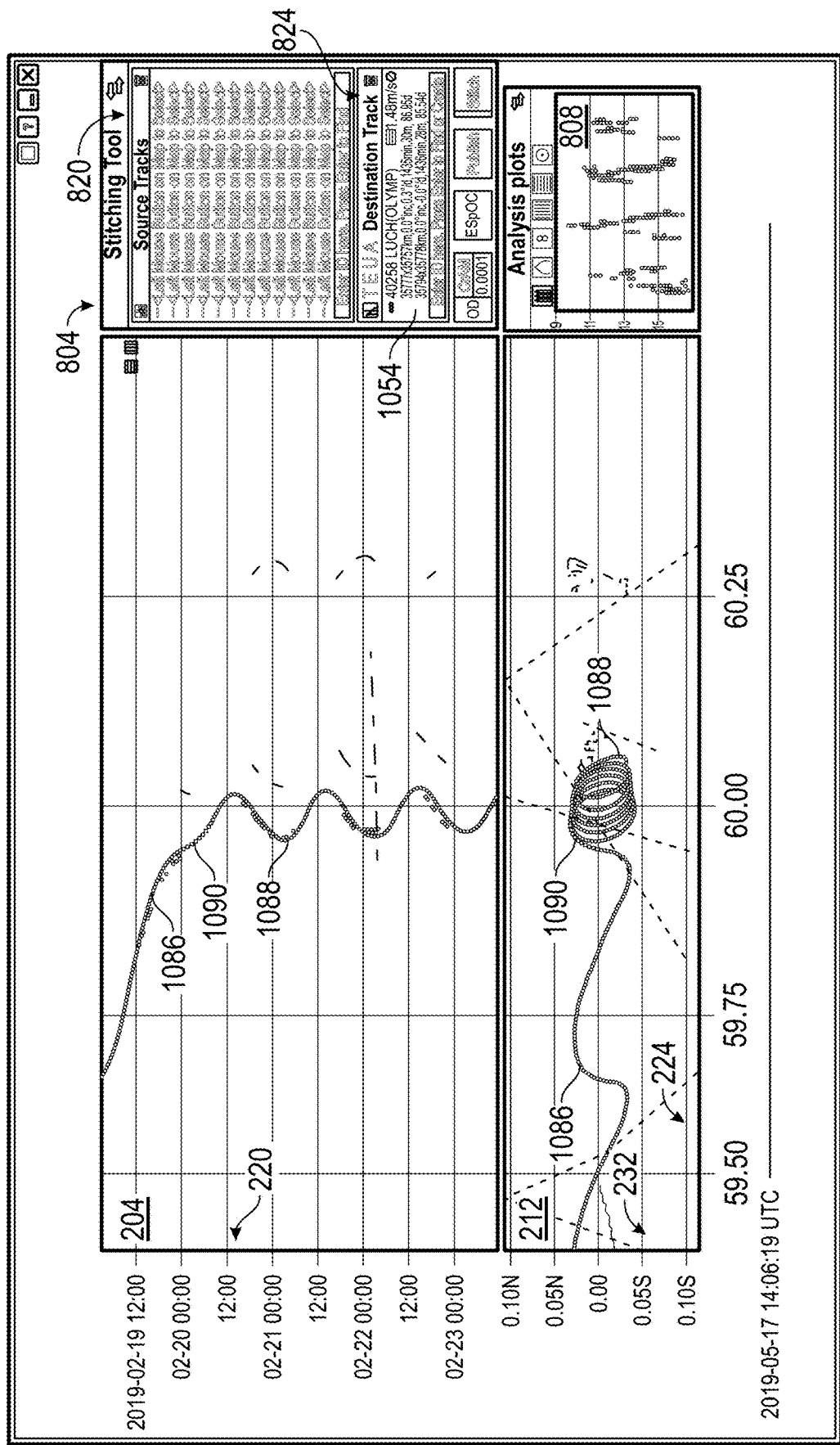
FIG. 16 shows a characterization of a maneuver that has moved an object from a first path to a second path.

FIG. 16 shows a characterization of a maneuver that has moved an object from a first path to a second path. Sometimes an object has already changed its trajectory but what transfer has taken place may not yet be known. The system can allow a user to quickly and/or automatically determine and characterize the transfer that has taken place. The target track identifier 1054 shows details related to the object. As shown, an initial orbit 1086 of a space object is displayed in the longitude-time graph 204 and the longitude-latitude graph 212. A corresponding final orbit 1088 is also shown. When transferring between the initial orbit 1086 and the final orbit 1088, the object underwent at least one maneuver 1090. The maneuver 1090 can be identified by the system automatically and/or by the user. The maneuver 1090 may generally be difficult to detect by a human for a number of reasons. For example, photographic and/or other tracking data may not be available for a corresponding space object during the maneuver 1090. Additionally or alternatively, details of the space object may be incomplete during the maneuver 1090. The system may automatically identify the two orbits 1086, 1088 or receive a user selection of the two orbits 1086, 1088 and thus identify the intervening maneuver 1090. In this way, the system can automatically direct a user to find the maneuver 1090 within the user interface. The system may indicate or highlight the maneuver 1090 by, for example, displaying it using a different aspect (e.g., color, dot shape, shading, line dashing, etc.) from one or more of the initial orbit 1086 and/or the final orbit 1088.

Figure 17:
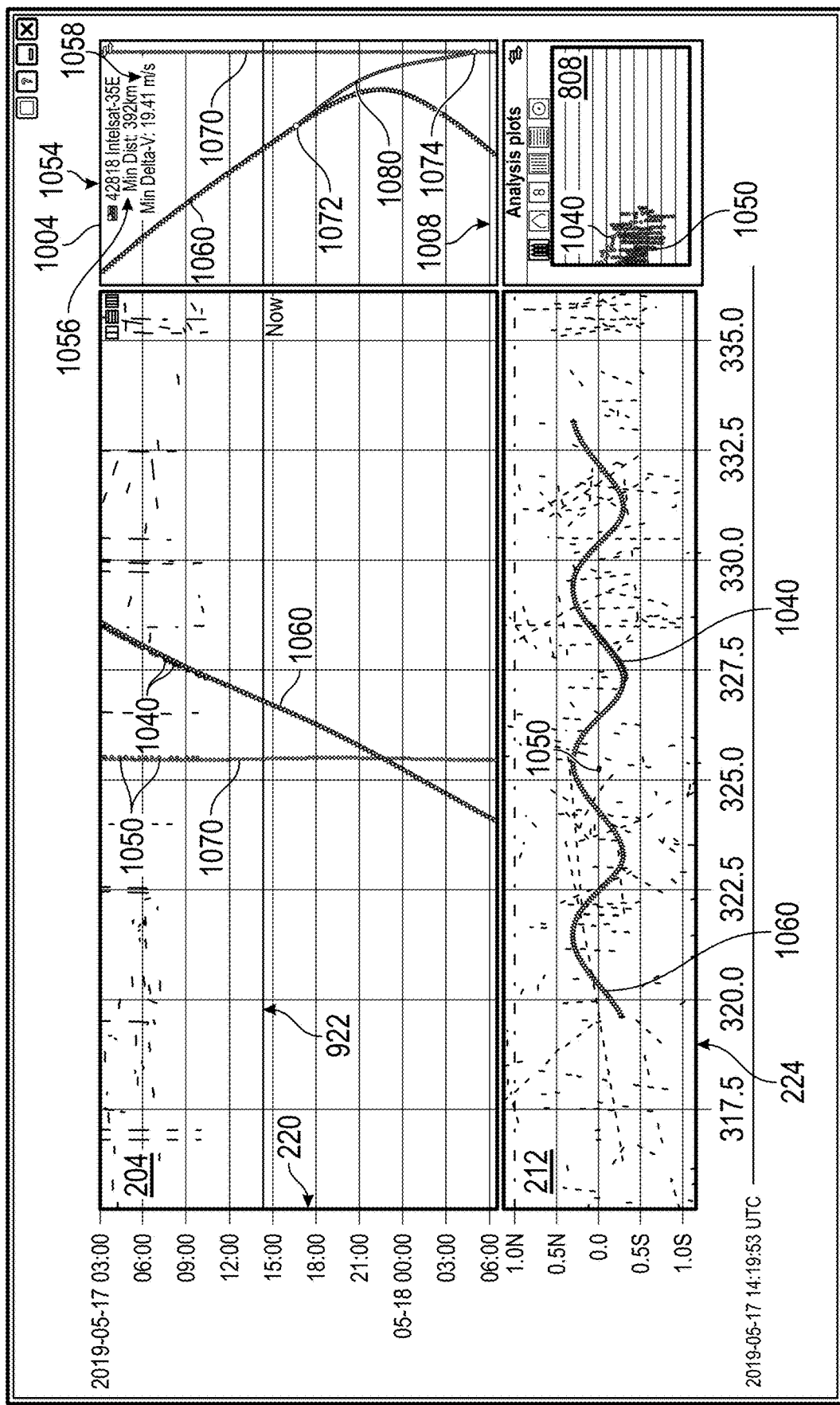
FIG. 17 shows a panned and zoomed display of FIG. 14.
Figure 18:
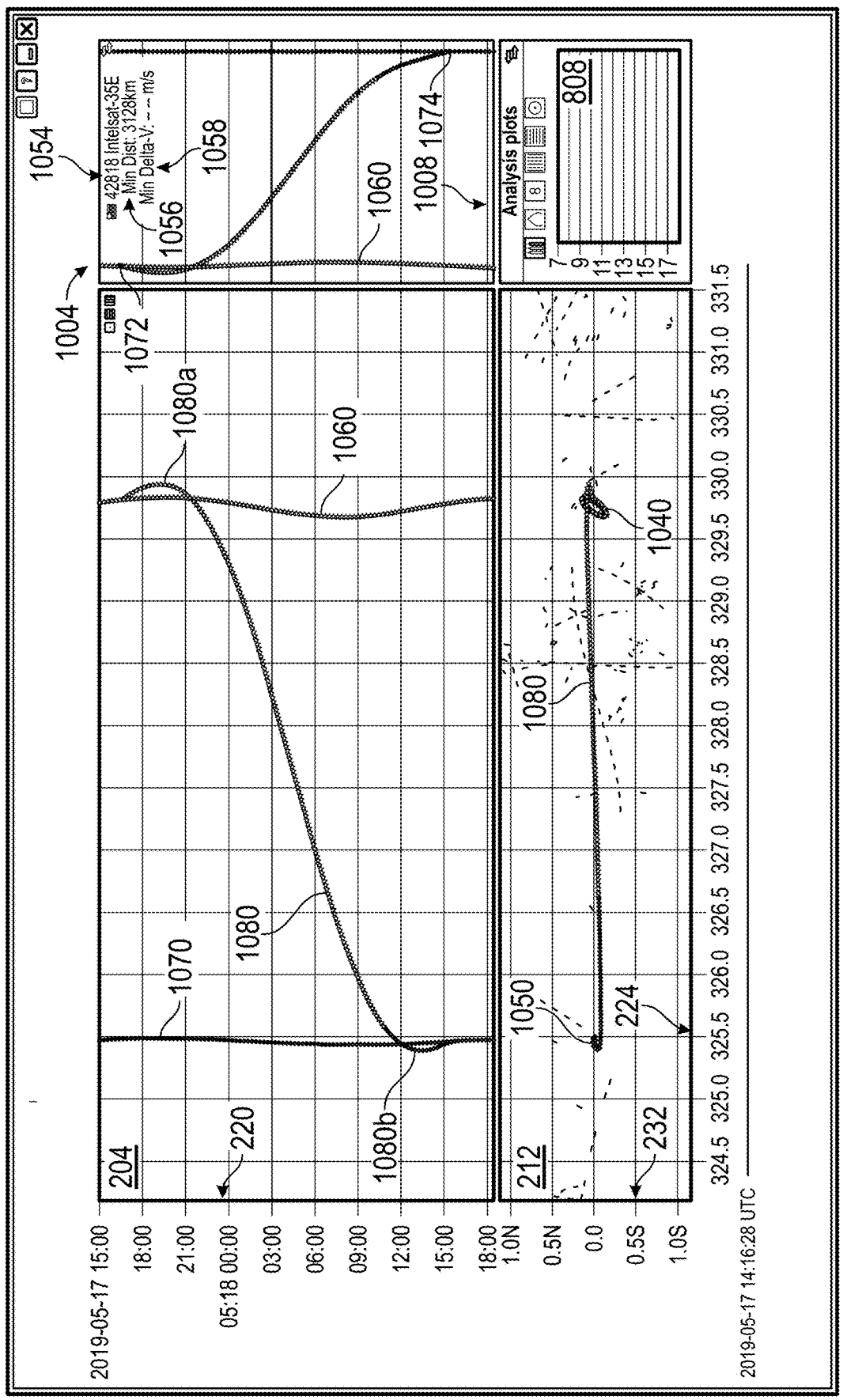
FIG. 18 shows a panned and zoomed display of FIG. 15.
Figure 19:
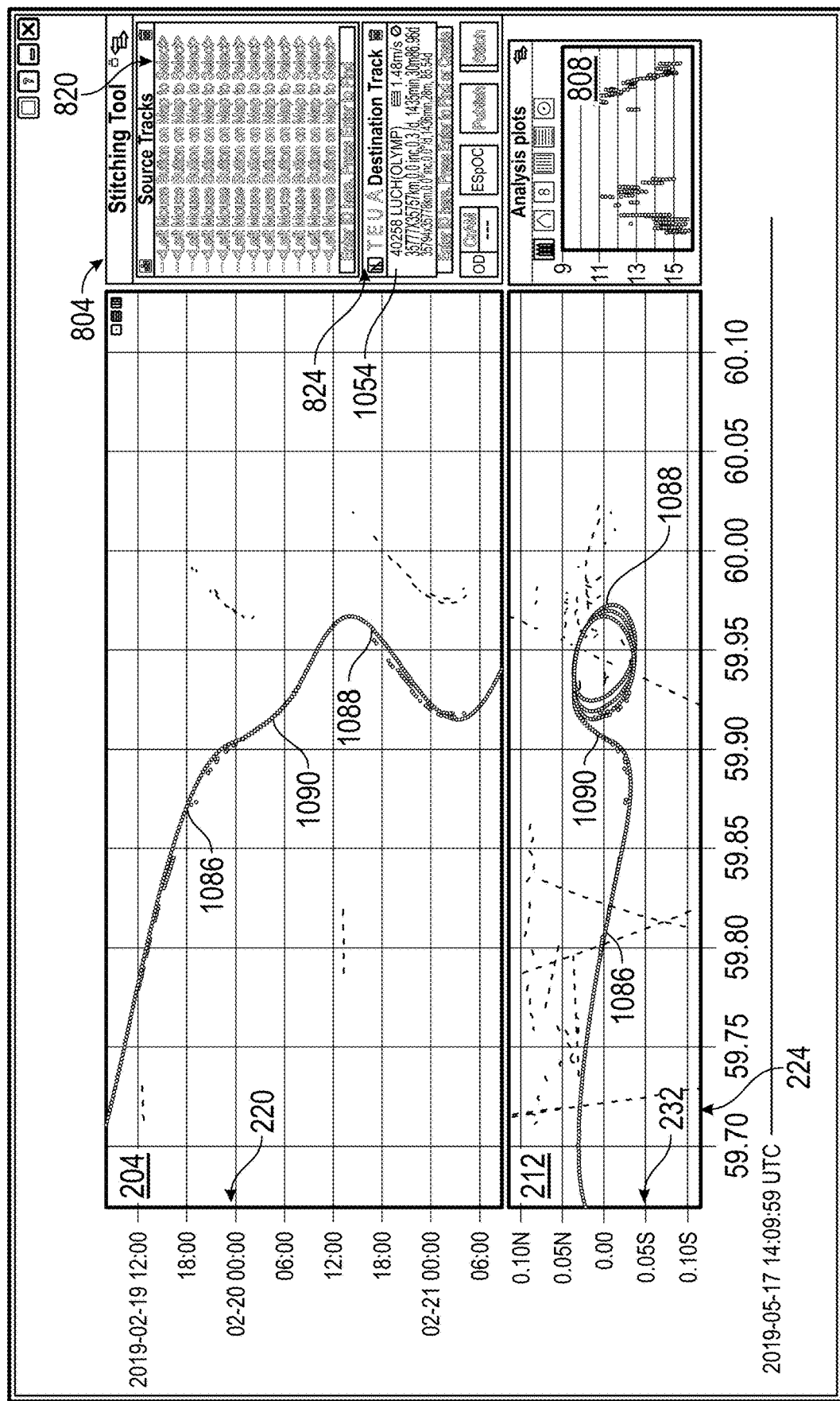
FIG. 19 shows a panned and zoomed display of FIG. 16.

FIGS. 17-19 show panned and zoomed displays of corresponding FIGS. 14-15. Accordingly, the time axis 220, the longitude axis 224, the latitude axis 232, the analysis plot interface 808, and/or the transfer relationship axis 1008 have been zoomed and/or panned. As noted above, the system can let a user quickly and easily pan and/or zoom one or more of these axes of one or more of the graphs. This can help allow a user to focus in on particular details that may be of interest. Additionally or alternatively, the user can zoom out to obtain a more high-level perspective of one or more of the objects' movements. The system is tailored for either close-up or zoomed-out inspection of space objects and their movements and/or objects.

FIGS. 39-40 show an example of additional panned and zoomed displays where the system determines a different transfer based on the corresponding boundary conditions set by the display in the respective figure. As noted above, a user may select a viewing screen to be able to determine the boundary conditions (e.g., time range, latitude range, longitude range) of a desired transfer. For example, a user may be able to determine a time range in which the transfer must begin, in which the transfer must end, or both. In some configurations, the user may select whether the ending, the beginning, or both are required to be performed within the selected boundary conditions.

Figure 20:
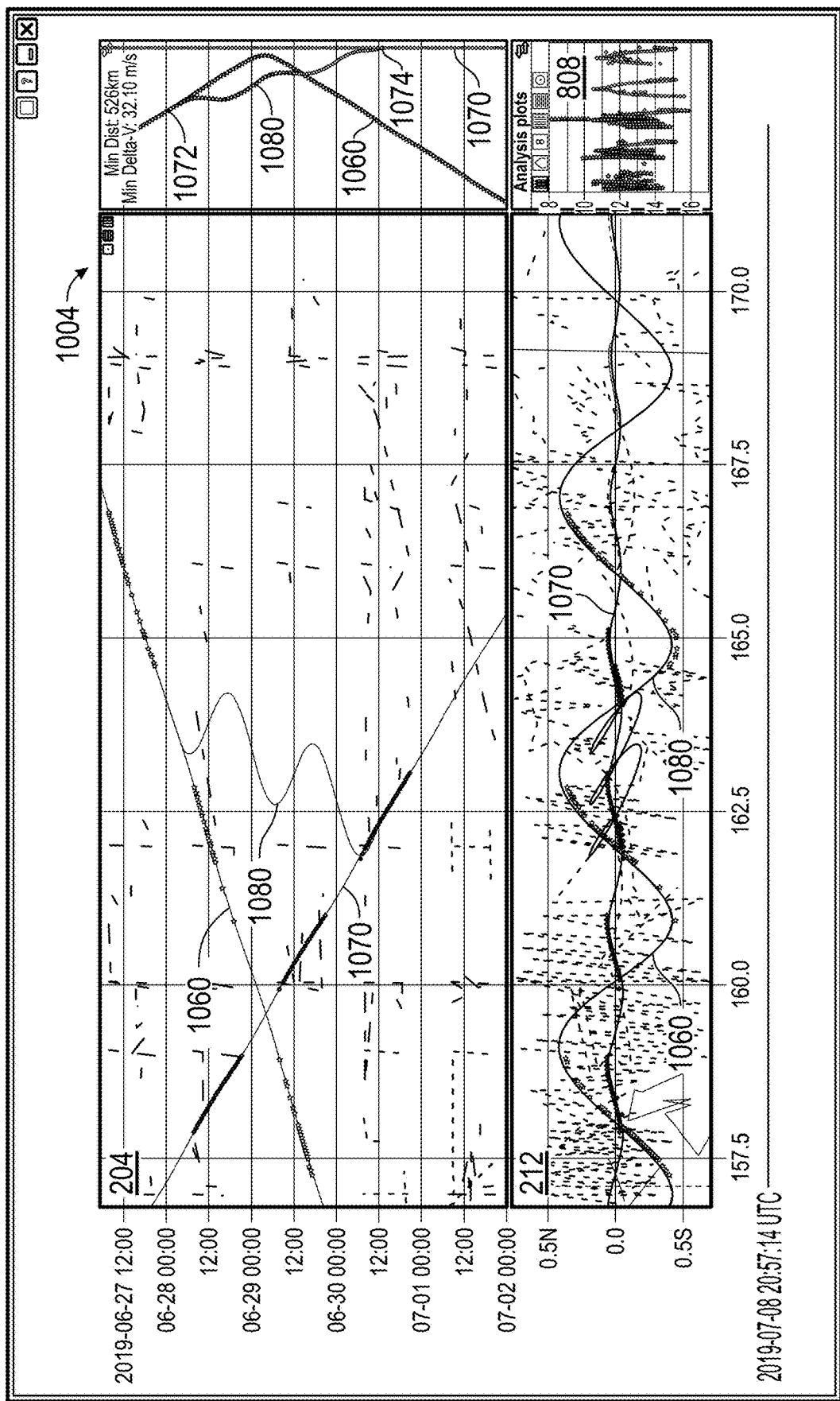
FIG. 20 shows another example rendezvous transfer via the user interface.

FIG. 20 shows an example determination of a boundary condition for which the completion of both the beginning and ending of the transfer path 1080 are required. As shown in the longitude-time graph 204 and in the transfer selection interface 1004, the transfer is to begin or has begun (as indicated, for example, by the transfer initiation indicator 1072) at around Jun. 28, 2019 at midnight. Further, as shown the transfer is to be completed or has completed just after noon on Jun. 30, 2019.

Figure 21:
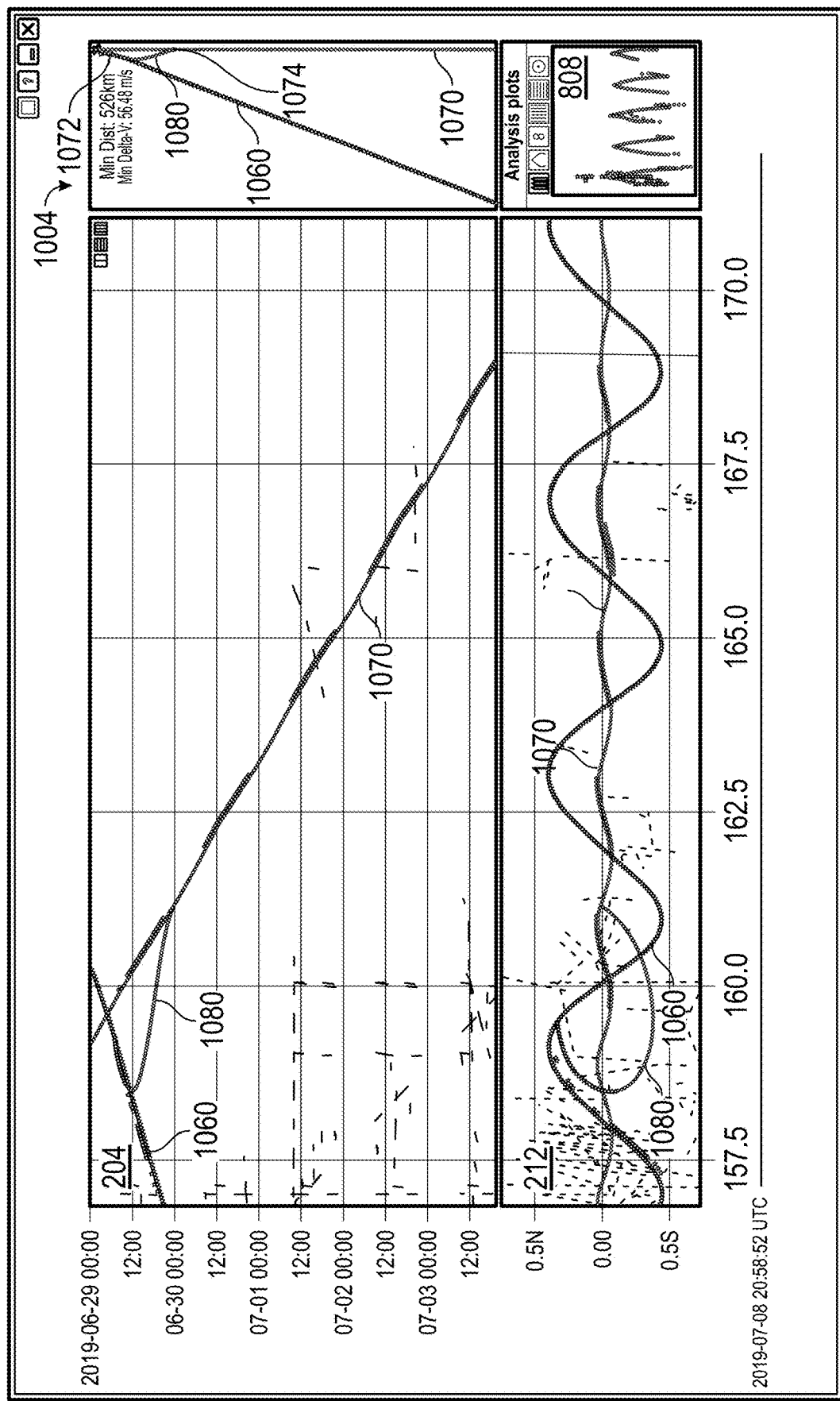
FIG. 21 shows another example rendezvous transfer between the same orbits as shown in FIG. 19 but with different time constraints.

FIG. 21 shows the same initial orbit 1060 and target orbit 1070 as in FIG. 20 but with different boundary conditions (e.g., via a panning and zooming of the longitude-time graph 204). As shown, the transfer is to begin around 6 a.m. on Jun. 29, 2019 and is to end around midnight of Jun. 30, 2019. The boundary conditions of the selected time interval of the longitude-time graph 204 and/or the transfer selection interface 1004 in FIG. 21 do not include the calculated time for the beginning of the transfer in FIG. 20 (midnight of Jun. 28, 2019). Thus, according to the boundary conditions set by the user shown in FIG. 21 (and, in this case, the requirements that both the beginning and ending of the transfer occur within those boundary conditions), the same transfer as calculated for FIG. 20 is not calculated and/or shown. Accordingly, a user can quickly and intuitively identify a desired boundary condition in which to begin and/or end a transfer by panning and/or zooming on one of the graphs in the visualization display 200. As the user pans and/or zooms, the system can automatically and/or in real-time update one or more of the graphs to show the newly calculated transfer path 1080.

Alert and Report Generator

The systems and methods described herein can be used to develop and display one or more reports configured to be read by a computer and/or human. The reports can be generated based on information collected as described above. The collected information can be analyzed, optionally with the supplementary input from a human user, to determine unique interactions between or among two or more space objects that have already occurred, that are occurring at a present time, that are expected to occur based on current trajectories, and/or that may occur based on contingent intermediate maneuvers of one or more space object. The collected information can be analyzed to identify one or more maneuvers of a single space object. Thus, the systems and interactive graphical user interfaces described herein may be configured to generate a report on one, two, three, or more space objects and the path parameters associated therewith.

A report can be generated in response to a user selection. Additionally or alternatively, a report can be generated in response to an identification (e.g., manual, automatic) of one or more events that have occurred, are occurring at a current time, or that may occur under certain circumstances. Such events can trigger an alert or some other indication of the event. The alert can include a communication or indication on the graphical user interface and/or may be configured to be understandable by a human user or observer.

A first type of alert that may be triggered is a maneuver alert. Space objects, including orbital objects, may perform maneuvers from time to time. A maneuver can include a single maneuver or a plurality of maneuvers. Maneuvers that require two or more maneuvers may be referred to as "transfers." Examples of such maneuvers include those discussed above, such as an orbit transfer, a rendezvous transfer, and an intercept transfer. Orbit transfers, for example, can include a shift to anther orbit. As an example, an orbital object may transfer to and/or from the graveyard orbit. Such maneuvers can include an increase or decrease in a delta V (e.g., instantaneous change in velocity) of the object.

An alert may be triggered when two or more space objects come into or are predicted to come into proximity with each other. The trigger may occur when a distance between two objects is measured or predicted to be below a threshold (e.g., minimum threshold). When closer than the threshold, the two objects may be referred to as being in conjunction with one another at a particular time or within a particular time window. Such an alert may be referred to as a "proximity alert" or a "conjunction alert."

Another maneuver includes station keeping, which involves a subtle movement by the space object to retain its current target orbital path. As orbital objects revolve around a planet, the orbital object's orbit may deteriorate over time. Thus, a station keeping maneuver may be used to maintain the orbit and prevent and/or repair deterioration in the orbit. For example, a station keeping maneuver can prevent a loss of altitude, circularization, and/or other imperfection in the orbit. Circularization refers to the lack of eccentricity in an orbit.

While a station keeping maneuver can trigger an alert, a failure of an object to maintain a stable orbit can also trigger an alert. Such drifting can indicate that an object is no longer capable of maintaining a stable orbit and/or that control of the object has diminished or ceased. The system may be able to identify if an object is failing to maintain the stable orbit by identifying an expected value, such as a position, degree of circularization (e.g., angle of curvature), velocity, and/or acceleration, and comparing the expected value with a corresponding measured or observed value. Additionally or alternatively, the system may identify an alert when a drift rate has been increased, decreased, and/or changes directions.

Specific details (e.g., path parameters) of a space object's trajectory may trigger an alert. For example, a particular apparent destination or source orbit may trigger an alert. The system may, for example, identify an alert when a space object enters/exits a graveyard orbit, a geosynchronous orbit, a geostationary orbit, a semi-geosynchronous orbit, and/or other type of orbit.

In generating alerts, the system may identify a threshold (e.g., maximum threshold) that needs to be exceeded before an alert is triggered. For example, the system may generate an alert if a threshold difference between the expected value and the measured value is exceeded. The threshold can include a difference between an expected trajectory and a measured trajectory. For example, the threshold can refer, for example, to an angular threshold and may be about 0.05 degrees, about 0.1 degrees, about 0.2 degrees, about 0.3 degrees, about 0.5 degrees, about 0.8 degrees, about 1 degree, about 1.5 degrees, about 2 degrees, about 2.5 degrees, about 3 degrees, about 4 degrees, about 5 degrees, any value therein, or fall within any range having endpoints therein. The threshold may refer to a distance threshold and may be about 1 meter, about 5 meters, about 10 meters, about 20 meters, about 30 meters, about 40 meters, about 50 meters, about 60 meters, about 75 meters, about 100 meters, about 150 meters, about 200 meters, about 250 meters, any value therein, or fall within any range having endpoints therein. The threshold can refer to a velocity threshold and may be about 0.5 m/s, about 1 m/s, about 1.5 m/s, about 2 m/s, about 2.5 m/s, about 3 m/s, about 4 m/s, about 5 m/s, about 7 m/s, about 10 m/s, about 12 m/s, about 15 m/s, about 20 m/s, about 30 m/s, about 40 m/s, about 50 m/s, about 100 m/s, any value therein, or fall within any range having endpoints therein. In some embodiments, the threshold may be an isolated value (e.g., not a difference between two values). For example, an alert may be generated if a Delta-V value exceeds a threshold value.

Another event that may trigger an alert is the identification (e.g., appearance) of a new object. The system may be regularly (e.g., continuously) reviewing images of space to identify new objects. Additionally or alternatively, as described herein, a human user may aid the system in identifying new objects. A new object may be identified from a launch, a deployment, a third-party listing that draws attention to the object, and/or from a new visibility (e.g., manually and/or automatically). The identification of new objects may trigger an alert that can cause the system to generate a report. Additionally or alternatively, a lost space object may trigger an alert. An object may be lost when a space object does not appear at or near an expected location. The expected location may be an area or volume of space. The boundaries of the area or volume may be based on a threshold distance, area, or volume from or around a target point. Examples of such threshold distances are described herein. Threshold areas or volumes may be a 2D or 3D extension of such threshold distances.

Yet another example of a possible alert that may be triggered is when the system determines that a magnitude (e.g., intensity of light, light pattern) of a space object differs from an expected magnitude value. For example, one alert is triggered when an intensity of light differs from an expected intensity of light. Additionally or alternatively, the alert may be triggered if the shape or pattern of the light emitted and/or reflected from the space object is sufficiently different (e.g., greater than a threshold value) from an expected shape or pattern. Such an alert may be referred to as a "photometric anomaly alert" (PAA).

As described in more detail above, the system can receive a plurality of images of one or more space objects. Based on these images, the system can identify an intensity of light projected from the space objects at different times and positions. Using these images, the system can determine a model of a photometric pattern projected from the objects and, based on the model, determine an expected photometric pattern and/or intensity of light at a given future time.

Using the model (e.g., expected photometric pattern, intensity of light), the system can determine an attitude state, such as a relative attitude state, of the space object. Examples of such attitude states include a spin stable state, an attitude control state, an uncontrolled spin state (e.g., anomalous slewing), a directed orientation (e.g., dynamic slewing), and a tumble state (e.g., a low-aspect-ratio tumble). Dynamic slewing includes directing the objects orientation in a controlled way, such as apparently directing an attitude toward another object. An alert may be generated if a particular attitude state changes, such as a beginning, ending, or acceleration of an attitude state.

In some embodiments, the system identifies certain attitude states as non-alerts. For example, certain embodiments may use attitude states to identify alerts of objects that appear to be "dead" (e.g., apparently not controlled). However, in certain implementations, "live" objects may trigger alerts as described herein, such as the proximity and orbit transfer alerts.

One of the many advantages of the systems described herein includes the ability to identify and signal anomalous or otherwise interesting information to a human user and/or the computer system. Each alert can be based on tracking path parameters of a space object. The path parameters can include a position, a displacement, a speed, a velocity, an acceleration, a curvature of orbit (e.g., circularization), and/or any other detail of the object's orbit or other trajectory. Path parameters can additionally or alternatively include a relationship with one or more space objects (e.g., a distance from, a relative velocity/speed, a relative lighting advantage, etc.) such as described herein. A path parameter can include a detail of a departure or change in object trajectory (e.g., a maneuver, a transfer, etc.).

Figure 22:
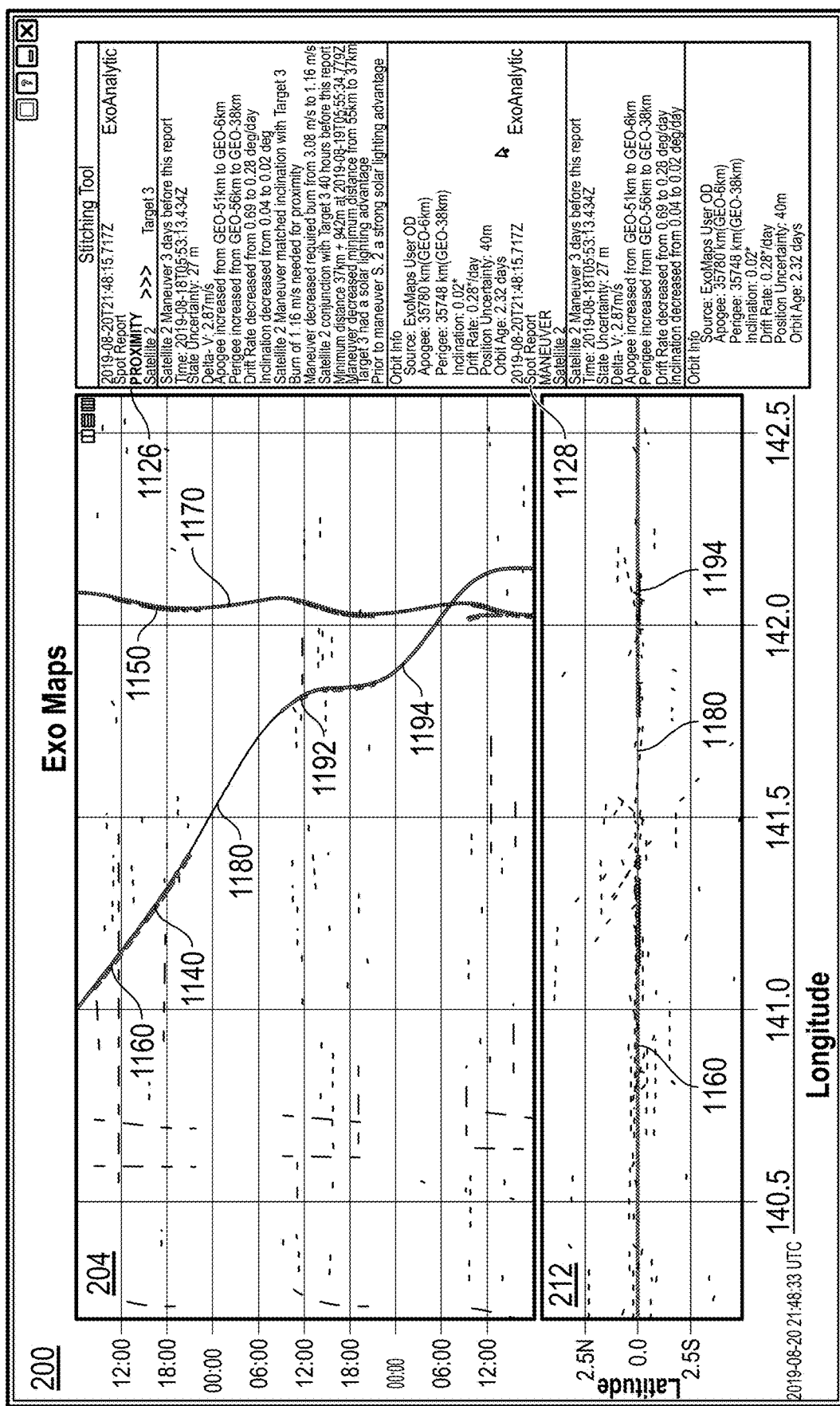
FIG. 22 shows an example visualization with a proximity spot report and a maneuver spot report.

Various features of certain embodiments will now be described with reference to the figures. FIG. 22 shows an example visualization display 200 (e.g., interactive graphical user interface) with a proximity spot report and a maneuver spot report. The proximity spot report and the maneuver spot report may be indicated by the proximity spot report indicator 1126 and the maneuver spot report indicator 1128, respectively. The spot reports 1126, 1128 represent pop-up reports that can be shown directly in the visualization display 200, as shown. However, other types of displays and formats are possible, such as those described below with FIGS. 24-25. The longitude-time graph 204 and longitude-latitude graph 212 show two orbital paths of separate objects—Satellite 2 and Target 3. The initial orbit 1160 of Satellite 2 is shown, which is based at least in part on a corresponding initial track 1140 of Satellite 2. Following the initial orbit 1160, the visualization display 200 shows that Satellite 2 undertook one or more maneuvers to initiate a transfer path 1180 (e.g., a intercept transfer). Following the transfer path 1180, a final orbit 1194 of the Satellite 2 is displayed. The final orbit 1194 may be calculated in part based on a corresponding final track 1192 of Satellite 2. The initial track 1140 and final track 1192 each represent one or more data points (e.g., timepoints) associated with corresponding one or more images of the Satellite 2.

The Target 3 has an orbit represented on the visualization display 200 by the target orbit 1170, which is determined at least in part by its associated target track 1150. As shown in the longitude-time graph 204, the final orbit 1194 of Satellite 2 and the target orbit 1170 of Target 3 appear to reach their point of closest approach around 06:00 of Aug. 18, 2019.

In response to a user selection, a spot report may be generated. Such a report may be based on an alert identified by the system and/or may be based on a user search. For example, a user may select (e.g., click on) a particular alert, which may result in the automatic generation of the spot report. Additionally or alternatively, a user may search for one or more source objects (e.g., Satellite 2), one or more target objects (e.g., Target 2), a time or time window, a latitude or latitude range, a longitude or longitude range, and/or other search parameter.

As shown in FIG. 22, for example, a user has selected one or both of Satellite 2 and Target 3. In response, the proximity spot report indicator 1126 can include details such as when the maneuver occurred (e.g., 3 days before the generation of the report), at what time the maneuver occurred (e.g., at 5:53:13 on Aug. 18, 2019), a degree of uncertainty (e.g., positional uncertainty of about 27 m), a near-instantaneous change in velocity (e.g., Delta-V) of the source object Satellite 2 (e.g., 2.87 m/s), a change in apogee (e.g., increase from GEO-51 km to GEO-6 km), a change in perigee (e.g., increase from GEO-56 km to GEO-38 km), a drift rate change (e.g., decrease from 0.69 deg/day to 0.28 deg/day), and/or change in inclination (e.g., decrease from 0.04 deg to 0.02 deg).

The report may additionally or alternatively include a status of any matches of the above factors to a target object (e.g., Target 2) and/or related information. For example, the system may identify that the maneuver of Satellite 2 caused it to have a matched inclination with Target 2, which required a burn of 1.16 m/s to achieve proximity. A change in burn economics (e.g., a decrease or increase) based on the maneuver can be shown (e.g., decrease from 2.08 m/s to 1.16 m/s). The report can include a time of when the conjunction occurred (e.g., 10 hours before the generation of the report). A minimum distance (e.g., 37 km +/−942 m) of the conjunction and/or the time of the conjunction (e.g., 5:55:34 on Aug. 19, 2019) can be displayed. An effect on the minimum distance and/or on the time of conjunction (e.g., maneuver decreased minimum distance from 55 km to 37 km) can be displayed.

It may be advantageous to know whether one or more objects had a solar lighting advantage. For example, an object may be equipped with image sensors to obtain details about another object, such as when the conjunction occurs. The proximity spot report 1126 can additionally or alternatively include an indication of which object had a solar lighting advantage during the conjunction (e.g., Target 3 had a solar lighting advantage) and/or whether the maneuver changed the nature of the solar lighting advantage (e.g., Satellite 2 had a strong solar lighting advantage prior to the maneuver).

Other path parameters of the source object (e.g., Satellite 2) and/or target object (e.g., Target 3) can be calculated and displayed. For example, the details of the orbit of Satellite 2 are shown in FIG. 22—Source: ExoMaps User OD; Apogee: 35780 km (GEO-6 km); Perigee: 35748 km (GEO-38 km); Inclination: 0.02 degrees; Drift Rate: 0.28 degrees/day; Position Uncertainty: 40 m; Orbit Age: 2.32 days.

As shown, the system also generated a maneuver spot report 1128. A system may generate one or more spot reports. The maneuver spot report 1128 indicates path parameters associated with the path of the source object (e.g., Satellite 2). Here, because the proximity report already included details of the maneuver (e.g., time of maneuver, effect, etc., as discussed above), those details are not listed again here.

Figure 23:
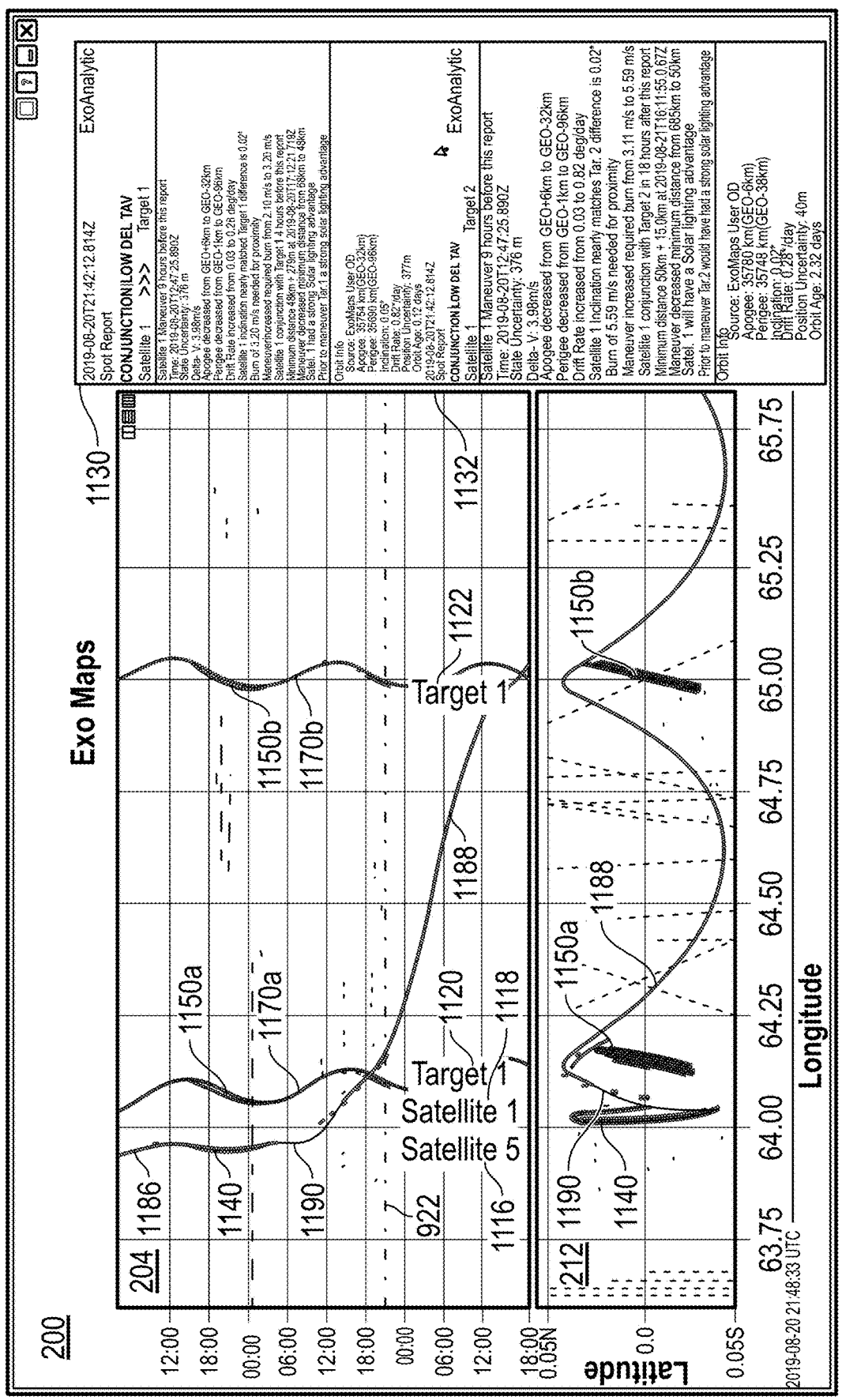
FIG. 23 shows two example conjunction spot reports within a visualization display.

FIG. 23 shows two example conjunction spot reports 1130, 1132. The first conjunction spot report 1130 describes details associated with a conjunction between a source object Satellite 1 and a first target object Target 1. The second conjunction spot report 1132 shows details related to a conjunction between the Satellite 1 and a second target object Target 2.

The longitude-time graph 204 and longitude-latitude graph 212 visually show details of the paths of the Satellite 1, Target 1, and Target 2. The visualization display 200 shows an initial orbit 1186, maneuver path 1190, and a final orbit 1088. The initial orbit 1186 is calculated in part based on the initial track 1140. The visualization display 200 shows the first target orbit 1170a (e.g., based at least in part on the first target track 1150a) and the second target orbit 1170b (e.g., based in least in part on the second target track 1150b). One or more of the elements described above may be displayed by the longitude-time graph 204, the longitude-latitude graph 212, another graph described herein (e.g., the magnitude-time graph), and/or any combination thereof.

The longitude-time graph 204 shows a current time marker 922. The final orbit 1088, first target orbit 1170a, and the second target orbit 1170b each span before and after a current time, as indicated by their display below and above, respectively, the current time marker 922. In some embodiments, as a user zooms into the longitude-time graph 204 and/or the longitude-latitude graph 212 to a certain threshold of detail, one or more object indicators may be shown. The visualization display 200 shows a Satellite 5 indicator 1116, a Satellite 1 indicator 1118, a Target 1 indicator 1120, and/or a Target 2 indicator 1122. These object indicators may indicate where a corresponding orbit would intersect the current time marker 922 in the absence of any intervening maneuvers. In some embodiments, the location of the object indicators may based on a relative location of the paths of the respective object orbital paths. Note that no tracks (e.g., initial track 1140, first target track 1150a, second target track 1150b) are indicated below the current time marker 922 since no future images of objects would yet be available for analysis.

As shown, the first conjunction spot report 1130 includes details related to a maneuver of Satellite 1 that already caused a conjunction (e.g., historical conjunction) with Target 1. As shown, the maneuver occurred 9 hours before the generation of the report. The maneuver occurred at 12:47:25 on Aug. 20, 2019 with a degree of positional uncertainty of 376 m and a Delta-V of the Satellite 1 of 3.98 m/s. The first conjunction spot report 1130 shows a decrease in apogee from GEO+6 km to GEO-32 km and a decrease in perigee from GEO-1 km to GEO-96 km and a drift rate increase from 0.03 deg/day to 0.82 deg/day.

The first conjunction spot report 1130 indicates that Satellite 1 and Target 1 had a matched inclination with a difference of 0.02 degrees, which required a burn of 3.20 m/s to achieve proximity. The required burn increased from 2.10 m/s to 3.20 m/s. The conjunction occurred 4 hours before the generation of the report. A minimum distance of 48 km +/−279 m of the conjunction occurred at 17:12:21 on Aug. 20, 2019. The maneuver decreased a minimum distance from 68 km to 48 km. The first conjunction spot report 1130 indicates that Satellite 1 had a solar lighting advantage during the conjunction but that prior to the maneuver, Target 1 had a strong solar lighting advantage.

Other path parameters of Satellite 1 are shown in FIG. 23—Source: ExoMaps User OD; Apogee: 35754 km (GEO-32 km); Perigee: 35690 km (GEO-96 km); Inclination: 0.05 degrees; Drift Rate: 0.82 degrees/day; Position Uncertainty: 377 m; Orbit Age: 0.12 days.

FIG. 23 also shows an example second conjunction spot report 1132 that shows an expected conjunction (e.g., future conjunction) between Satellite 1 and Target 2. As shown, the maneuver shares the same characteristics of the maneuver described by the first conjunction spot report 1130, so those details will not be repeated. The second conjunction spot report 1132 indicates that Satellite 1 and Target 2 had a matched inclination with a difference of 0.02 degrees, which required a burn of 5.59 m/s to achieve proximity. The required burn increased from 3.11 m/s to 5.59 m/s. The conjunction is not expected to occur until 18 hours after the generation of the report. A minimum distance of 50 km +/−15.0 km of the conjunction occurred at 16:11:55 on Aug. 21, 2019. The maneuver decreased a minimum distance from 685 km to 50 km. The second conjunction spot report 1132 indicates that Satellite 1 will have a solar lighting advantage during the conjunction but that prior to the maneuver, Target 2 would have had a strong solar lighting advantage but for the maneuver by Satellite 1. Other path parameters of Satellite 1 are shown in FIG. 23, but as above, these details repeat the orbit information shown by the first conjunction spot report 1130 and are not repeated here.

FIGS. 43-44 show two example proximity spot reports 1252, 1254, respectively. The proximity spot reports 1252, 1254 show reports that can be presented to a human user in an easily digestible format. The proximity spot reports 1252, 1254 do not require access to the visualization display 200 described above but can be prepared (e.g., printed) and presented to a human user after analysis by the computer system and/or one or more human users has been conducted.

Figure 24:
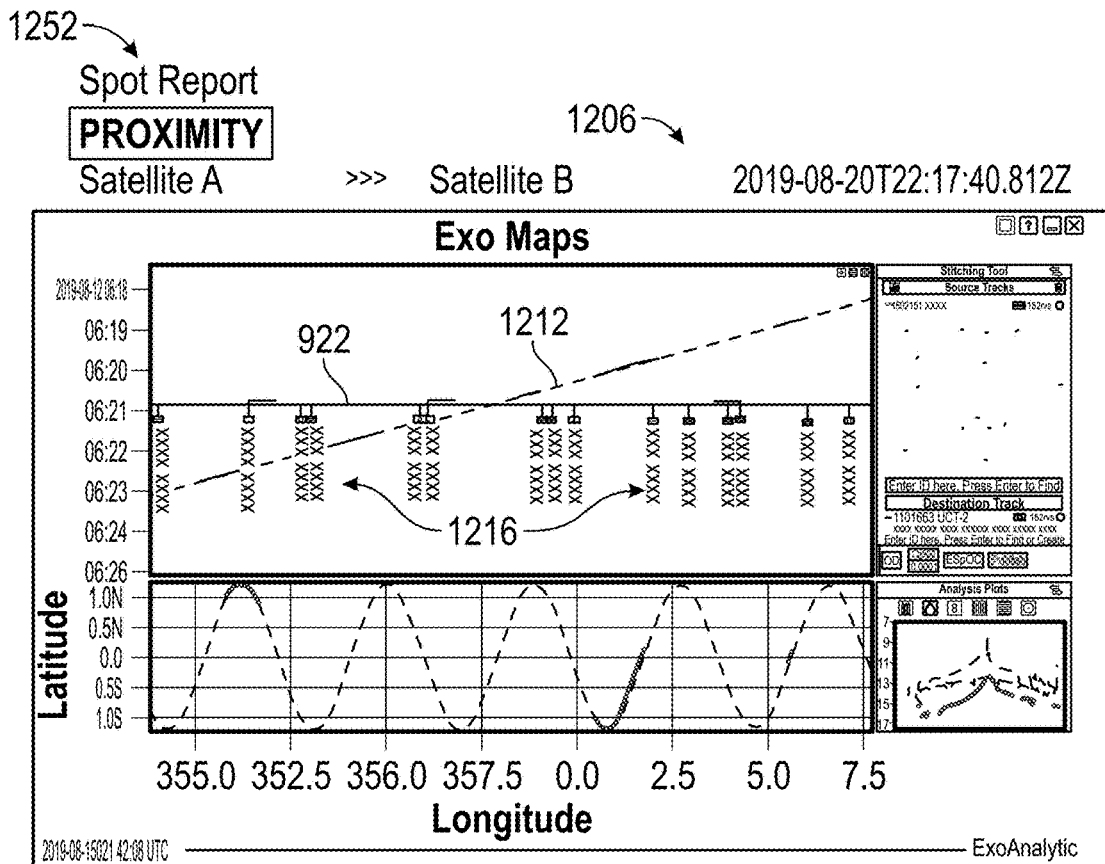
FIG. 24 shows an example first proximity spot report showing a conjunction between Satellite A and Satellite B.

FIG. 24 shows an example first proximity spot report 1252 showing a conjunction between Satellite A and Satellite B. The first proximity spot report 1252 includes a display interface detail 1206 and a spot report detail 1208. The display interface detail 1206 shows an object orbit 1212 (e.g., of the Satellite A and/or of the Satellite B), a current time marker 922, and a plurality of object indicators 1216. The object indicators 1116 can include identifiers such as country flags, position indicators (e.g., lines, arrows), activity details (e.g., blinking, highlighting, font adjustments) based on current or otherwise relevant object behavior (e.g., a satellite may blink or be highlighted based on a recently obtained alert related thereto). Other details, such as those described above, are shown but are not discussed here in detail. For example, details of the source and/or target objects can be shown in with the stitching tool interface (e.g., stitching tool interface 804 of FIG. 12) and/or the analysis plot interface (e.g., analysis plot interface 808 of FIG. 12).

The spot report detail 1208 shows that Satellite A maneuvered at 01:11:32 on Aug. 19, 2019, which was 45 hours before the generation of the first proximity spot report 1252. The state uncertainty is 52 m with a Delta-V of 2.66 m/s. The perigee decreased from GEO+316 km to GEO+289 km with a decrease in drift rate from 4.07 degrees/day to 3.88 degrees/day. Satellite A is expected to match the inclination of Satellite B, and 0.66 m/s of burn is required for proximity. The maneuver decreased a required burn rate from 2.00 m/s to 0.66 m/s. The first proximity spot report 1252 indicates that the conjunction is expected to occur 34 hours after this report with a minimum distance of 0 km +/−5.2 km at 08:24:42 on Aug. 22, 2019. The maneuver decreased the minimum distance from 16 km to 0 km and will give Satellite A a solar lighting advantage, even though prior to the maneuver, Satellite B would have had a slight solar lighting advantage.

Figure 25:
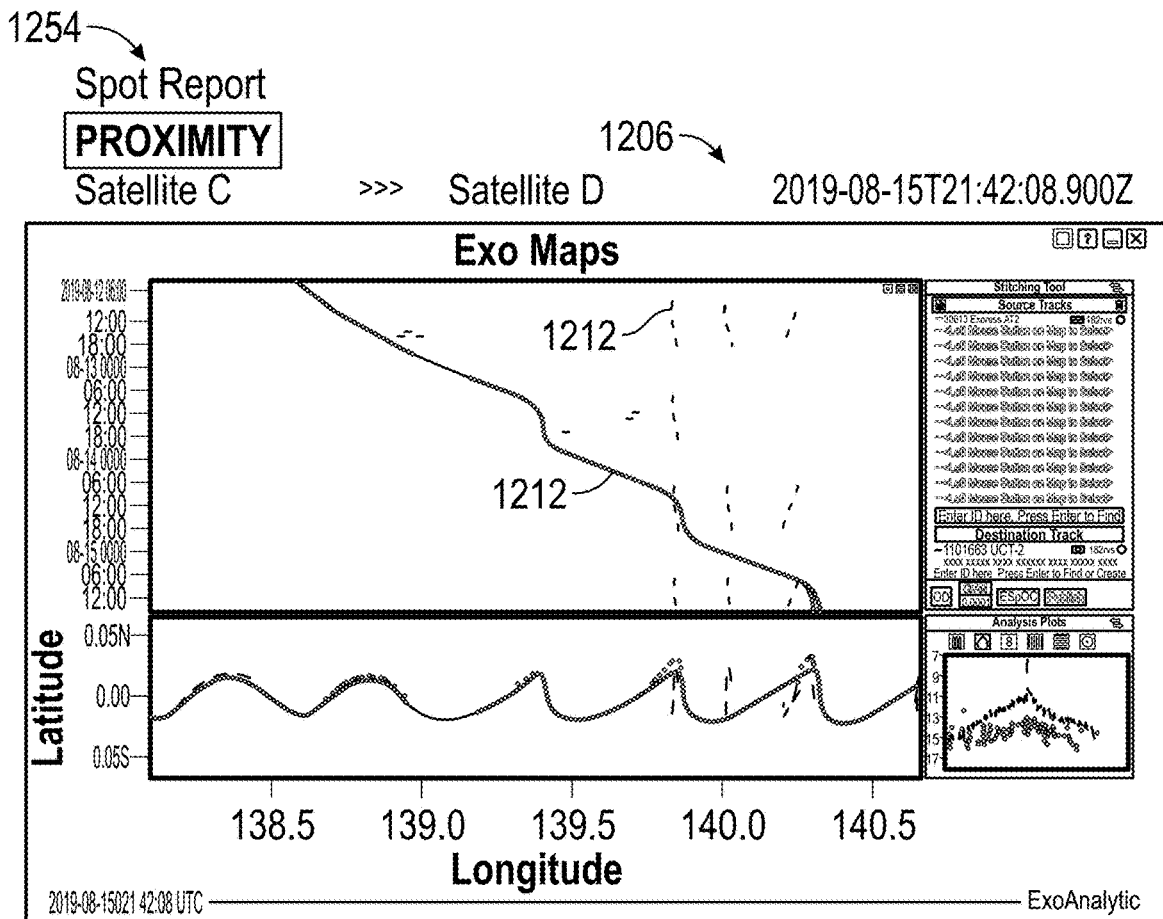
FIG. 25 shows a second proximity spot report in response to a maneuver performed by Satellite C.

FIG. 25 shows a second proximity spot report 1254 in response to a maneuver performed by Satellite C. The second proximity spot report 1254 includes a display interface detail 1206 and a spot report detail 1208. The 11206 includes a plurality of object orbits 1212, including the orbits of Satellites C and D.

The spot report detail 1208 shows that Satellite C maneuvered at 17:24:02 on Aug. 12, 2019, with a Delta-V of 1.58 m/s. The apogee increased from GEO-28 km to GEO-10 km and the perigee decreased from GEO-42 km to GEO-55 km. Satellite C matched the inclination of Satellite D, and a Delta-V of 1.82 m/s is required to enter proximity operations. The second proximity spot report 1254 indicates that the conjunction is expected to occur with a minimum distance of 16 km +/−1.2 km at 15:31:32 on Aug. 14, 2019. The maneuver will give Satellite C a solar lighting advantage.

Example Aspects

In a 1st example, a system for determining and displaying path parameters of one or more space objects comprises: a space object data interface configured to receive a plurality of identifiers associated with one or more space objects; a non-transitory computer readable storage storing machine-executable instructions configured to cause the system to determine and display path parameters of one or more space objects; and a hardware processor in communication with the computer-readable storage, wherein the instructions, when executed by the hardware processor, are configured to cause the system to: receive, via a user interface, a first identifier associated with a first space object; determine a first maneuver of the first space object, the first maneuver comprising a perturbation of the path of the first space object; based on the first identifier and the first maneuver, identify one or more path parameters associated with a path of the first space object; and generate a display interface comprising: a longitude-time graph comprising a longitude axis spanning from a lower-longitude limit to an upper-longitude limit and a time axis spanning from the lower-time limit to the upper-time limit; and an indication of the one or more path parameters.

In a 2nd example, the system of example 1, wherein the instructions, when executed by the hardware processor, are further configured to cause the system to: receive, via the user interface, a second identifier associated with a second space object; identify a first maneuver of the second space object, the first maneuver of the second space object comprising a perturbation of the path of the second space object; based on the second identifier and the first maneuver of the second space object, identify one or more path parameters associated with a path of the second space object; and update the display interface to include an indication of the one or more parameters associated with the path of the second space object.

In a 3rd example, the system of any of examples 1-2, wherein the first identifier comprises an indication of an orbit of the first space object selected from the plurality of identifiers associated with the one or more space objects.

In a 4th example, the system of any of examples 1-3, wherein the instructions, when executed by the hardware processor, are further configured to cause the system to: determine an orbit of the first space object; and identify a station keeping of the first space object, wherein the station keeping comprises the first maneuver, the first maneuver configured to maintain the orbit of the first space object.

In a 5th example, the system of any of examples 1-4, wherein the instructions, when executed by the hardware processor, are further configured to cause the system to: determine a target orbit of the first space object; and identify an orbit transfer of the first space object, wherein the orbit transfer comprises the first maneuver of the first space object for adopting the target orbit, the orbit transfer comprising the first maneuver and a second maneuver, the first maneuver associated with a beginning of the orbit transfer and the second maneuver associated with an end of the orbit transfer.

In a 6th example, the system of any of examples 1-5, wherein the instructions, when executed by the hardware processor, are further configured to cause the system to: identify a potential final maneuver of the first space object; based on the identified potential final maneuver and on the first maneuver, determine a potential final velocity of the first space object.

In a 7th example, the system of example 6, wherein the instructions, when executed by the hardware processor, are further configured to cause the system to: determine a velocity of a second space object; and determine that the potential final velocity of the first space object is about the same as the velocity of the second space object.

In an 8th example, the system of example 7, wherein the instructions, when executed by the hardware processor, are further configured to cause the system to: based on the identified potential final maneuver of the first space object, determine a potential target position of the first space object at a target time; determine a position of the second space object at the target time; and determine that the potential target position of the first space object is about the same as the position of the second space object at the target time.

In a 9th example, the system of any of examples 6-8, wherein the instructions, when executed by the hardware processor, are further configured to cause the system to: determine a position of the first space object at a target time; determine a position of a second space object at the target time; and determine a distance between the first space object and the second space object at the target time.

In a 10th example, the system of example 9, wherein the one or more path parameters comprise the distance between the first space object and the second space object at the target time.

In a 11th example, the system of any of examples 7-10, wherein the instructions, when executed by the hardware processor, are further configured to cause the system to: determine a solar lighting advantage between the first space object and the second space object at a target time, wherein the one or more path parameters comprise the solar lighting advantage.

In a 12th example, the system of any of examples 7-11, wherein the instructions, when executed by the hardware processor, are further configured to cause the system to: generate a machine-readable report based on the one or more parameters associated with a path of the first space object.

In a 13th example, the system of any of examples 1-12, wherein the instructions, when executed by the hardware processor, are further configured to cause the system to: determine an orbit of the first space object; determine, based on the orbit of the first space object, an expected trajectory of the first space object; identify a drift of the first space object, wherein the drift comprises a departure from the orbit of the first space object above a maximum threshold.

In a 14th example, the system of example 13, wherein the maximum threshold comprises a difference between an expected trajectory and a measured trajectory of between about 0.05 degrees and about 5 degrees.

In a 15th example, the system of any of examples 1-14, wherein the instructions, when executed by the hardware processor, are further configured to cause the system to: identify a physical characteristic and a magnitude of radiation of the first space object at a first time; and based on the physical characteristic and the magnitude of radiation, determine an expected photometric signal at a second time.

In a 16th example, the system of example 15, wherein the instructions, when executed by the hardware processor, are further configured to cause the system to: identify an actual photometric signal at the second time; and determine that a difference between the expected and actual photometric signals at the second time is greater than a maximum signal threshold.

In a 17th example, the system of example 16, wherein the instructions, when executed by the hardware processor, are further configured to cause the system to: based on the determination that the difference between the expected and actual photometric signals at the second time is greater than the maximum signal threshold, generate an alert comprising an indication of at least one of the expected photometric signal, the actual photometric signal, the difference, or the maximum signal threshold.

In an 18th example, a method for generating alerts of photometric data related to orbital objects, the method comprising: receiving a plurality of images of one or more space objects identifying a plurality of identifiers associated with each of the one or more space objects; receiving, via a graphical user interface, a first identifier associated with a first space object, wherein the first identifier comprises an indication of an orbit of the first space object selected from the plurality of identifiers associated with the one or more space objects; identifying, based on the first identifier, a physical characteristic and a magnitude of radiation of the first space object at a first time; determining, based on the physical characteristic and the magnitude of radiation, an expected photometric signal at a second time; and displaying, via the graphical user interface, an indication of at least one of the physical characteristic at the first time, the magnitude of radiation at the first time, or the expected photometric signal at the second time.

In a 19th example, the method of example 1, further comprising: identifying an actual photometric signal at the second time; and determining that a difference between the expected and actual photometric signals at the second time is greater than a maximum signal threshold.

In a 20th example, the method of example 2, further comprising: determining, based on the first identifier, a first maneuver of the first space object, the first maneuver comprising a perturbation of the path of the first space object; identifying, based on the first identifier and the first maneuver, one or more path parameters associated with a path of the first space object; receiving, via the user interface, a second identifier associated with a second space object; identifying a first maneuver of the second space object, the first maneuver of the second space object comprising a perturbation of the path of the second space object; identifying, based on the second identifier and the first maneuver of the second space object, one or more path parameters associated with a path of the second space object; and generating a display interface comprising: a longitude-time graph comprising a longitude axis spanning from a lower-longitude limit to an upper-longitude limit and a time axis spanning from the lower-time limit to the upper-time limit; and an indication of the one or more path parameters associated with the path of the second space object.

In a 21st example, a system for determining and displaying a transfer path of an orbital object, the system comprising: a computer-readable storage configured to communicate instructions for displaying one or more graphs; an orbital path data interface configured to receive orbital path data from an orbital path data set, the orbital path data comprising a plurality of received orbital paths, each of the received orbital paths associated with an orbital object; and an electronic processor in communication with the computer-readable storage, wherein the instructions, when executed by the electronic processor, are configured to cause the system to: generate a display interface comprising: a longitude-time graph comprising: a longitude axis spanning from a lower-longitude limit to an upper-longitude limit; a time axis spanning from a lower-time limit to an upper-time limit; a time axis zoom control interface configured to receive a user selection of a scale factor for the time axis; a time axis pan control interface configured to receive a user command to move the lower-time limit and the upper-time limit in the same direction; and an indication of at least some of the plurality of received orbital paths; receive, via a user interface, a user selection of an initial orbit of the orbital object and a target orbit each selected from the plurality of received orbital paths; receive, via the time axis zoom control interface and the time axis pan control interface, a user-selected orbit transfer time window comprising the lower-time limit and the upper-time limit; receive a selection of a transfer action of the orbital object, the transfer action comprising a first maneuver for the orbital object, wherein the selection of the transfer action represents a modification of the initial orbit toward the target orbit; determine a velocity change of the orbital object capable of causing the orbital object to move from the initial orbit to the target orbit and a first maneuver timepoint associated with the first maneuver, the first maneuver timepoint occurring at a time not after the upper-time limit and not before the lower-time limit; calculate a transfer path of the orbital object corresponding to a path between the initial orbit and the target orbit; and modify the longitude-time graph to include an indication of at least a portion of the calculated transfer path.

In a 22nd example, the system of example 21, wherein the instructions, when executed by the electronic processor, are configured to cause the system to determine the initial orbit of the orbital object by using observations of the orbital object collected over a time period having an endpoint no later than the first maneuver timepoint.

In a 23rd example, the system of any of examples 21-22, wherein the velocity change comprises a minimum velocity change of the orbital object required to complete the first maneuver.

In a 24th example, the system of any of examples 21-23, wherein the transfer action comprises an orbit transfer of the orbital object for adopting the target orbit, the orbit transfer comprising the first maneuver and a second maneuver, the first maneuver associated with a beginning of the orbit transfer and the second maneuver associated with an end of the orbit transfer.

In a 25th example, the system of example 24, wherein the instructions, when executed by the hardware processor, are further configured to: calculate, based on the orbit transfer time window, a second velocity change associated with the second maneuver of the orbit transfer, wherein the orbit transfer time window comprises a completion timepoint by which the orbit transfer is to be completed, wherein the calculated second velocity change is capable of causing the orbital object to move, after the first maneuver, into the target orbit within the user-selected orbit transfer time; and update, based on the calculated second velocity change, the display to include an indication of the target orbit relative to the transfer path.

In a 26th example, the system of example 25, wherein the instructions, when executed by the hardware processor, are further configured to determine a total velocity change comprising a summation of the velocity change and the second velocity change.

In a 27th example, the system of any of examples 25-26, wherein a second maneuver timepoint associated with the second maneuver occurs: after the first maneuver timepoint; at a time not after the upper-time limit; and at a time not before the lower-time limit.

In a 28th example, the system of any of examples 25-27, wherein the indication of the calculated transfer path comprises indications of timepoints corresponding to respective initiations of the first and second maneuvers.

In a 29th example, the system of any of examples 25-28, wherein the second velocity change comprises a minimum velocity change of the orbital object required to complete the second maneuver.

In a 30th example, the system of any of examples 21-29, wherein the transfer action comprises a rendezvous transfer for joining a position and adopting an orbital path of a target orbital object, the rendezvous transfer comprising the first maneuver and a second maneuver, the first maneuver associated with a beginning of the rendezvous transfer and the second maneuver associated with an end of the rendezvous transfer.

In a 31st example, the system of example 30 wherein the instructions, when executed by the hardware processor, are further configured to: receive a selection of the target orbital object, wherein the orbit transfer time window comprises a completion timepoint by which the rendezvous transfer is to be completed; calculate, based on the orbit transfer time window, a second velocity change associated with the second maneuver of the rendezvous transfer, wherein the calculated second velocity change is capable of causing the orbital object to move, after the first maneuver, into the target orbit within the user-selected orbit transfer time; and update, based on the calculated second velocity change, the display to include an indication of the target orbit relative to the transfer path.

In a 32nd example, the system of example 31, wherein the instructions, when executed by the hardware processor, are further configured to determine a total velocity change comprising a summation of the velocity change and the second velocity change.

In a 33rd example, the system of any of examples 31-32, wherein a second maneuver timepoint associated with the second maneuver occurs: after the first maneuver timepoint; at a time not before the lower-time limit; and at a time not after the upper-time limit.

In a 34th example, the system of any of examples 31-33, wherein the indication of the target orbit relative to the transfer path comprises indications of timepoints corresponding to respective initiations of the first and second maneuvers.

In a 35th example, the system of any of examples 31-34, wherein the second velocity change comprises a minimum velocity change of the orbital object required to complete the second maneuver.

In a 36th example, the system of any of examples 21-35, wherein the transfer action comprises an intercept transfer for causing the orbital object to contact a target orbital object selected by the user.

In a 37th example, the system of example 36, wherein the instructions, when executed by the hardware processor, are further configured to receive a user selection of a minimum intercept velocity associated with the orbital object as it contacts the target orbital object.

In a 38th example, the system of example 37, wherein the instructions, when executed by the hardware processor, are further configured to: determine, based on the orbit transfer time window, one or more targetable objects from a subset of one or more potential objects within the longitude-time graph; receive a selection of the target orbital object from among the one or more targetable objects, wherein the determined velocity change is capable of causing the orbital object to move from the initial orbit to contact the target orbit within the user-selected orbit transfer time; calculate, based on the selected target orbital object, a contact timepoint when the orbital object is to contact the target orbital object; and update the display, based on the calculated contact timepoint, to include an indication of the contact timepoint relative to the transfer path.

In a 39th example, the system of any of examples 37-38, wherein contact timepoint occurs: after the first maneuver timepoint; at a time not before the lower-time limit; and at a time not after the upper-time limit.

In a 40th example, the system of any of examples 21-39, wherein the velocity change is less than about 15 m/s.

In a 41st example, the system of any of examples 21-40, wherein the instructions, when executed by the hardware processor, are further configured to cause the system to automatically calculate an updated transfer path of the orbital object in response to a user-updated orbit transfer time window.

In a 42nd example, the system of any of examples 21-41, further comprising a real-time telescope data connection interface configured to receive image data from historical and contemporary data sets generated by a network of telescopes photographing the orbital object, wherein at least one of the initial or target orbits comprises a plurality of timepoints each comprising sets of identifiers, wherein each set of identifiers comprises: a name identifier; a time identifier; a latitude identifier; and a longitude identifier.

In a 43rd example, the system of example 42, wherein the orbital path is determined over an orbital time period that includes a first time period that (i) overlaps the selected time period, (ii) precedes the selected time period, (iii) succeeds the selected time period, or (iv) any combination thereof, the first time period spanning from the lower-time limit to the upper-time limit.

In a 44th example, the system of any of examples 42-43, wherein the display interface further comprises a longitude-latitude graph comprising: a second longitude axis spanning from a second lower-longitude limit to a second upper-longitude limit, a latitude axis spanning from a lower-latitude limit to an upper-latitude limit; and a plurality of pixels corresponding to longitude-latitude points within the longitude-latitude graph, each of the plurality of longitude-latitude points corresponding to a set of identifiers having a latitude identifier between the lower-latitude limit and the upper-latitude limit and having a longitude identifier between the second lower-longitude limit and the second upper-longitude limit.

In a 45th example, the system of any of examples 42-44, wherein the display interface further comprises a scalar-time graph comprising: a scalar axis spanning from a lower-scalar limit to an upper-scalar limit, a second time axis spanning from a second lower-time limit to a second upper-time limit; and a plurality of pixels corresponding to scalar-time points within the scalar-time graph, each of the plurality of scalar-time points corresponding to a set of identifiers having a time identifier between the second lower-time limit and the second upper-time limit and having a scalar identifier between the lower-scalar limit and the upper-scalar limit.

In a 46th example, the system of any of examples 42-45, wherein the scalar-time graph comprises an indication of each maneuver associated with the orbital object.

In a 47th example, the system of any of examples 21-46, wherein execution of the instructions by the hardware processor causes the system to determine the received initial orbit based on a comparison of corresponding name identifiers associated with the plurality of timepoints of the initial orbit.

In a 48th example, the system of any of examples 21-47, the display further comprising an indicator of the current time.

In a 49th example, the system of example 48, wherein the indicator of the current time comprises a line traversing at least part of the longitude-time graph.

In a 50th example, the system of any of examples 48-49, wherein the indicator of the current time comprises a line traversing at least part of the scalar-time graph.

In a 51st example, the system of any of examples 48-50, wherein execution of the instructions by the hardware processor causes the system to display the indication of the transfer path in relation to the indicator of the current time so as to indicate that the first time period spans a time later than the current time.

In a 52nd example, the system of any of examples 48-51, wherein execution of the instructions by the hardware processor causes the system to display the indication of the transfer path in relation to the indicator of the current time so as to indicate that the first time period spans a time prior to the current time.

In a 53rd example, the system of any of any of examples 48-52, further comprising a real-time telescope data connection interface configured to receive image data from historical and contemporary data sets generated by a network of telescopes photographing the orbital object.

In a 54th example, the system of example 53, wherein the initial orbit is determined, at least in part, by extracting time and location information associated with the image data.

In a 55th example, the system of any of examples 21-54, wherein the path begins and ends within the user-selected orbit transfer time.

In a 56th example, the system of any of examples 21-55, wherein the instructions, when executed by the electronic processor, are further configured to cause the system to: receive, via the time axis zoom control interface and the time axis pan control interface, a second user-selected orbit transfer time window comprising a second lower-time limit and a second upper-time limit; determine a second velocity change of the orbital object capable of causing the orbital object to move from the initial orbit to the target orbit and a second maneuver timepoint associated with the first maneuver, the second maneuver timepoint occurring at a time not after the second upper-time limit and not before the second lower-time limit; calculate a second transfer path of the orbital object corresponding to a second path between the initial orbit and the target orbit; and modify the longitude-time graph to include an indication of at least part of the calculated second transfer path.

In a 57th example, the system of example 56, wherein the instructions, when executed by the electronic processor, are further configured to cause the system to: receive a selection of a second transfer action of the orbital object, the second transfer action comprising a second maneuver for the orbital object, wherein the selection of the second transfer action represents a modification of the initial orbit toward the target orbit.

Conclusion

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may comprise connected logic units, such as gates and flip-flops, and/or may comprise programmable units, such as programmable gate arrays, application specific integrated circuits, and/or processors. The modules described herein may be implemented as software modules, or may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of non-transitory computer-readable medium or other non-transitory computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with patients, health care practitioners, administrators, other systems, components, programs, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the example embodiments which follow should not be limited by the particular embodiments described above.

What is claimed:

1. A method for generating alerts of photometric data related to space objects, the method comprising:
    receiving a plurality of images of one or more space objects;
    identifying a plurality of identifiers associated with each of the one or more space objects;
    receiving, via a graphical user interface, a first identifier associated with a first space object, wherein the first identifier comprises an indication of an orbit of the first space object selected from the plurality of identifiers associated with the one or more space objects;
    identifying, based on the first identifier, a physical characteristic and a magnitude of radiation of the first space object at a first time;
    determining, based on the physical characteristic and the magnitude of radiation, an expected photometric signal at a second time;
    identifying an actual photometric signal at the second time;

determining that a difference between the expected and actual photometric signals at the second time is greater than a maximum signal threshold;

generating an alert of photometric data comprising an indication of at least one of the physical characteristic at the first time, the magnitude of radiation at the first time, or the expected photometric signal a the second time; and displaying, via the graphical user interface, the alert.

2. The method of claim 1, further comprising:

determining, based on the first identifier, a first maneuver of the first space object, the first maneuver comprising a perturbation of a path of the first space object;

identifying, based on the first identifier and the first maneuver, one or more path parameters associated with a path of the first space object;

receiving, via the graphical user interface, a second identifier associated with a second space object;

identifying a first maneuver of the second space object, the first maneuver of the second space object comprising a perturbation of the path of the second space object;

identifying, based on the second identifier and the first maneuver of the second space object, one or more path parameters associated with a path of the second space object; and generating a display interface comprising:
  a longitude-time graph comprising a longitude axis spanning from a lower-longitude limit to an upper-longitude limit and a time axis spanning from a lower-time limit to an upper-time limit; and
  an indication of the one or more path parameters associated with the path of the second space object.

3. The method of claim 2, further comprising determining, based on the one or more path parameters associated with the path of the first space object, an initial orbit of the first space object.

4. The method of claim 3, wherein determining the initial orbit of the first space object is based on observations of the first space object collected over a time period having an endpoint no later than a beginning of the first maneuver of the first space object.

5. The method of claim 2, comprising:

receiving, via the graphical user interface, a user selection of an orbit transfer time window;

calculating a contact timepoint when the first space object is to contact the second space object; and updating the display, based on the calculated contact timepoint, to include an indication of the contact timepoint.

6. The method of claim 5, further comprising calculating an updated transfer path of the space object in response to a user-updated orbit transfer time window.

7. The method of claim 1, further comprising determining a total velocity change associated with the first space object during a first maneuver.

8. The method of claim 7, wherein the total velocity change is less than about 15 m/s.

9. A method for generating alerts of radiometric data related to space objects, the method comprising:

receiving a plurality of images of one or more space objects;

identifying a plurality of identifiers associated with each of the one or more space objects;

receiving, via a graphical user interface displayed on a display device, an indication of an orbit of first space object selected from the plurality of identifiers associated with the one or more space objects;

identifying, based on the first identifier, a physical characteristic and a magnitude of radiation of the first space object at a first time;

determining, based on the physical characteristic and the magnitude of radiation, an expected radiometric signal at a second time;

identifying an actual photometric signal at the second time;

determining that a difference between the expected and actual photometric signals at the second time is greater than a maximum signal threshold;

displaying, via the graphical user interface, an expected photometric signal at the second time based on the physical characteristic and the magnitude of radiation; and displaying, via the graphical user interface, an alert comprising an indication that the difference between the expected and the actual photometric signals at the second time is greater than the maximum signal threshold.

10. The method of claim 9, further comprising:

displaying, via the graphical user interface, an indication of at least one of the physical characteristic at the first time, the magnitude of radiation at the first time, or the expected photometric signal at the second time.

11. A method for generating alerts of radiometric data related to space objects, the method comprising:

receiving a plurality of images of one or more space objects;

identifying a plurality of identifiers associated with each of the one or more space objects;

receiving a first identifier associated with a first space object, wherein the first identifier comprises an indication of an orbit of the first space object selected from the plurality of identifiers associated with the one or more space objects;

identifying, based on the first identifier, a physical characteristic and a magnitude of radiation of the first space object at a first time;

determining, based on the physical characteristic and the magnitude of radiation, an expected radiometric signal at a second time;

identifying an actual photometric signal at the second time;

determining a difference between the expected and actual photometric signals at the second time;

generating an alert comprising an indication of at least one of the physical characteristic at the first time, the magnitude of radiation at the first time, or the expected photometric signal at the second time; and transmitting data to display, via a graphical user interface, the alert.

* * * * *